United States Patent [19]

Yoshida

[11] Patent Number: 5,930,005
[45] Date of Patent: *Jul. 27, 1999

[54] FACSIMILE APPARATUS

[75] Inventor: Takehiro Yoshida, Tokyo, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/534,924

[22] Filed: Sep. 28, 1995

Related U.S. Application Data

[63] Continuation of application No. 08/125,819, Sep. 24, 1993, abandoned.

[30] Foreign Application Priority Data

Sep. 25, 1992 [JP] Japan .................................... 4-280495

[51] Int. Cl.⁶ ............................. H04N 1/40; H04N 1/387
[52] U.S. Cl. ......................... 358/448; 358/449; 358/450; 358/451; 382/297
[58] Field of Search ................................... 358/400, 401, 358/448, 449, 450, 451, 452, 443, 445, 447; 382/296, 297

[56] References Cited

U.S. PATENT DOCUMENTS

| | | | |
|---|---|---|---|
| 4,731,658 | 3/1988 | Koseki | 358/449 |
| 4,814,894 | 3/1989 | Yoshida | 358/449 |
| 4,849,816 | 7/1989 | Yoshida | 358/443 |
| 4,870,503 | 9/1989 | Miura | 358/440 |
| 4,885,641 | 12/1989 | Kato | 358/451 |
| 4,899,227 | 2/1990 | Yamada | 358/452 |
| 4,933,771 | 6/1990 | Matsuura et al. | 358/451 |
| 4,947,269 | 8/1990 | Yamada | 358/451 |
| 5,057,937 | 10/1991 | Muramatsu et al. | 358/451 |
| 5,075,783 | 12/1991 | Yoshida et al. | 358/449 |
| 5,220,431 | 6/1993 | Yamagauchi | 358/449 |
| 5,239,388 | 8/1993 | Matsumoto | 382/297 |
| 5,267,052 | 11/1993 | Bannai et al. | 358/444 |
| 5,301,036 | 4/1994 | Barrett et al. | 358/468 |

FOREIGN PATENT DOCUMENTS

| | | |
|---|---|---|
| 0395402 | 10/1990 | European Pat. Off. . |
| 0450852 | 10/1991 | European Pat. Off. . |
| 0481694 | 4/1992 | European Pat. Off. . |
| 3523819 | 1/1986 | Germany . |
| 4127901 | 5/1992 | Germany . |
| 2173972 | 10/1986 | United Kingdom . |
| 8909526 | 10/1989 | WIPO . |

OTHER PUBLICATIONS

Pats. Abs. Jp., vol. 16, No. 67 (E–1168), Nov. 21, 1991 (JP 3262262).

*Primary Examiner*—Thomas D. Lee
*Attorney, Agent, or Firm*—Fitzpatrick, Cella, Harper & Scinto

[57] ABSTRACT

A facsimile apparatus for recording an image on a fixed-size recording paper sheet includes a memory circuit for storing a received image, an effective data area recognition circuit for obtaining an effective data area of the received image, and a magnification circuit for determining a magnification of the received image by comparing the effective data area and a recording paper sheet size.

107 Claims, 44 Drawing Sheets

FIG. 37A
SENDER
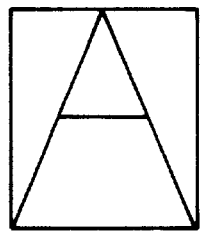
PAGE 1
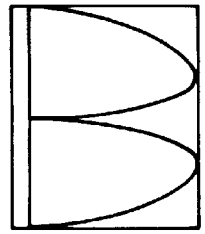
PAGE 2
FIG. 37B
RECEIVER
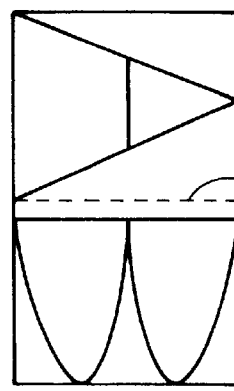
PAGE PARTITION LINE
PAGE 1

FIG. 44
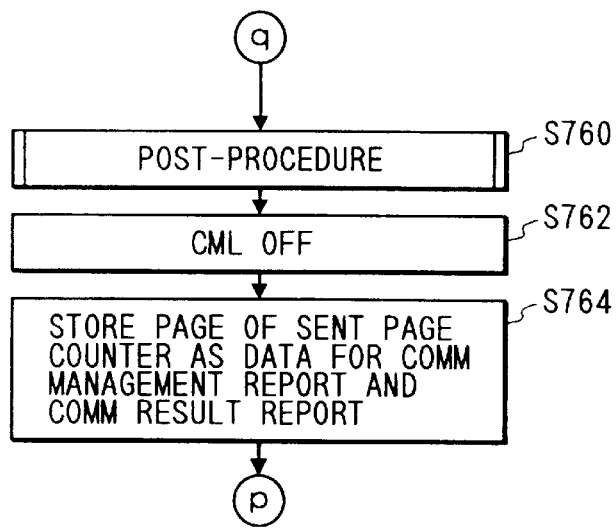
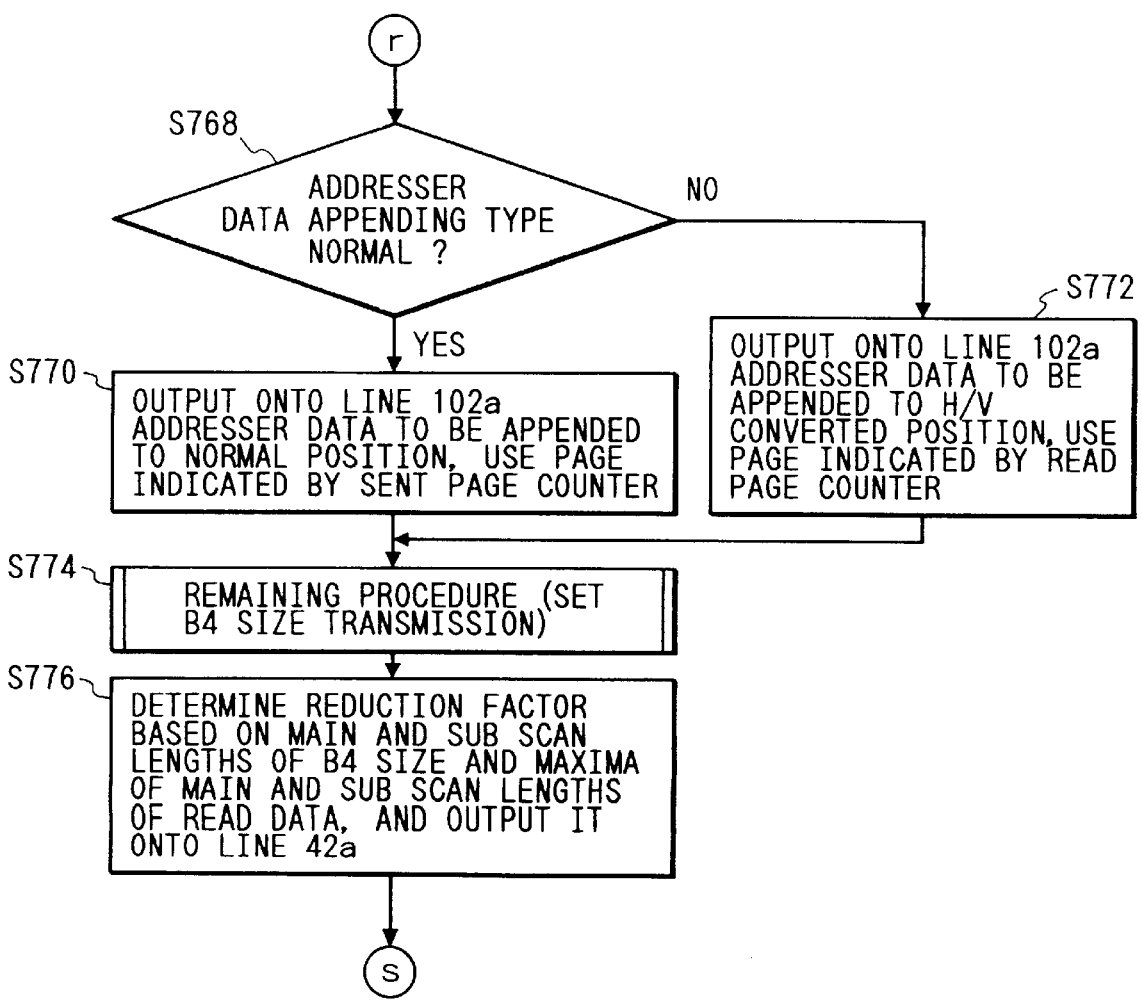

FACSIMILE APPARATUS

This application is a continuation of application Ser. No. 08/125,819, filed Sep. 24, 1993 now abandoned.

BACKGROUND OF THE INVENTION

1. Field of the Invention

The present invention relates to a facsimile apparatus for recording data on a cut paper sheet.

2. Related Background Art

A conventional facsimile apparatus for recording data on a recording paper sheet having a predetermined paper size counts the number of lines transmitted from a sender, and determines based on the counted number of lines whether or not received data is recorded with an equal-size or at a reduction factor.

However, since the conventional apparatus determines an image size including top and bottom margin data of an image, unnecessary reduction-factor recording (e.g., at a reduction factor of 90%) is often performed in practice, resulting in illegible characters, and the like.

SUMMARY OF THE INVENTION

It is an object of the present invention to improve a facsimile apparatus in consideration of the above-mentioned problem.

It is another object of the present invention to provide a facsimile apparatus, which records a received image, which substantially allows equal-size recording, with an equal-size as much as possible, thereby decreasing the image deterioration rate.

It is still another object of the present invention to provide a facsimile apparatus, which determines necessity of reduction and a reduction factor on the basis of an effective data area when received data is to be outputted onto a recording paper sheet having a predetermined size, and compares an actually recordable area with an effective reception area, thereby preventing omission of the effective data area.

It is still another object of the present invention to provide a facsimile apparatus, which determines a reduction factor on the basis of the number of longest lines in images received in one communication, and can record the images received in one communication at the same reduction factor in principle.

It is still another object of the present invention to provide a facsimile apparatus, which selects a reduction/enlargement record mode depending on an effective data area of received data, executes an equal-size record mode when the effective data area of received data is large, and executes an enlargement record mode when the effective area of the received data is small.

It is still another object of the present invention to provide a facsimile apparatus, which receives an effective data area from a sender, and determines a reduction factor in the receiver on the basis of the received effective data area.

It is still another object of the present invention to provide a facsimile apparatus, which, upon reception of short-size data, can receive a plurality of pages of the short-size data on one page of a recording paper sheet.

It is still another object of the present invention to provide a facsimile apparatus, which, upon transmission of data having a sub-scan size about half of a recording paper sheet size, can output transmission data for two pages onto a single recording paper sheet by H/V-converting the data in a receiver or sender.

BRIEF DESCRIPTION OF THE DRAWINGS

FIGS. 37A and 37B are views for explaining an image output example according to the sixth embodiment;

FIG. 44 is a flow chart showing an operation of the seventh embodiment; and

DETAILED DESCRIPTION OF THE PREFERRED EMBODIMENTS

Figure 1:
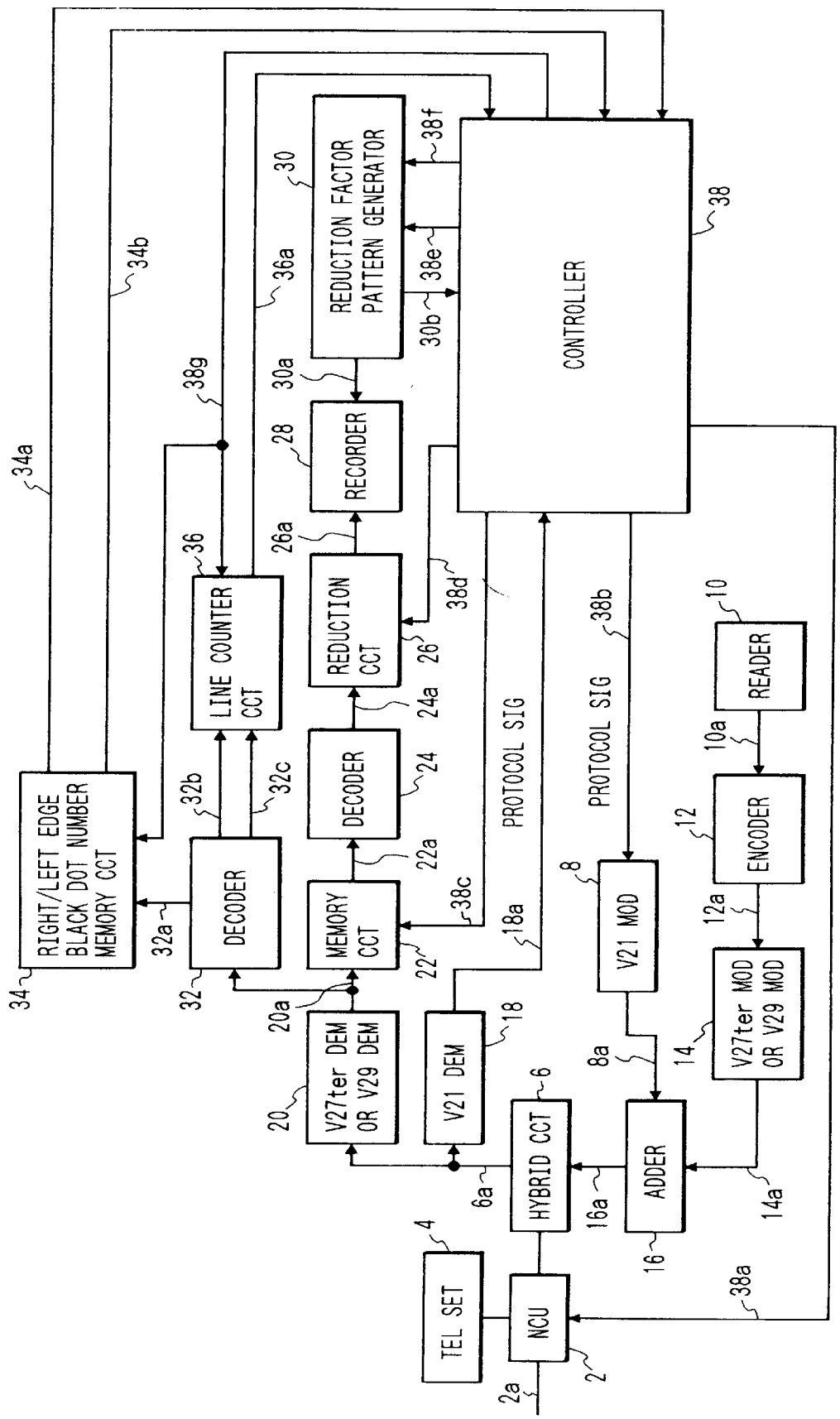
FIG. 1 is a block diagram showing an arrangement according to the first embodiment of the present invention.

FIG. 1 is a block diagram showing the first embodiment of the present invention.

An NCU (network control unit) 2 is connected to a terminal of a line to use a telephone network for, e.g., data communications, executes connection control of a telephone exchange network, performs switching to a data communication path, and holds a loop. When the signal level (signal line 38a) from a controller 38 is "0", the NCU 2 connects a telephone line 2a to the side of a telephone set 4; when it is "1", the NCU connects the telephone line 2a to the side of a facsimile apparatus. In a normal state, the telephone line 2a is connected to the side of the telephone set 4.

A hybrid circuit 6 separates transmission-system signals and reception-system signals, sends a transmission signal from an adder 16 onto the telephone line 2a via the NCU 2, receives a signal from a partner station via the NCU 2, and sends the received signal to a V21 demodulator 18 and a V27 or V29 demodulator 20 via a signal line 6a.

A V21 modulator 8 is a modulator for performing modulation on the basis of the known CCITT recommendation V21. The modulator 8 modulates a procedure signal (signal line 38b) from the controller 38, and sends the modulated signal to the adder 16 via a signal line 8a.

A reader 10 sequentially reads image signals for one main scan line from a transmission original, generates a signal train representing two values, i.e., black and white, and sends this binary data to an encoder 12 via a signal line 10a.

The reader 10 comprises an image pickup element such as a CCD (charged coupled device), and an optical system.

The encoder 12 encodes read data (by MH (Modified Huffman) or (Modified READ) coding), and outputs the encoded data to a modulator 14 via a signal line 12a.

The V27ter or V29 modulator 14 receives an output from the encoder 12 via the signal line 12a, and performs modulation based on the known CCITT recommendation V27ter (differential phase modulation) or V29 (orthogonal modulation). The modulated data outputted from the modulator 14 is sent to the adder 16 via a signal line 14a.

The adder 16 is a circuit for adding the outputs from the modulators 8 and 14. The output from the adder 16 is sent to the hybrid circuit 6 via a signal line 16a.

The V21 demodulator 18 performs demodulation based on the known CCITT recommendation V21. The demodulator 18 receives a procedure signal from the hybrid circuit 6 via the signal line 6a, performs V21 demodulation, and sends the demodulated data to the controller 38 via a signal line 18a.

The V27ter or V29 demodulator 20 performs demodulation based on the known CCITT recommendation V27ter or V29. This demodulator 20 receives the modulated image signal from the hybrid circuit 6, demodulates the received signal, and sends the demodulated data to a memory circuit 22 and a decoder 32 via a signal line 20a.

The memory circuit 22 stores demodulated data outputted onto the signal line 20a, and outputs the stored data to a decoder 24 via a signal line 22a, under the control of a signal on a signal line 38c.

The decoder 24 is a circuit for decoding data from the memory circuit 22 (by MH or MR decoding). The decoded data is outputted to a reduction circuit 26 via a signal line 24a.

The reduction circuit 26 receives a signal outputted onto the signal line 24a, and outputs data, which is reduced in the main scan and sub-scan directions according to a reduction factor outputted from the controller 38 onto a signal line 38d, to a recorder 28 via a signal line 26a.

The recorder 28 receives the signal outputted onto the signal line 26a and the signal outputted onto a signal line 30a, and sequentially records sum data of the received signals in units of lines.

A reduction factor pattern generator 30 receives a reduction factor outputted from the controller 38 onto a signal line 38e when the controller 38 generates a reduction factor pattern output start pulse onto a signal line 38f, generates a pattern of the received factor, and outputs the generated pattern as line data onto the signal line 30a. The reduction factor pattern generator 30 generates an end pulse onto a signal line 30b after it outputs the reduction factor pattern.

The decoder 32 receives a signal on the signal line 20a, and outputs decoded data (based on MH (Modified Huffman) or MR (Modified READ) decoding) onto a signal line 32a. The decoder 32 generates a pulse onto a signal line 32b every time it detects data for one line, and generates a pulse onto a signal line 32c if currently detected line data includes a black dot at the generation timing of the pulse onto the signal line 32b.

A right/left edge black dot memory circuit 34 receives line data outputted onto the signal line 32a after the controller 38 generates a start pulse onto a signal line 38g, outputs the dot number of black data present at the leftmost edge onto a signal line 34a, and outputs the dot number of black data present at the rightmost edge onto a signal line 34b. In other words, the circuit 34 is a circuit for recognizing the number of effective dots in the main scan direction.

A line counter circuit 36 resets a count value and outputs "0" onto a signal line 36a when the controller 38 generates a start pulse onto the signal line 38g, and increments the count value when a pulse is generated onto the signal line 32c at a generation timing of a pulse onto the signal line 32b (i.e., upon completion of encoding of data for one line). When a pulse is generated onto the signal line 32b alone, the circuit 36 outputs no signal onto the signal line 36a; when pulses are generated onto both the signal lines 32b and 32c, the circuit 36 outputs the incremented count value onto the signal line 36a. More specifically, the circuit 36 counts the number of lines from the first line including a black dot to the last line including a black dot, i.e., the number of effective lines in the sub-scan direction.

The controller 38 mainly executes the following processes in this embodiment. When a reception operation is selected, the controller 38 causes the decoder 32 to decode received data while storing the received data in the memory circuit 22, causes the counter circuit 36 to recognize the number of effective lines in the sub-scan direction, i.e., the number of lines from the first line including a black dot to the last line including a black dot, and causes the right/left edge black dot memory circuit 34 to recognize the number of effective dots in the main scan direction, i.e., the number of dots from a black dot at the leftmost edge to a black dot at the rightmost edge, thereby recognizing an effective area.

When memory reception of data for one page is completed, and data for the next page are being received, the controller 38 calculates the reduction factors in the main scan and sub-scan directions in units of % on the basis of the effective area of the received data and the paper size of a recording paper sheet. When the smaller one of the reduction factors is equal to or larger than 90%, the controller 38 records the data reduced at this reduction factor in the main scan and sub-scan directions. Furthermore, upon reception of data for the next page, the controller 38 causes the circuits 34 and 36 to obtain the number of effective dots in the main scan direction, and the number of effective lines in the sub-scan direction.

The controller 38 calculates the reduction factors in units of % in the main scan and sub-scan directions. When the smaller one of the reduction factors is smaller than 90%, the controller divisionally records the data onto a plurality of pages with an equal-size.

Figure 2:
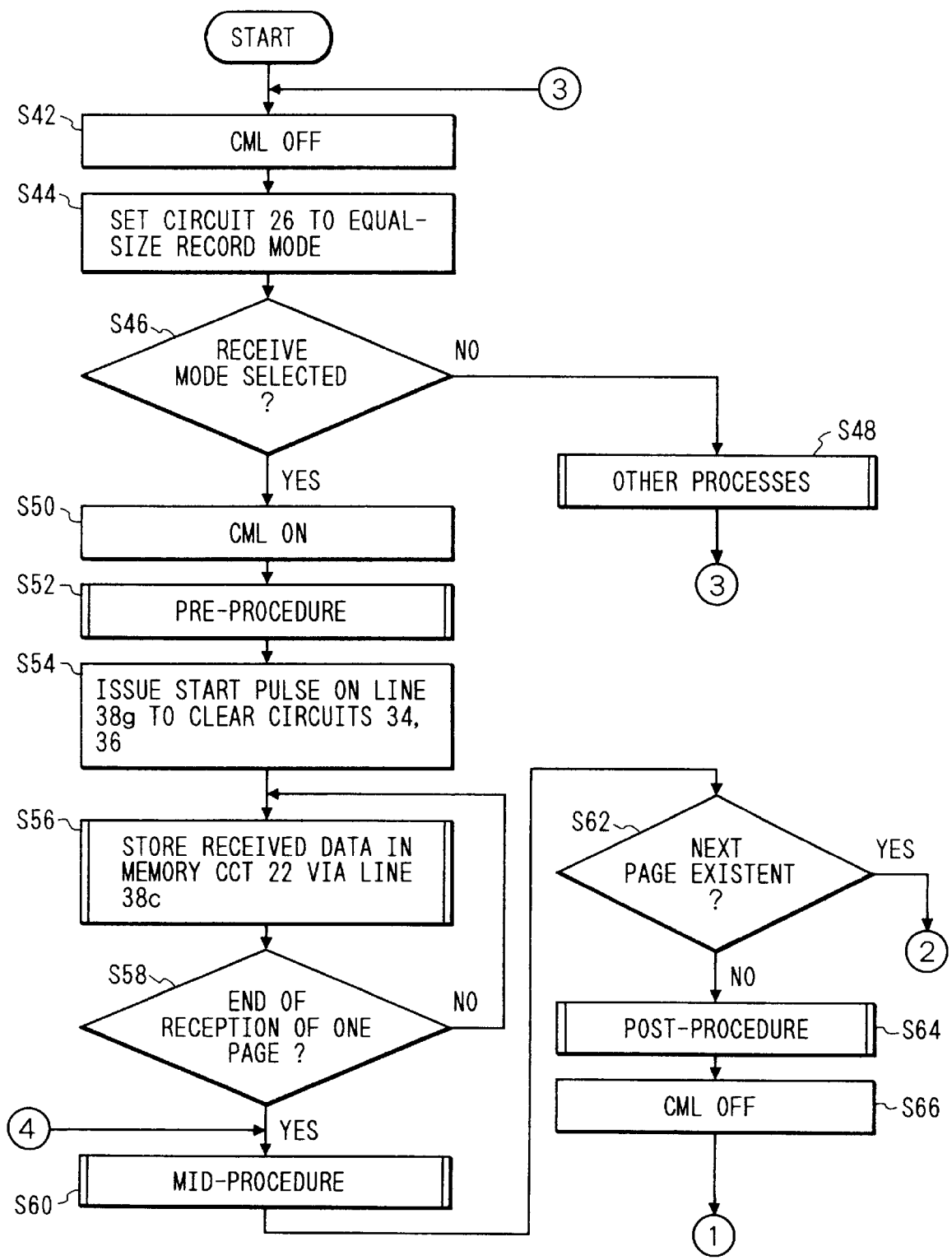
FIG. 2 is a flow chart showing an operation of the first embodiment.
Figure 3:
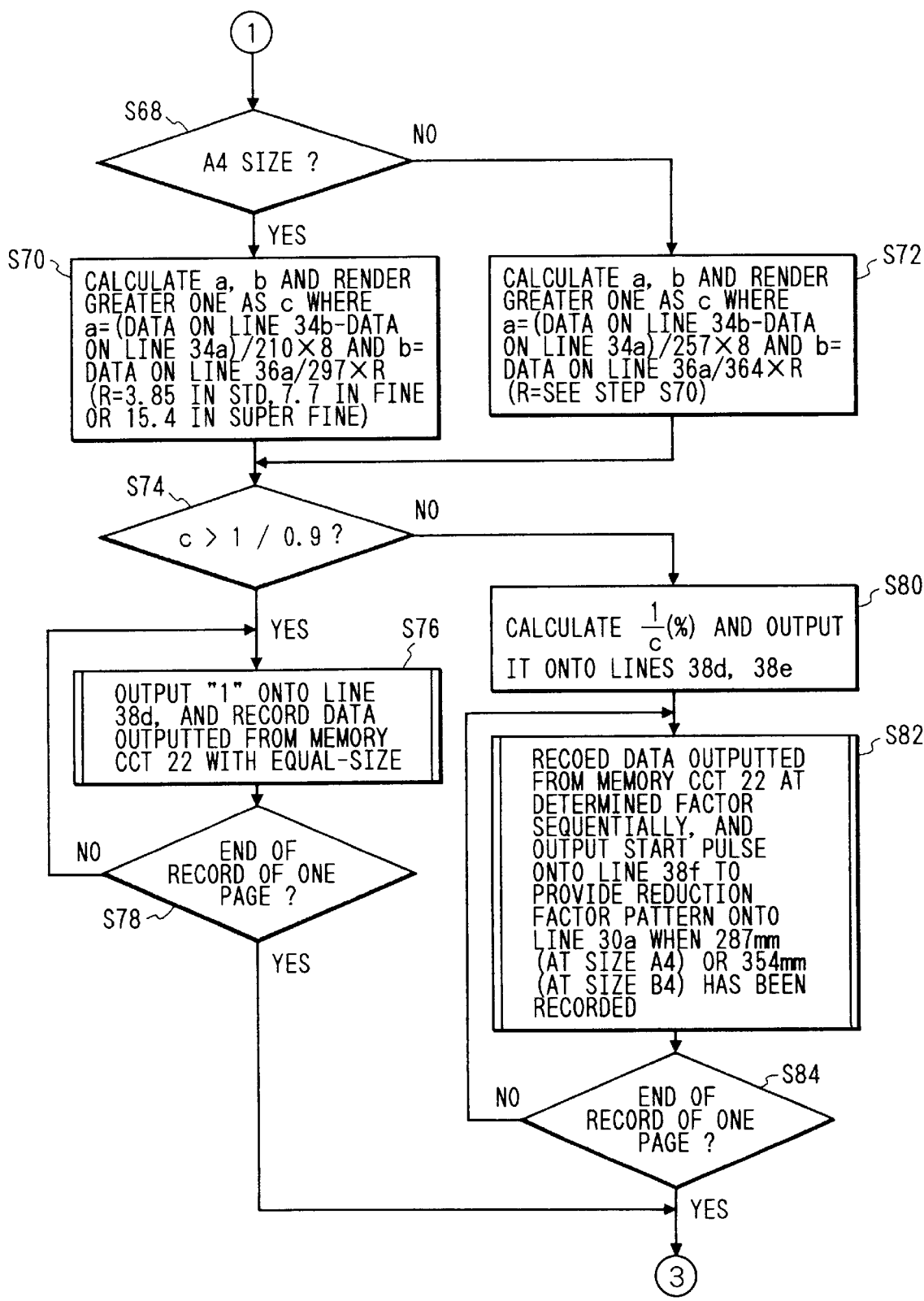
FIG. 3 is a flow chart showing an operation of the first embodiment.
Figure 4:
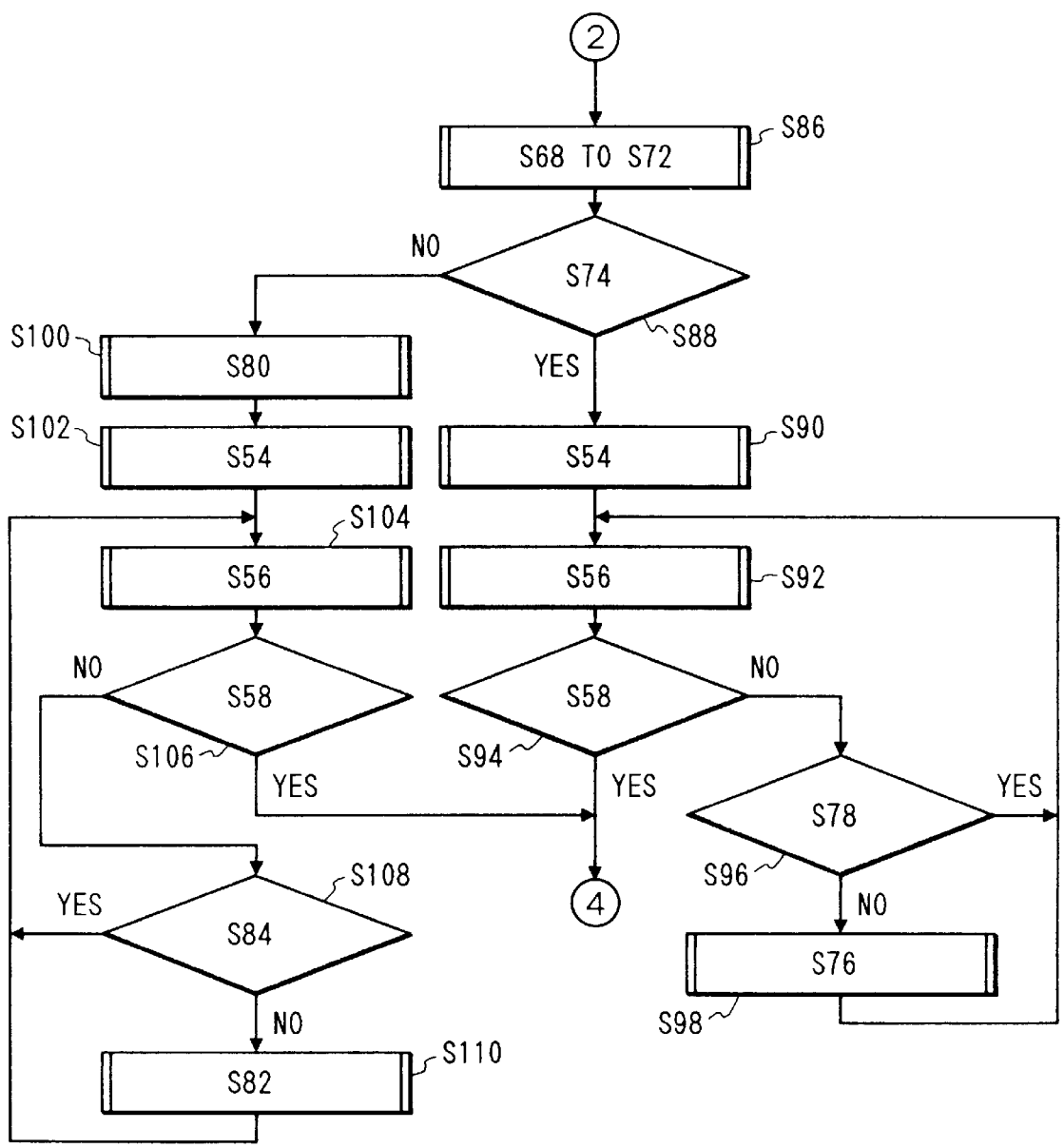
FIG. 4 is a flow chart showing an operation of the first embodiment.

FIGS. 2 to 4 are flow charts showing an operation of the first embodiment.

In step S42, the controller 38 outputs a signal of signal level "0" onto the signal line 38a to turn off CML. In step S44, the controller 38 outputs "1" onto the signal line 38d to set the reduction circuit 26 in an equal-size record mode.

In step S46, it is checked if a receive mode is selected. If YES in step S46, the flow advances to step S50; otherwise, the flow advances to step S48 to execute other processes.

The controller 38 outputs a signal of signal level "1" onto the signal line 38a to turn on CML in step S50, executes a pre-procedure in step S52, and generates a start pulse onto the signal line 38g in step S54 to clear the right/left edge black dot memory circuit 34 and the line counter circuit 36.

The controller 38 stores received data in the memory circuit 22 via the control line 38c in step S56, and checks in step S58 if reception of data for one page is completed. If YES in step S58, the flow advances to step S60; otherwise, the flow returns to step S56.

The controller 38 executes a mid-procedure in step S60, and checks in step S62 if the next page exists. If YES in step S62, the flow advances to step S86; otherwise, the flow advances to step S64.

The controller 38 executes a post-procedure in step S64, and outputs a signal of signal level "0" onto the signal line 38a to turn off CML in step S66.

The controller 38 checks in step S68 if the recording size is the A4 or B4 size. If it is determined in step S68 that the recording size is the A4 size, the flow advances to step S70; otherwise, the flow advances to step S72.

In step S70, the controller 38 lets a be a value obtained by dividing, with 210×8, a value (the number of dots of an effective area in the main scan direction) obtained by subtracting data on the signal line 34a (the dot number of a black dot present at the leftmost edge) from data on the signal line 34b (the dot number of a black dot present at the rightmost edge). Also, the controller 38 lets b be a value obtained by dividing data on the signal line 36a (the number of lines from the first line including a black dot to the last line including a black dot, i.e., the number of lines of an effective area in the sub-scan direction) with 297×(3.85 for a standard mode; 7.7 for a fine mode; 15.4 for a super fine mode). The controller 38 then renders the greater one of a and b as c. Note that a cannot become larger than 1/0.9. Also, note that the main scan width of an A4-size paper sheet is 210 mm, and its sub-scan length is 297 mm.

In step S72, the controller 38 executes substantially the same calculations as in step S70 while replacing 210 by 257, and 297 by 364.

The controller 38 checks in step S74 if c is larger than 1/0.9, i.e., if the reduction factor is equal to or smaller than 90%. If YES in step S74, the flow advances to step S76; otherwise, the flow advances to step S80.

In step S76, the controller 38 outputs "1" onto the signal line 38d to record data stored in the memory circuit 22 with an equal-size by controlling the signal line 38c. In this recording operation, the image stored in the memory circuit 22 is divisionally recorded onto a plurality of pages.

The controller 38 checks in step S78 if recording for one page is completed. If YES in step S78, the flow returns to step S42; otherwise, the flow returns to step S76.

In step S80, the controller 38 calculates 1/c in units of %, and outputs it onto the signal lines 38d and 38e. In step S82, the controller 38 receives data stored in the memory circuit 22 by controlling the signal line 38c, and sequentially records the received data at a predetermined reduction factor. When 287 mm (for the A4 size) or 354 mm (for the B4 size) have been recorded, the controller 38 controls to output a reduction factor pattern onto the signal line 30a, thereby recording the reduction factor on a 10-mm area at the trailing end of a recording paper sheet.

In step S84, the controller 38 checks if recording for one page is completed. If YES in step S84, the flow returns to step S42; otherwise, the flow returns to step S82.

In step S86 and subsequent steps, a reception operation in the memory circuit 22, and a recording operation of data received one page before are executed.

In step S86, the same control as in steps S68 to S72 above is executed to determine c. In step S88, the same control as in step S74 above is executed, and if an image is divisionally recorded onto a plurality of pages, the flow advances to step S90; if data are recorded at a reduction factor of 90% or more, the flow advances to step S100.

In step S90, the same control as in step S54 above is executed, and the circuits 34 and 36 are cleared to count the effective area in the main scan and sub-scan directions. In step S92, the same control as in step S56 above is executed, and received data are stored in the memory circuit 22. Furthermore, in step S94, the same control as in step S58 is executed, and if it is determined that reception of data for one page is completed, the flow returns to step S60; otherwise, the flow advances to step S96.

In step S96, the same control as in step S78 is executed, and if it is determined that recording for one page is completed, the flow returns to step S92; otherwise, the flow advances to step S98. In step S98, the same control as in step S76 above is executed, and data stored in the memory circuit 22 are recorded with an equal-size.

In step S100, the same control as in step S80 is executed to calculate 1/c in units of %, and the calculated value is outputted onto the signal lines 38d and 38e. In step S102, the same control as in step S54 above is executed to clear the circuits 34 and 36 to count the effective area in the main scan and sub-scan directions. Furthermore, in step S104, the same control as in step S56 above is executed to store received data in the memory circuit 22.

In step S106, the same control as in step S58 above is executed, and if it is determined that reception of data for one page is completed, the flow returns to step S60; otherwise, the flow advances to step S108.

In step S108, the same control as in step S84 above is executed, and if it is determined that recording for one page is completed, the flow returns to step S104; otherwise, the flow advances to step silo.

In step S110, the same control as in step S82 above is executed, and data stored in the memory circuit 22 are recorded at a predetermined reduction factor.

As described above, according to the first embodiment, a probability of executing equal-size recording is increased, and a user can obtain easy-to-read recorded data. Also, since an area which can be recorded actually is compared with an effective reception area, omission of the effective data area can be prevented.

In the first embodiment, after data are received in the 1-page memory, the data for the immediately preceding page are recorded during reception of data for the next page. However, after data for one communication are received in the memory, the recording operation may be performed.

In the first embodiment, the effective area (an area including black dots) is detected in the main scan and sub-scan directions. However, the effective area may be detected in the sub-scan direction alone.

In the first embodiment, the reduction factor is recorded on a 10-mm area at the trailing end of a recorded image. However, the reduction factor may be recorded at another position or may not be recorded.

In the first embodiment, the reduction factor is determined by comparing the effective area of received data with the recording paper sheet size. However, the recording paper sheet size often includes a predetermined unrecordable area. For this reason, the reduction factor may be calculated by comparing the effective area of received data and a recordable area. For example, if a 2-mm area at the leading end, a 3-mm area at the trailing end, a 1-mm area at the left edge, and a 1-mm area at the right edge are unrecordable areas, calculations in step S70 can be performed while replacing 210 by 208 and 297 by 292 for the A4 size; replacing 257 by 255 and 364 by 359 for the B4 size.

The second embodiment of the present invention will be described below.

In a conventional facsimile apparatus using fixed-size paper sheets, when an image slightly longer than the A4 size is received, and the sub-scan length of the received image is larger than that of an A4-size paper sheet within a range of a predetermined length a (e.g., 1 cm), data at the trailing end area are abandoned, and the remaining data are recorded with an equal-size on a fixed-size recording paper sheet. Similarly, when the sub-scan length of a received image is larger than that of an A4-size paper sheet within a range of a predetermined length b (e.g., 3 cm) exceeding the predetermined length a, the received data are recorded at a reduction factor of 90% in both the main scan and sub-scan directions. Furthermore, when the sub-scan length of a received image is larger than that of an A4-size paper sheet beyond the predetermined length b, the received image is divisionally recorded with an equal-size on a plurality of sheets.

A header added at the leading end area of received data is about 1 cm long. Depending on automatic feed precision of an original, the sub-scan length of a received image of an A4-size original often becomes larger than that of an A4-size paper sheet within a range of 1 cm or by a length exceeding 1 cm. Thus, the received image of the A4-size original is recorded with an equal-size or at a reduction factor of 90%. For this reason, if, for example, received data represent a table, their sizes vary in units of pages, and their recorded images are not easy for an operator to see.

In the second embodiment, when a reduction output process of a received image is required, the reduction factor is determined based on a page having the maximum number of lines of those in one communication, and the reduction output process of all pages in one communication is executed at the determined reduction factor. Thus, a reduction process with consistency throughout one communication can be executed, and received images which are easy to see for a user can be obtained.

Figure 5:
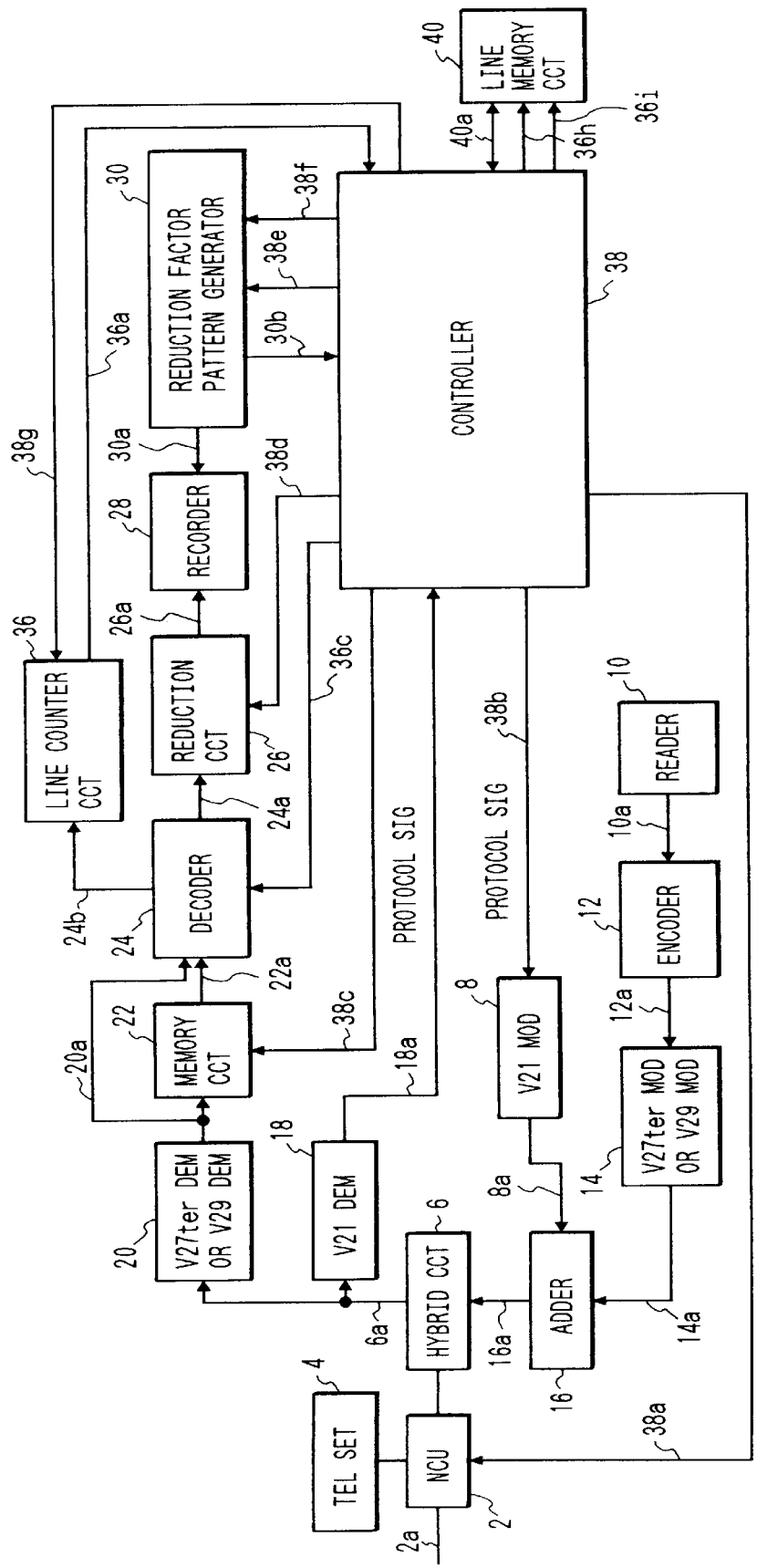
FIG. 5 is a block diagram showing an arrangement according to the second embodiment of the present invention.
Figure 6:
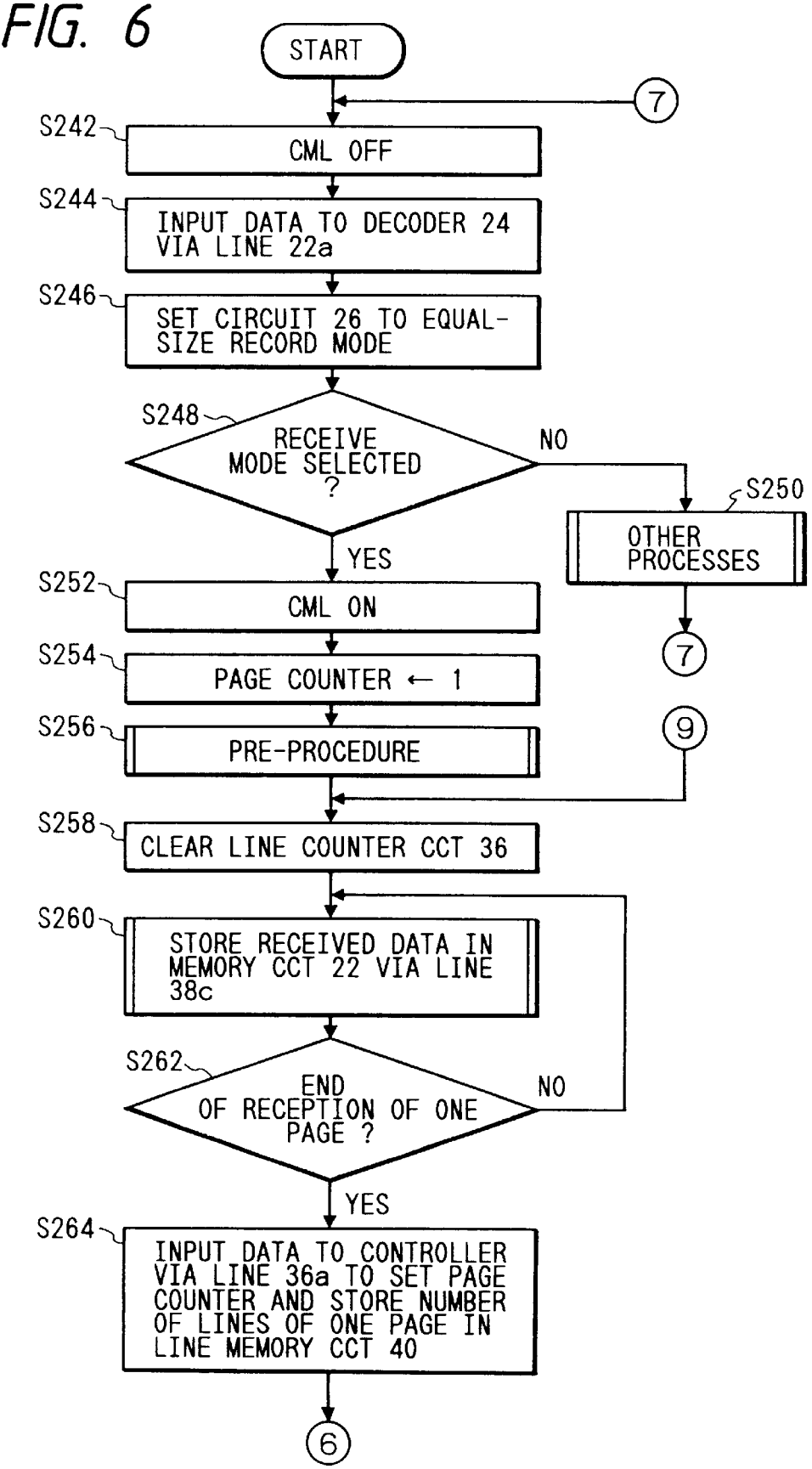
FIG. 6 is a flow chart showing an operation of the second embodiment.
Figure 7:
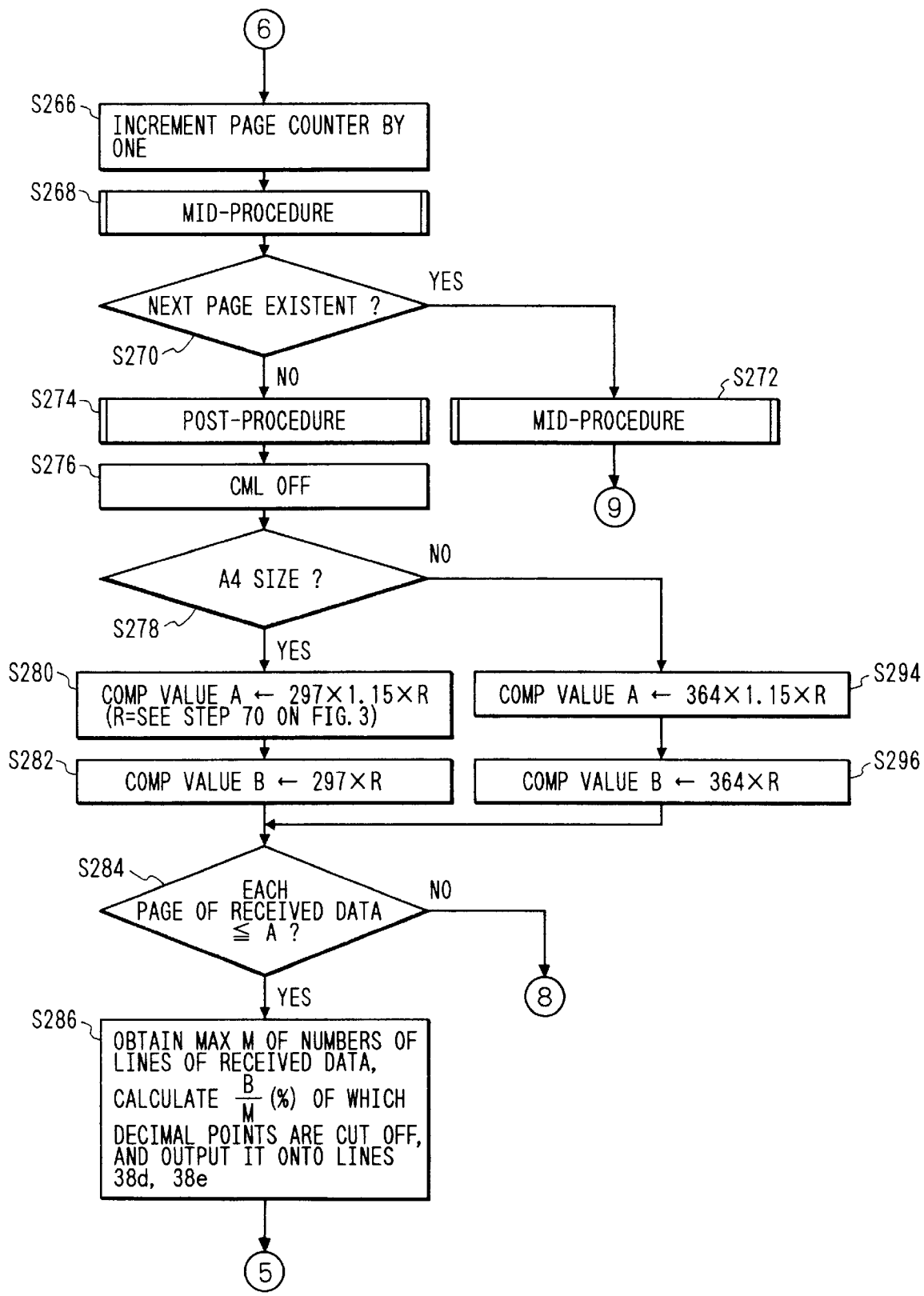
FIG. 7 is a flow chart showing an operation of the second embodiment.
Figure 8:
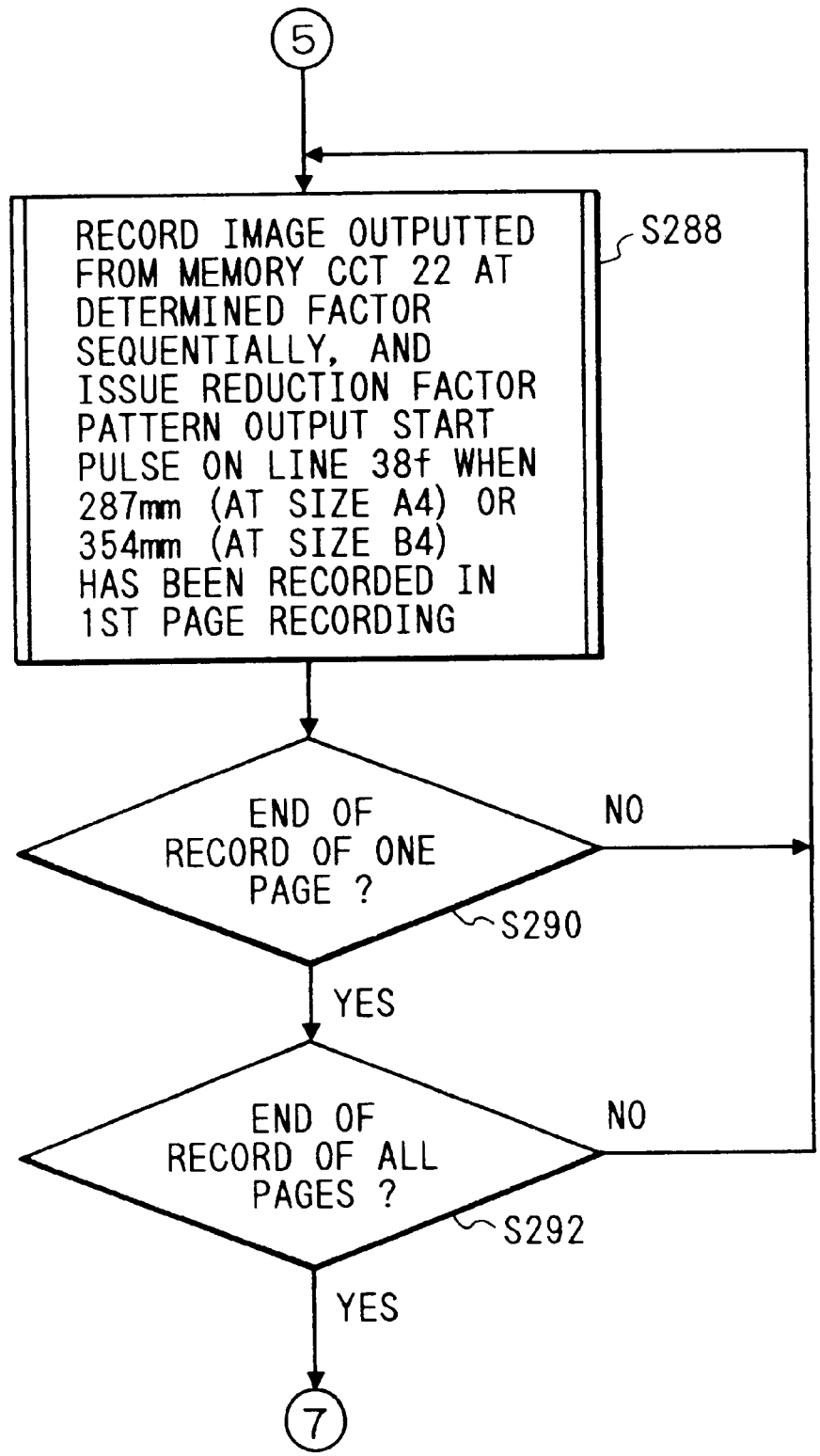
FIG. 8 is a flow chart showing an operation of the second embodiment.
Figure 9:
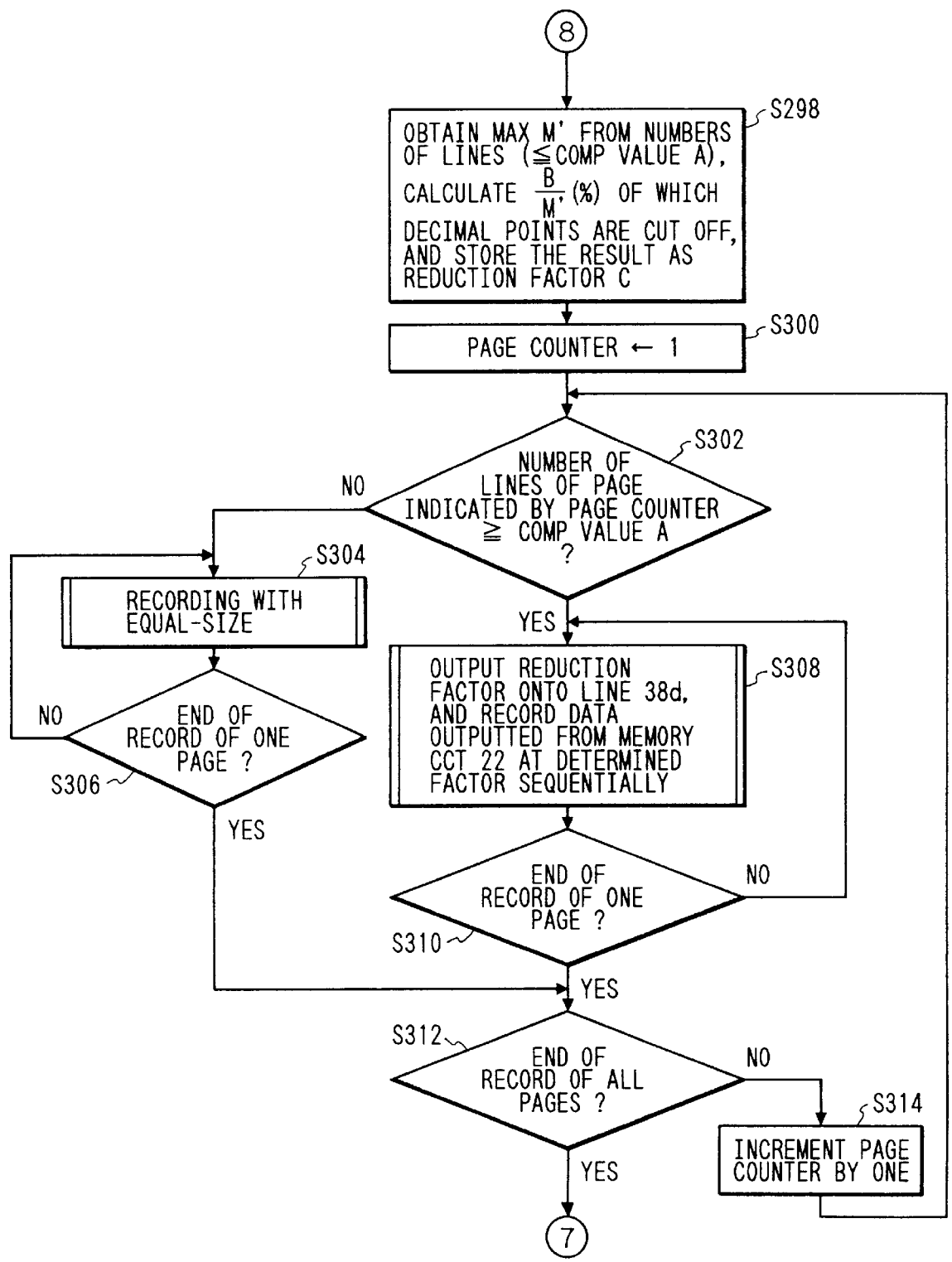
FIG. 9 is a flow chart showing an operation of the second embodiment.

FIG. 5 is a block diagram showing an arrangement of the second embodiment. The same reference numerals in FIG. 5 denote the same parts as in the first embodiment (FIG. 1), and a repetitive description thereof will be avoided.

Referring to FIG. 5, the output signal (signal line 20a) from the demodulator 20 is inputted to the memory circuit 22, and the decoder 24. When the controller 38 outputs a signal of signal level "1" onto a signal line 36c, the decoder 24 receives and decodes the signal from the memory circuit 22; when the controller 38 outputs "0" onto the signal line 36c, the decoder 24 directly receives and decodes the signal from the demodulator 20, and outputs decoded data onto a signal line 24a. The decoder 24 outputs a detection pulse to the line counter circuit 36 via a signal line 24b every time it detects data for one line. The line counter circuit 36 counts the detection pulses, and outputs the count value onto the signal line 36a.

A line memory circuit 40 is a circuit for storing the number of lines of each page in one communication. When the number of lines is stored in the line memory circuit 40, a page number (e.g., 01) and space are outputted onto a signal line 40a, thereafter, the number of lines (e.g., 1155) corresponding to the page number is outputted, and a write pulse is generated onto a signal line 36h. In order to read out the number of lines corresponding to a page number stored in the line memory circuit 40, a page number (e.g., 01) is outputted onto the signal line 40a, and thereafter, a read pulse is generated onto a signal line 36i. Thus, the number of lines (e.g., 1155) stored in correspondence with the page number is outputted onto the signal line 40a.

In the second embodiment, the controller 38 mainly executes the following control. When a reception operation is selected, the controller 38 stores all received data in the memory circuit 22. In this case, the numbers of lines of all page data are counted by the line counter circuit 36, and the count results are stored in the line memory circuit 40.

Upon completion of the reception operation, the controller 38 obtains the maximum value of the numbers of lines corresponding to a length within 1.15 times of the sub-scan length of a fixed-size recording paper sheet, determines a reduction factor based on the maximum value, and causes the reduction circuit 26 to record all the pages of received data at the same reduction factor.

When all page data fall within a range of 1.15 times of the sub-scan length of the fixed-size recording paper sheet, all the data are recorded at the same reduction factor. In this case, this reduction factor is recorded on the first page. Note that the reduction factor is not recorded when data are recorded with an equal-size.

Data for one page having a length 1.15 times or more of the sub-scan length of the fixed-size recording paper sheet are divisionally recorded onto with an equal-size onto a plurality of pages.

FIGS. 6 to 9 are flow charts showing an operation of this embodiment.

In step S242, the controller 38 outputs a signal of signal level "0" onto the signal line 38*a* to turn off CML. In step S244, the controller 38 outputs a signal of signal level "1" onto the signal line 36*c*, and the decoder 24 receives a signal on the signal line 22*a*. In step S246, the controller 38 outputs "1" onto the signal line 38*d* to set the reduction circuit 26 in the equal-size record mode.

In step S248, the controller 38 checks if the receive mode is selected. If YES in step S248, the flow advances to step S252; otherwise, the controller executes other processes in step S250.

The controller 38 outputs a signal of signal level "1" onto the signal line 38*a* to turn on CML in step S252, and sets "1" in a page counter in step S254. The controller 38 then executes a pre-procedure in step S256.

In step S258, the controller 38 outputs a line count start pulse onto the signal line 38*g* to clear the counter circuit 36.

The controller 38 stores received data in the memory circuit 22 by controlling the control line 38*c* in step S260, and checks in step S262 if reception for one page is completed. If YES in step S262, the flow advances to step S264; otherwise, the flow advances to step S260.

In step S264, the controller 38 receives a signal on the signal line 36*a* to obtain the number of lines per page, and stores the number of lines in the line memory circuit 40 together with the content of the page counter. The controller 38 increments the content of the page counter by 1 in step S266, and executes a mid-procedure in step S268.

The controller 38 checks in step S270 if the next page exists. If YES in step S270, the flow advances to step S272 to execute the mid-procedure. Otherwise, the flow advances to step S274 to execute a post-procedure. The controller 38 outputs a signal of signal level "0" onto the signal line 38*a* to turn off CML in step S276, and checks in step S278 if a recording paper sheet has the A4 size. If YES in step S278, the flow advances to step S280; otherwise, i.e., if the paper size is the B4 size, the flow advances to step S294.

In step S280, the controller 38 calculates a comparison value A by multiplying the sub-scan length (297 mm) of the A4 size with 1.15, and then multiplying the product with 3.85 (for the standard mode), 7.7 (for the fine mode), or 15.4 (for the super fine mode), thereby obtaining the number of lines in the corresponding mode.

In step S282, the controller 38 calculates a comparison value B by multiplying the sub-scan length (297 mm) of the A4 size with 3.85 (for the standard mode), 7.7 (for the fine mode), or 15.4 (for the super fine mode), thereby obtaining the number of lines in the corresponding mode.

In step S284, the controller 38 receives the value stored in the line memory circuit 40, and checks if the numbers of lines of all pages of received data are equal to or smaller than the comparison value A. If YES in step S284, the flow advances to step S286 to record data at the same reduction factor. However, if NO in step S284, the flow advances to step S298.

In step S286, the controller 38 receives the value stored in the line memory circuit 40, and obtains the maximum number of lines of received data. The controller 38 then multiplies a reciprocal number of the maximum number of lines with the comparison value B, rounds a decimal fraction to an integer by truncating in units of % (i.e., two digits of % become effective), and outputs this value onto the signal lines 38***d* and 38*e*.

In step S288, the controller 38 receives data stored in the memory circuit 22 by controlling the signal line 38*c*, and sequentially records the received data at the predetermined reduction factor. Upon recording of the first page, after 287 mm (for the A4 size) or 354 mm (for the B4 size) have been recorded if the equal-size recording is not performed, the controller 38 outputs a reduction factor pattern output start pulse onto the signal line 38*f*, and records a reduction factor pattern on a right trailing-end area of a recording paper sheet.

In step S290, the controller 38 checks if recording for one page is completed. If YES in step S290, the flow advances to step S292; otherwise, the flow returns to step S288.

In step S292, the controller 38 checks if recording for all pages is completed. If YES in step S292, the flow returns to step S242; otherwise, the flow returns to step S288.

In step S294, the controller 38 calculates a comparison value A by multiplying the sub-scan length (364 mm) of the B4 size with 1.15, and then multiplying the product with 3.85 (for the standard mode), 7.7 (for the fine mode), or 15.4 (for the super fine mode), thereby obtaining the number of lines in the corresponding mode.

In step S296, the controller 38 calculates a comparison value B by multiplying the sub-scan length (364 mm) of the B4 size with 3.85 (for the standard mode), 7.7 (for the fine mode), or 15.4 (for the super fine mode), thereby obtaining the number of lines in the corresponding mode.

In step S298, the controller 38 receives data stored in the line memory circuit 40, obtains the maximum number of lines of those smaller than the comparison value A, multiplies a reciprocal number of the maximum number of lines with the comparison value B, rounds a decimal fraction to an integer by truncating in units of %, and stores a calculated reduction factor C.

In step S300, the controller 38 sets "1" in the page counter. In step S302, the controller 38 receives the number of lines of a page corresponding to the content of the page counter from the line memory circuit 40, and checks if the received number of lines is equal to or larger than the comparison value A. If YES in step S302, the flow advances to step S304 to record data with an equal-size. In this case, an image is divisionally recorded onto a plurality of pages.

However, if NO in step S302, the flow advances to step S308. In step S308, the controller 38 outputs the reduction factor onto the signal line 38*e*, sequentially receives data stored in the memory circuit 22 by controlling the signal line 38c, and sequentially records the received data at the predetermined reduction factor.

In step S306, the controller 38 checks if recording for one page is completed. If YES in step S306, the flow advances to step S312; otherwise, the flow returns to step S304.

In step S310, the controller 38 checks if recording for one page is completed. If YES in step S310, the flow advances to step S312; otherwise, the flow returns to step S308.

In step S312, the controller 38 checks if recording for all pages is completed. If YES in step S312, the flow returns to step S242; otherwise, the controller increments the content of the page counter by 1 (S314).

As described above, according to the second embodiment, except for an originally elongated original, when an image of a fixed-size original, which image becomes slightly longer by, e.g., the presence of a header, is received, all images in one communication are recorded at the same reduction factor, and their recorded images are easy for an operator to see.

In the second embodiment, when all pages are reduced at a predetermined reduction factor, the reduction factor is recorded on the first page. Alternatively, the reduction factor may be recorded on all the pages. When recorded pages include both equal-size pages and pages reduced at the predetermined reduction factor, the reduction factor and equal-size patterns may be recorded on all pages.

In the second embodiment, reduction in the main scan and sub-scan directions is performed. Alternatively, reduction may be made in the sub-scan direction alone.

As for the trailing end of data for one page, the reduction factor may be determined by defining line data including at least one black dot as effective line data. Thus, a chance of recording received data including a large blank portion on its latter half portion with an equal-size can be increased.

The third embodiment of the present invention will be described below.

In a conventional facsimile apparatus, a reduction factor upon reduction of a received image is determined with reference to a size including a leading or trailing end blank portion of the received image. For this reason, the reduction factor increases accordingly, thus recording illegible characters or an unnecessary blank portion. As a result, a recording paper sheet is often wasted. Thus, in the third embodiment, an effective data area of a received image is recognized, and reduction is executed with reference to the effective data area.

Figure 10:
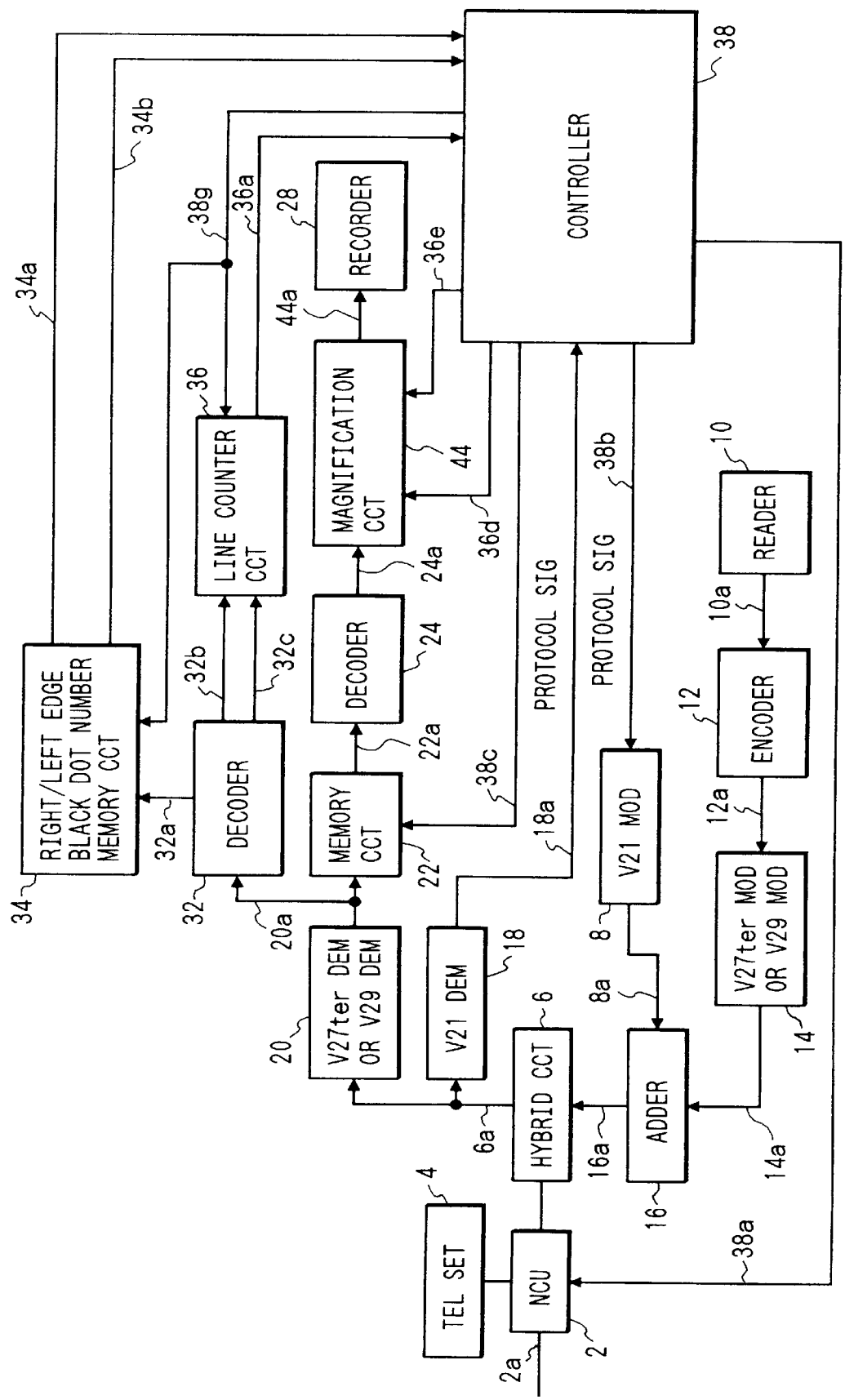
FIG. 10 is a block diagram showing an arrangement according to the third embodiment of the present invention.
Figure 11:
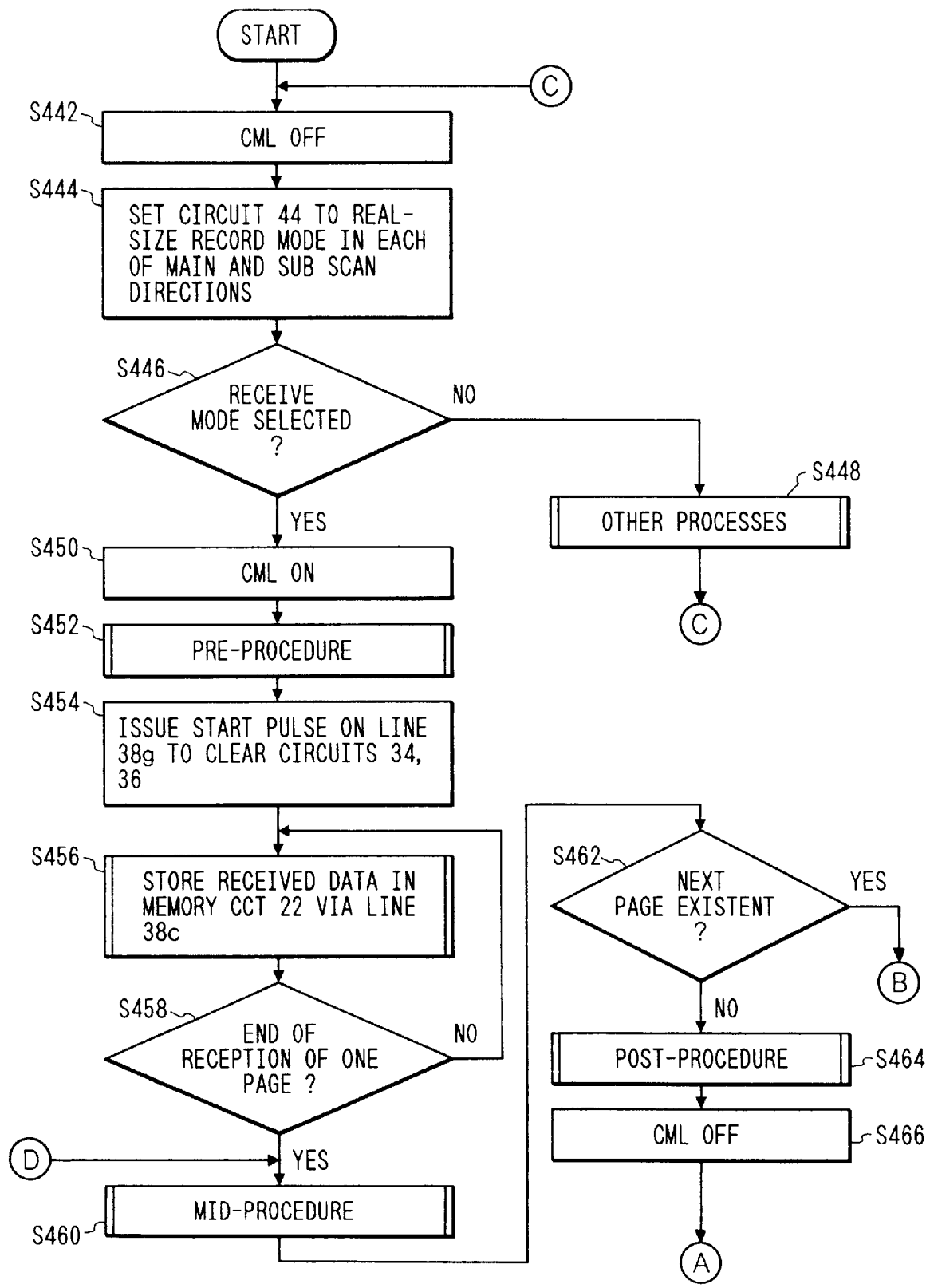
FIG. 11 is a flow chart showing an operation of the third embodiment.
Figure 12:
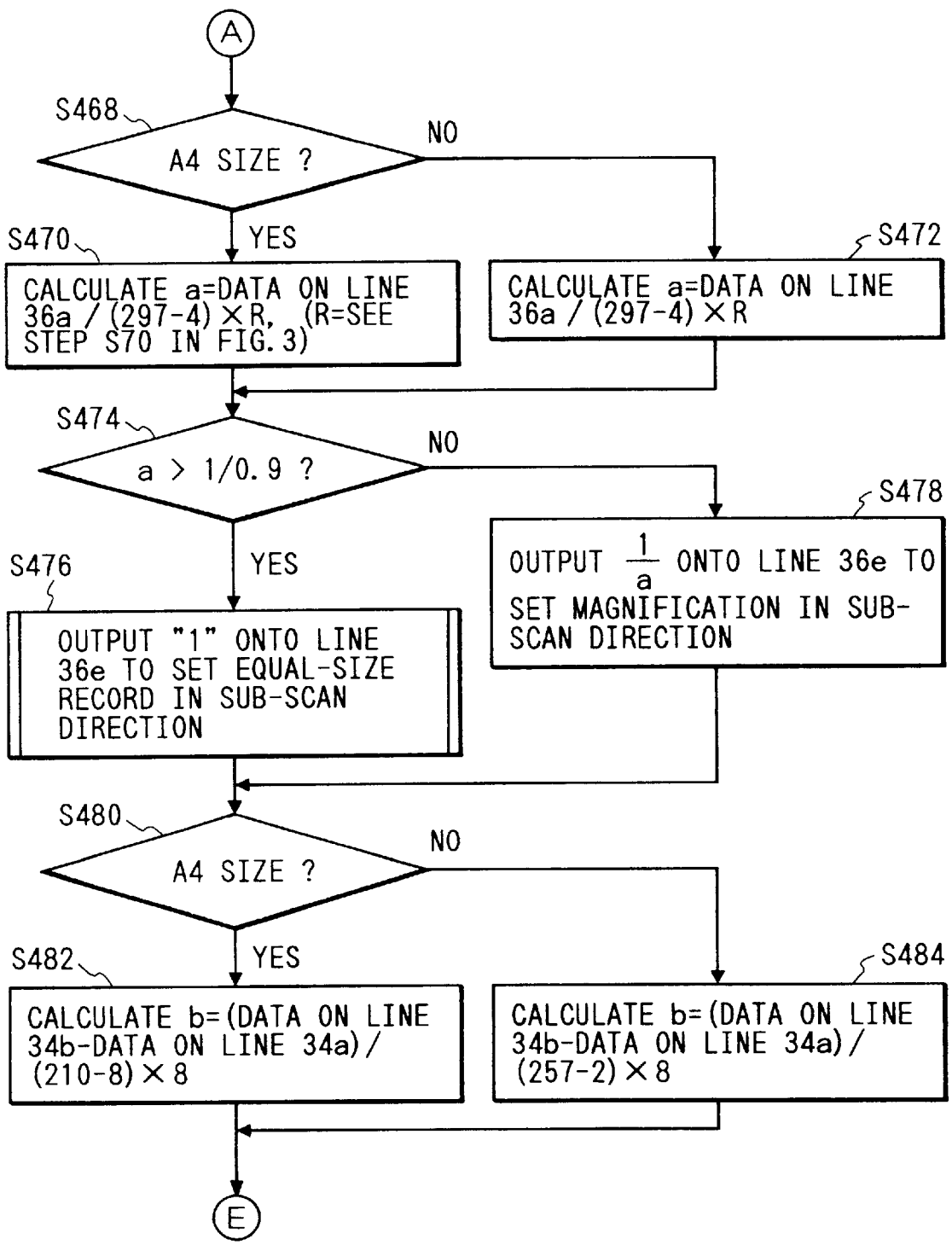
FIG. 12 is a flow chart showing an operation of the third embodiment.
Figure 13:
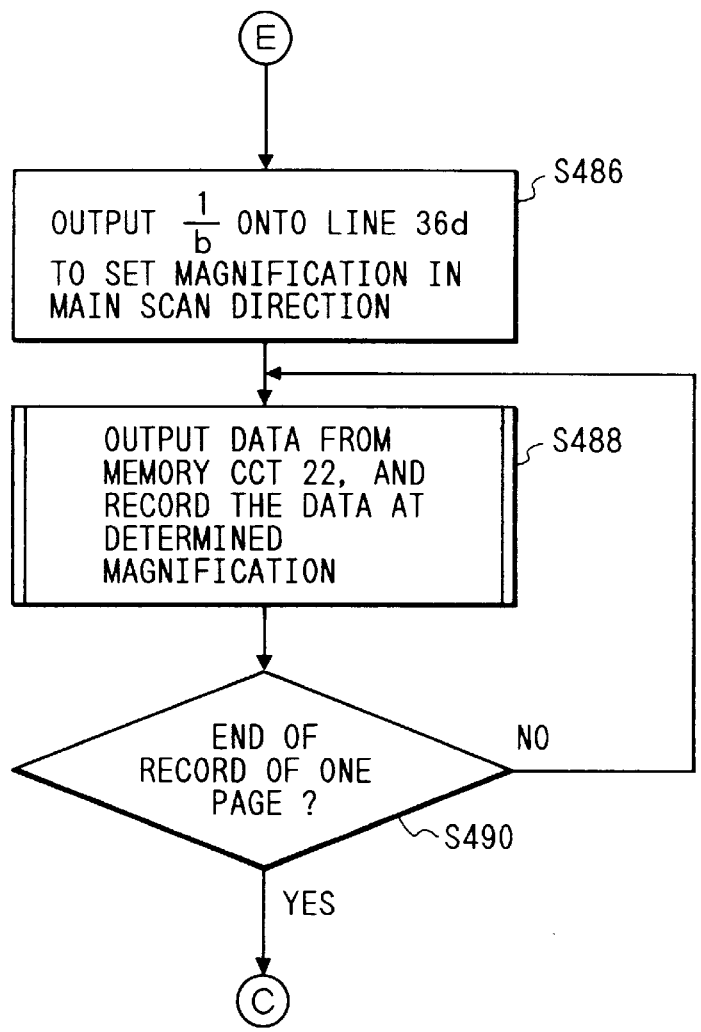
FIG. 13 is a flow chart showing an operation of the third embodiment.

FIG. 10 is a block diagram showing an arrangement of the third embodiment. Note that the same reference numerals in FIG. 10 denote the same parts as in the first embodiment, and a repetitive description thereof will be omitted.

A magnification circuit 44 receives data from the decoder 24, processes decoded data at a magnification outputted onto a signal line 36d in the main scan direction, and at a magnification outputted onto a signal line 36e in the sub-scan direction, and outputs the processed data to the recorder 28 via a signal line 44a.

In the third embodiment, the controller 38 mainly executes the following processes. When a reception operation is selected, the controller 38 causes the decoder 32 to decode received data while storing the received data in the memory circuit 22, causes the counter circuit 36 to recognize the number of effective lines in the sub-scan direction (the number of lines from the first line including a black dot to the last line including a black dot), and causes the right/left edge black dot memory circuit 34 to recognize the number of effective dots in the main scan direction (the number of dots from a black dot at the leftmost edge to a black dot at the rightmost edge), thereby recognizing an effective area.

Then, when memory reception of data for one page is completed, and data for the next page are being received, the controller 38 calculates a sub-scan magnification in units of % on the basis of the effective area of the received data and a recordable area. When the calculated value is equal to or larger than 90%, the controller 38 calculates magnifications independently in the main scan and sub-scan directions on the basis of the effective area of the received data and the recordable area, and records received data to fill the effective recording area.

Also, the controller 38 calculates the sub-scan magnification on the basis of the effective area of received data, and the recordable area, and when the calculated value is smaller than 90%, the controller 38 divisionally records data onto a plurality of pages with an equal-size in the sub-scan direction. At this time, as for the main scan direction, the controller 38 calculates a main scan magnification on the basis of the effective area of the received data and the recordable area, and records the received data according to the calculated magnification.

FIGS. 11 to 14 are flow charts showing an operation of the third embodiment.

The controller 38 outputs a signal of signal level "0" onto the signal line 38a to turn off CML in step S442, and outputs "1" onto the signal linein step and 36e in step S444 to set the magnification circuit 44 in an equal-size record mode in both the main scan and sub-scan directions.

In step S446, the controller 38 checks if the receive mode is selected. If YES in step S446, the flow advances to step S450; otherwise, the flow advances to step S448 to execute other processes.

The controller 38 outputs a signal of signal level "1" onto the signal line 38a to turn on CML in step S450, executes a pre-procedure in step S452, and generates a start pulse onto the signal line 38g to clear the right/left edge black dot memory circuit 34 and the line counter circuit 36 in step S454.

The controller 38 stores received data in the memory circuit 22 via the control line 38c in step S456, and checks in step S458 if reception for one page is completed. If YES in step S458, the flow advances to step S460; otherwise, the flow returns to step S456.

The controller 38 executes a mid-procedure in step S460, and checks in step S462 if the next page exits. If YES in step S462, the flow advances to step S492; otherwise, the flow advances to step S464.

The controller 38 executes a post-procedure in step S464, and outputs a signal of signal level "0" onto the signal line 38a to turn off CML in step S466.

In step S468, the controller 38 checks if the recording size is the A4 or B4 size. If it is determined that the recording size is the A4 size, the flow advances to step S470; if it is determined that the recording size is the B4 size, the flow advances to step S472.

In step S470, the controller 38 lets a be a value obtained by dividing data (the number of lines) on the signal line 36a with (297−4)×(3.85 for the standard mode; 7.7 for the fine mode; 15.4 for the super fine mode). That is, although the sub-scan length of the A4 size is 297 mm, since an A4 size paper sheet includes 2-mm unrecordable areas at its leading and trailing ends, (297−4) mm are assumed.

In step S472, the controller 38 lets a be a value obtained by dividing data (the number of lines) on the signal line 36a with (364−4)×(3.85 for the standard mode; 7.7 for the fine mode; 15.4 for the super fine mode). That is, although the sub-scan length of the B4 size is 364 mm, since a B4 size paper sheet includes 2-mm unrecordable areas at its leading and trailing ends, (364−4) mm are assumed.

In step S474, the controller 38 checks if a is larger than 1/0.9, i.e., if the reduction factor is equal to or smaller than 90%. If YES in step S474, the controller 38 divisionally outputs an image onto a plurality of pages with an equal-size in the sub-scan direction in processes in step S476 and subsequent steps. However, if NO in step S474, the controller 38 records received data to fill the effective recording area of a recording paper sheet at predetermined independent magnifications in both the main scan and sub-scan directions in processes in step S478 and subsequent steps.

Figure 15A:
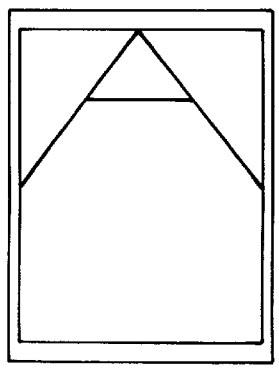
FIG. 15A and 15B are views showing an image example image according to the third embodiment in comparison with a conventional one.
Figure 15B:
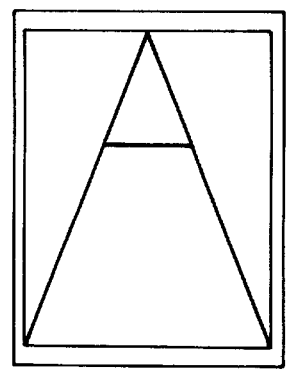
Figure 14:
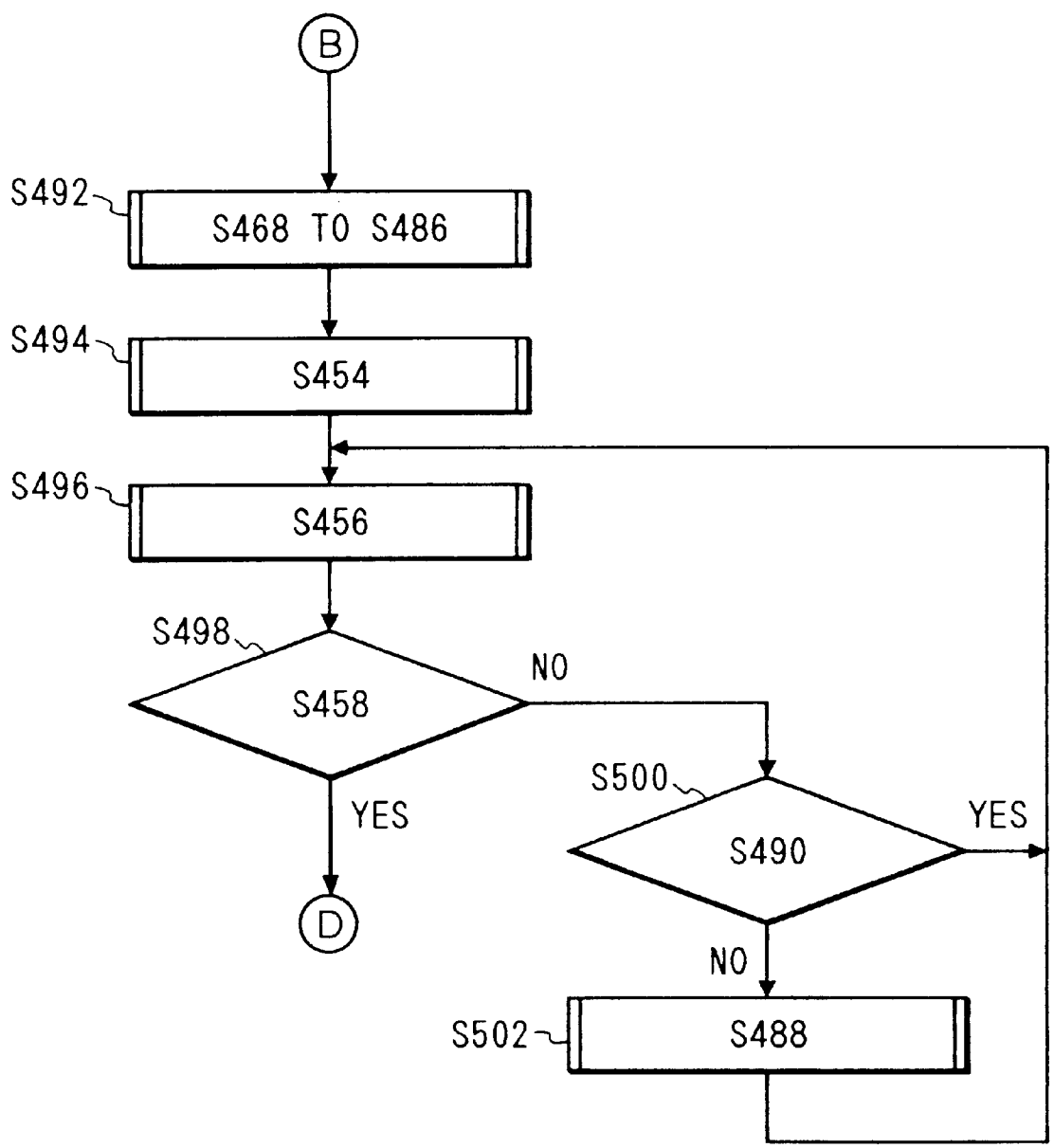
FIG. 14 is a flow chart showing an operation of the third embodiment.

FIGS. 15A and 15B are views showing an example of a recording state in this embodiment in comparison with a conventional one. As shown in FIGS. 15A and 15B, the outer frame represents a recording paper sheet size, and the inner frame represents a recordable area. FIG. 15A shows a conventional recording state. In FIG. 15A, since a margin of a received image is taken into consideration in a reduction mode, the received image cannot be recorded to fill a recording paper sheet. However, in this embodiment, as shown in FIG. 15B, the received image can be recorded to fill the recording paper sheet.

In step S476, the controller 38 outputs "1" onto the signal line 36e to set an equal-size record mode in the sub-scan direction. In step S478, the controller outputs "1/a" onto the signal line 36e to set a sub-scan magnification.

In step S480, the controller 38 checks if the recording size is the A4 or B4 size. If it is determined that the recording size is the A4 size, the flow advances to step S482; if it is determined that the recording size is the B4 size, the flow advances to step S484.

In step S482, the controller 38 lets b be a value obtained by dividing, with (210−2)×8, a value obtained by subtracting data (the number of left edge dots) on the signal line 34a from the data (the number of right edge dots) on the signal line 34b. That is, although the main scan length of the A4 size is 210 mm, since an A4-size paper sheet includes 1-mm unrecordable areas at its right and left edges, (210−2) mm are assumed.

In step S484, the controller 38 lets b be a value obtained by dividing, with (257−2)×8, a value obtained by subtracting data (the number of left edge dots) on the signal line 34a from the data (the number of right edge dots) on the signal line 34b. That is, although the main scan length of the B4 size is 257 mm, since a B4-size paper sheet includes 1-mm unrecordable areas at its right and left edges, (257−2) mm are assumed.

In step S486, the controller 38 outputs "1/b" onto the signal line 36d to set a main scan magnification. In step S488, the controller 38 receives data stored in the memory 22 by controlling the signal line 38c, and sequentially records the data at the predetermined magnification.

In step S490, the controller 38 checks if recording for one page is completed. If YES in step S490, the flow returns to step S442; otherwise, the flow returns to step S488.

In step S492, the same control as in steps S468 to S486 above is executed, and sub-scan and main scan magnifications are set in the magnification circuit 44. In step S494, the same control as in step S454 above is executed to clear the circuits 34 and 36 to count the effective areas in the sub-scan and main scan directions. In step S496, the same control as in step S456 above is executed to store received data in the memory circuit 22. Furthermore, in step S498, the same control as in step S458 above is executed, and if it is determined that reception for one page is completed, the flow returns to step S460; otherwise, the flow advances to step S500.

In step S500, the same control as in step S490 above is executed, and if it is determined that recording for one page is completed, the flow returns to step S496; otherwise, the flow advances to step S502. In step S502, the same control as in step S488 above is executed to record data stored in the memory circuit 22 at a predetermined magnification.

As described above, according to the third embodiment, reduction/enlargement recording is performed on the basis of the effective data area. For this reason, when the effective data area of received data is large, a chance of executing equal-size recording increases; when the effective data area of received data is small, the received data are recorded in an enlarged scale. Therefore, received images, which are easy to see for a user, can be provided. The size of recorded images is always the same for a user, and recording paper sheets can be effectively utilized.

In the third embodiment, no recording magnification is recorded on a recording paper sheet. However, as in the second embodiment, the recording magnification may be recorded on a recording paper sheet.

In the third embodiment, 2-mm areas at the leading and trailing ends and 1-mm areas at the right and left edges are considered as unrecordable areas. However, these values vary depending on recording systems, and can be appropriately selected.

In the third embodiment, when a received image is divisionally recorded with an equal-size onto a plurality of pages in the sub-scan direction, the image is recorded at a predetermined main scan magnification obtained by comparing the number of effective dots and a recordable length. However, in such a divisional output operation, an image may be recorded with an equal-size in the main scan direction as well.

In order to achieve such an operation, after step S476 above, control for outputting "1" onto the signal line 36d to set an equal-size record mode in the main scan direction may be added, and thereafter, the flow may advance to step S488.

In the above embodiment, in order to record data to fill the effective recording area, when the sub-scan recording magnification is equal to or larger than a predetermined value, the main scan and sub-scan magnifications are independently determined. Alternatively, data may be recorded in both the main and sub-scan directions at a smaller one of the main scan and sub-scan magnifications.

In order to achieve this process, after step S476 above, the controller 38 outputs "1" onto the signal line 36d to set an equal-size record mode in the main scan direction, and the flow then advances to step S488. If NO is determined in step S474, control in steps S480 to S484 is executed, and a greater one of a and b is rendered as c. Then, the controller outputs "1/c" onto the signal lines 36d and 36e to set the same magnification in both the main scan and sub-scan directions, and the flow then advances to step S488.

In this case, a received image is divisionally recorded onto a plurality of pages with an equal-size in the main scan direction. Alternatively, in only a reduction mode, the reduction factor may be calculated based on the number of effective dots in the main scan direction and a recordable area so as to record the image.

The fourth embodiment of the present invention will be described below.

In the fourth embodiment, a sender calculates an effective data area in one physical page data, and informs the calculated area to a receiver to execute a variable magnification process excluding a margin, in place of executing a variable magnification process by calculating the effective data area of received data in a receiver unlike in the third embodiment.

Figure 16:
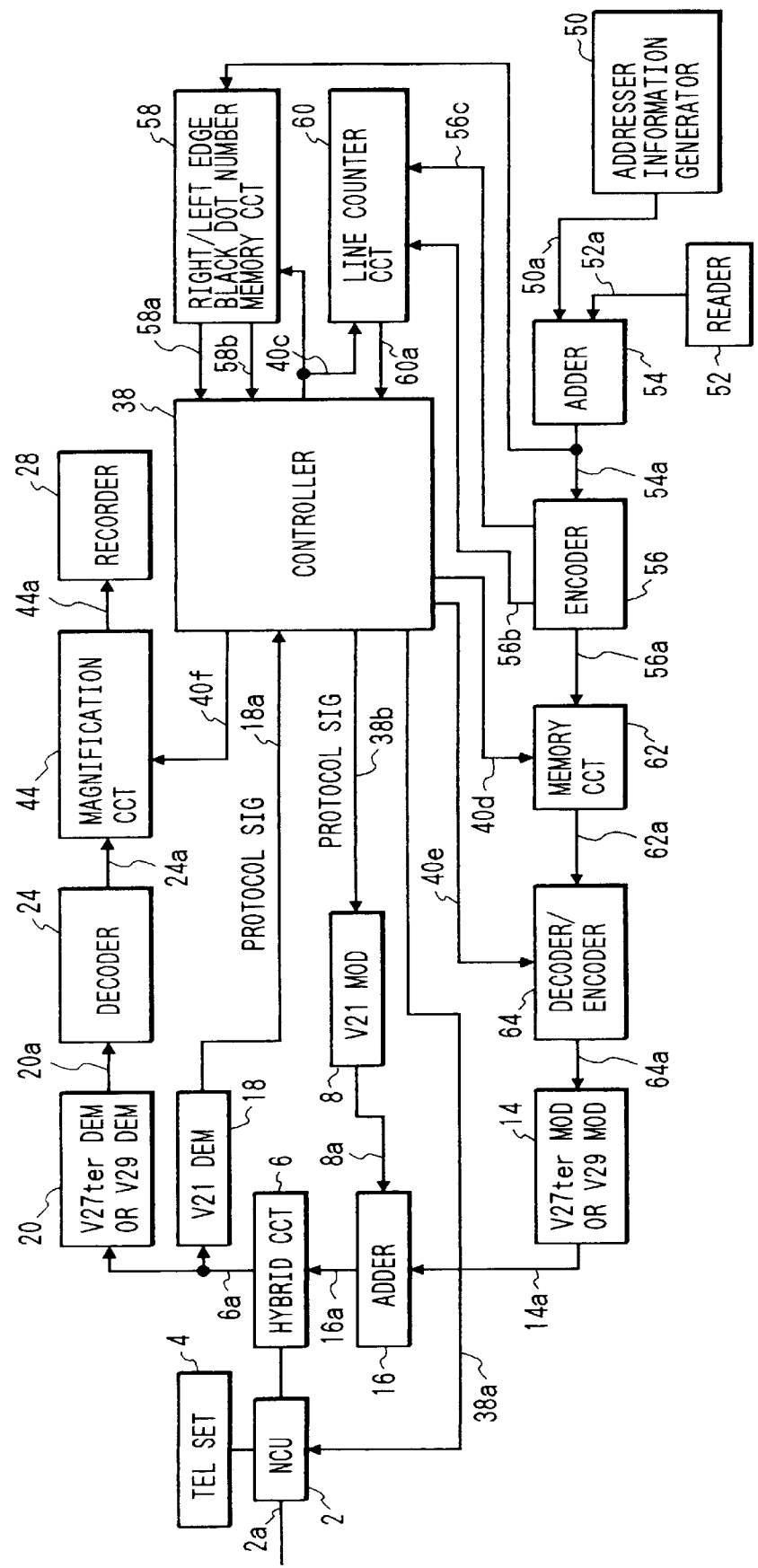
FIG. 16 is a block diagram showing an arrangement according to the fourth embodiment of the present invention.
Figure 17:
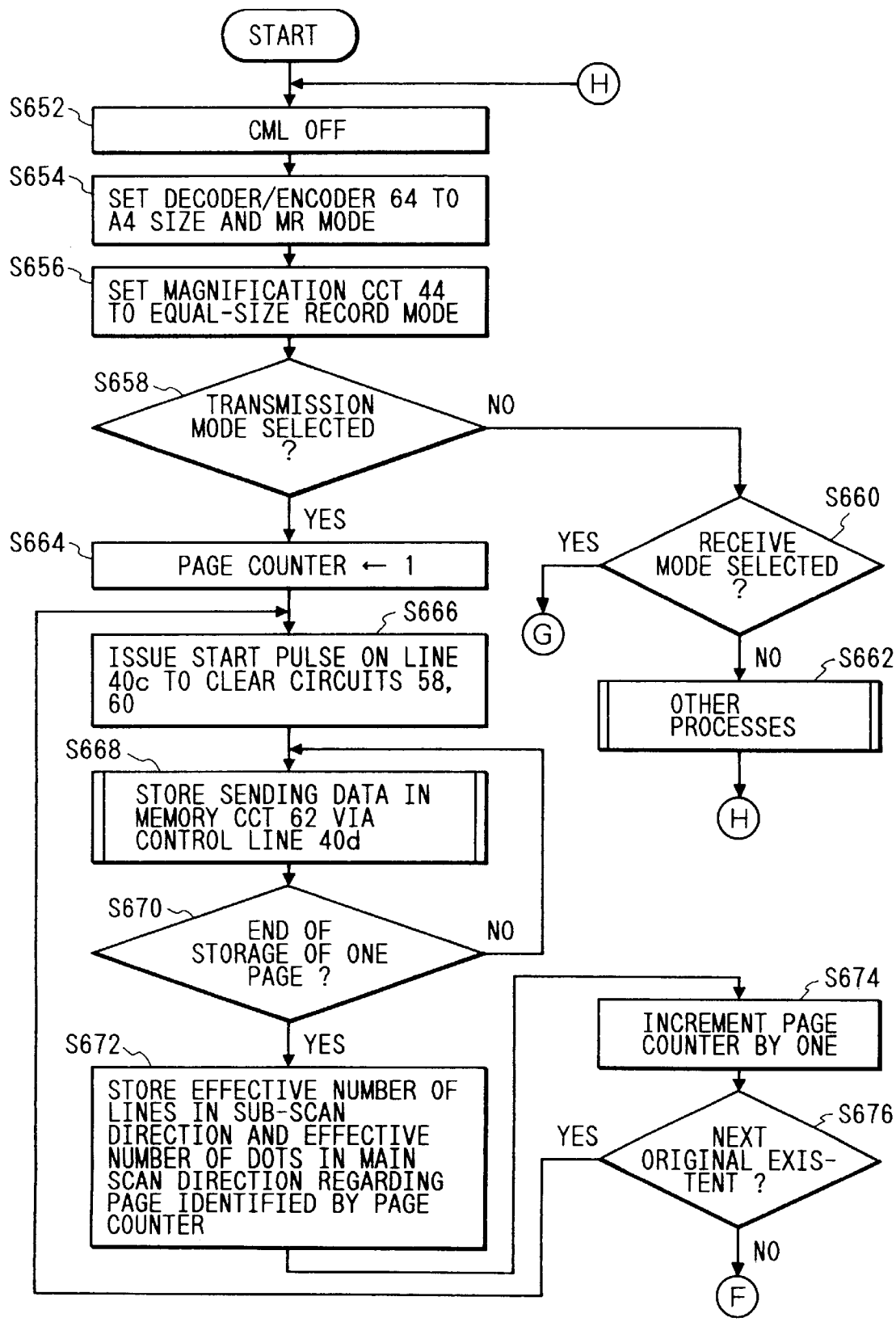
FIG. 17 is a flow chart showing an operation of the fourth embodiment.
Figure 18:
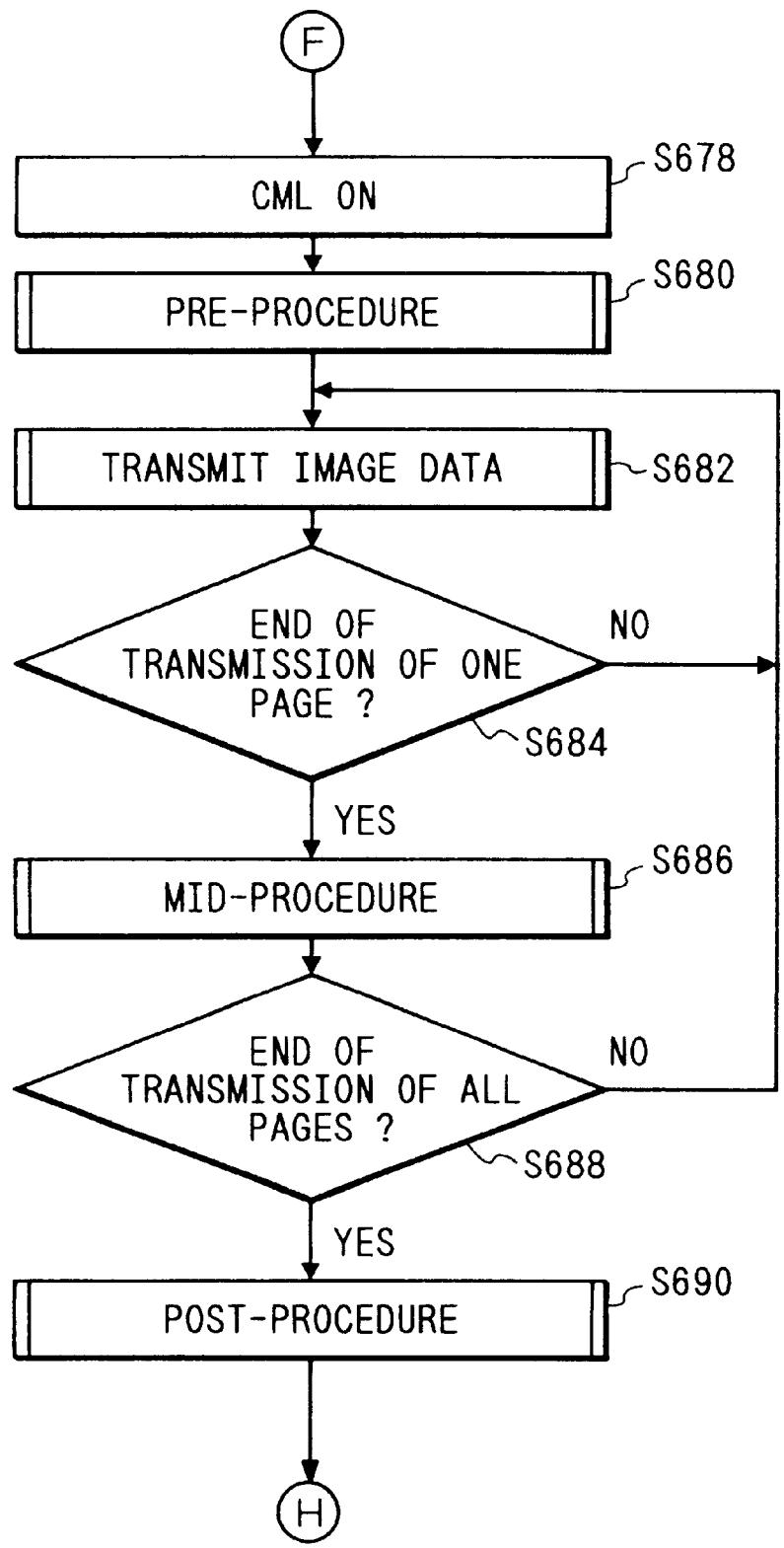
FIG. 18 is a flow chart showing an operation of the fourth embodiment.
Figure 19:
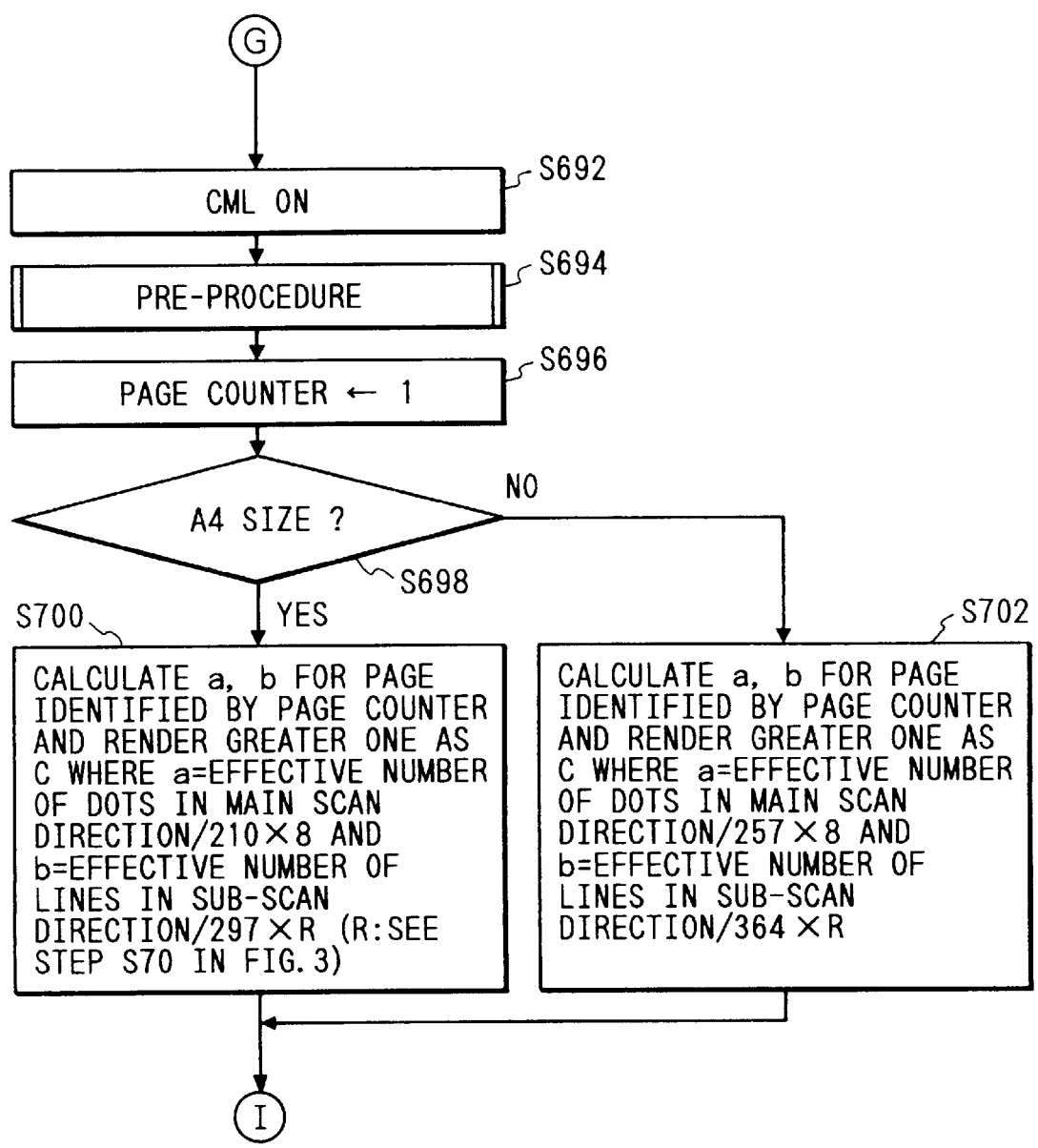
FIG. 19 is a flow chart showing an operation of the fourth embodiment.
Figure 20:
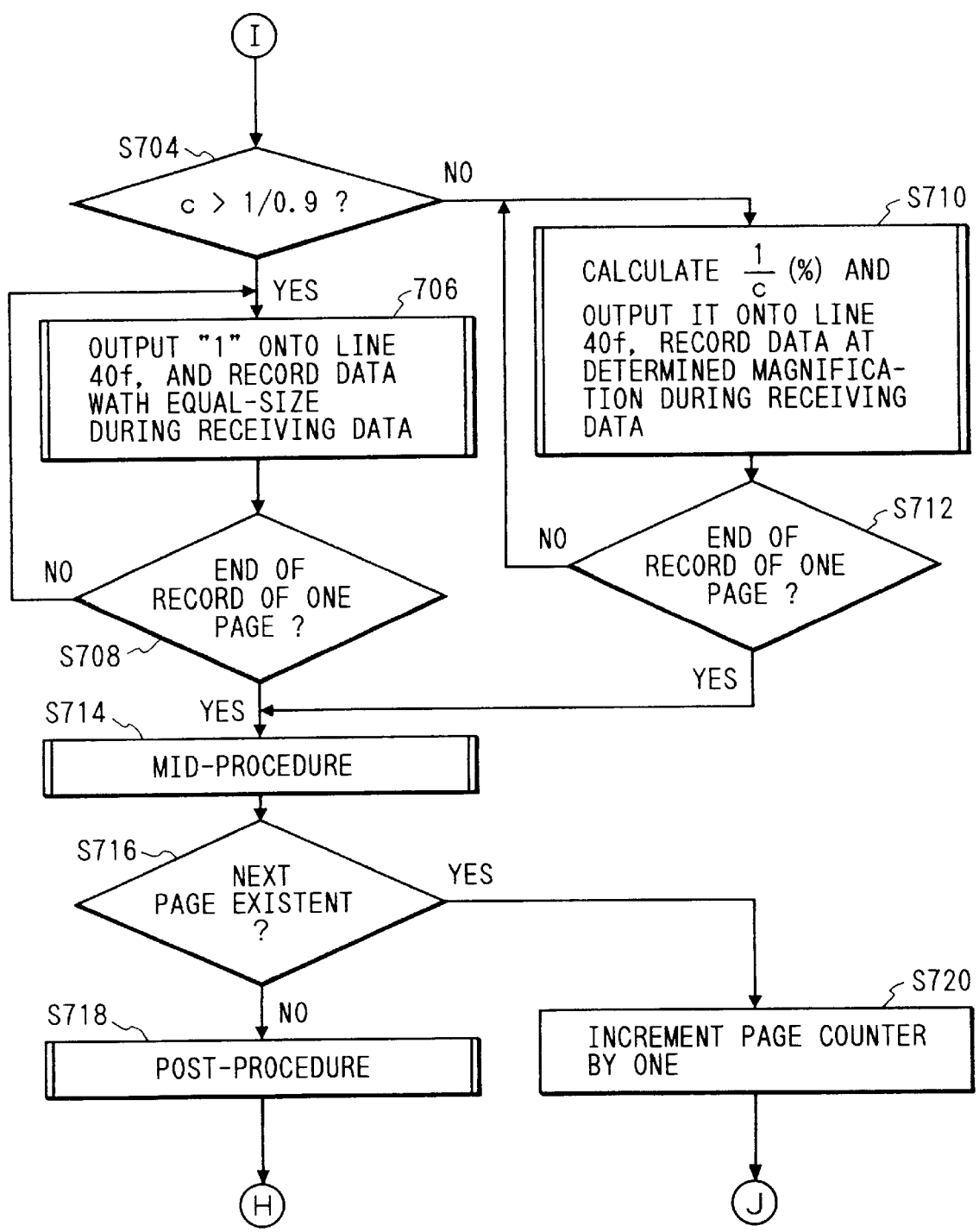
FIG. 20 is a flow chart showing an operation of th fourth embodiment.

FIG. 16 is a block diagram showing an arrangement of the fourth embodiment. Note that the same reference numerals in FIG. 16 denote the same parts as in the first embodiment (FIG. 1), and a repetitive description thereof will be omitted.

An addresser data generator 50 outputs preset addresser data onto a signal line 50a as line data.

A reader 52 reads an original image and outputs an image signal via a signal line 52a as in the reader 10 in the first embodiment (FIG. 1).

An adder 54 receives and adds data outputted from the addresser data generator 50 onto the signal line 50a, and data outputted from the reader 52 onto the signal line 52a, and outputs a sum onto a signal line 54a.

An encoder 56 receives and encodes the read data or the addresser data outputted on the signal line 54a (by MR encoding with K=8), and outputs the encoded data via a signal line 56a. The encoder 56 outputs a pulse onto a signal line 56b when it encodes data for one line, and generates a pulse onto a signal line 56c at the output timing of the pulse onto the signal line 56b when the line includes a black dot.

A memory circuit 62 stores data outputted on the signal line 56a under the control of a signal on a signal line 40d, and outputs the stored data onto a signal line 62a.

A decoder/encoder 64 receives and decodes encoded data outputted on the signal line 62a in accordance with an encoding mode outputted on a signal line 40e and a preset original size, and re-encodes the decoded data to achieve encoding mode conversion and original size conversion. The decoder/encoder 64 outputs the converted data onto a signal line 64a.

A right/left edge black dot memory circuit 58 receives line data outputted onto the signal line 54a after the controller 38 generates a start pulse onto a signal line 40c, outputs a dot number of black data present at the leftmost edge onto a signal line 58a, and outputs a dot number of black data present at the rightmost edge onto a signal line 58b as in the right/left edge black dot memory circuit 34. In other words, the circuit 58 is a circuit for recognizing the number of effective dots in the main scan direction.

A line counter circuit 60 resets a count value and outputs "0" onto a signal line 60a when the controller 38 generates a start pulse onto the signal line 40c, as in the line counter circuit 36 in the first embodiment (FIG. 1). This count value is obtained by counting the number of lines after the first pulse is generated on the signal line 56c, in response to a pulse input on the signal line 56b. When a pulse is generated on the signal line 56b, and a pulse is also generated on the signal line 56c, the circuit 60 outputs the incremented count value onto the signal line 60a. That is, the circuit 60 counts the number of lines from the first line including a black dot to the last line including a black dot, i.e., the number of effective lines in the sub-scan direction.

The magnification circuit 44 receives a signal outputted on the signal line 24a, and outputs data subjected to a variable magnification process in the main scan and sub-scan directions in accordance with a magnification outputted on a signal line 40f onto the signal line 44a.

In the fourth embodiment, the controller 38 mainly executes the following control. In a transmission apparatus, a transmission operation is selected, and memory transmission is performed. In this memory transmission, original images to be sent are stored in the memory circuit 62. At this time, when the original images are stored in the memory circuit 62 in units of pages, the number of effective lines (the number of lines from the first line including a black dot to the last line including a black dot) in the sub-scan direction is recognized by the counter circuit 60, and the number of effective dots (the number of dots from a black dot at the leftmost edge to a black dot at the rightmost edge) in the main scan direction is recognized by the memory circuit 58, thereby recognizing an effective data area. After all the original images to be sent are stored in the memory circuit 62, a call is generated to a designated receiver. In a pre-procedure, the numbers of effective dots in the main scan direction, and the numbers of effective lines in the sub-scan direction in units of pages are informed to the receiver. The receiver calculates main scan and sub-scan magnifications in units of % based on the effective data area of each page and the recording paper sheet size. When a greater one of the main scan and sub-scan magnifications is equal to or smaller than 1/0.9, the receiver records received images at a magnification corresponding to a reciprocal number of the greater magnification in the main scan and sub-scan directions. When the reduction factor exceeds 1, received images are recorded with an equal-size. When the greater one of the main scan and sub-scan magnifications exceeds 1/0.9, each of received images is divisionally recorded onto a plurality of pages with an equal-size.

FIGS. 17 to 20 are flow charts showing an operation of the fourth embodiment.

The controller 38 outputs a signal of signal level "0" onto the signal line 38a to turn off CML in step S652, and sets the decoder/encoder 64 in an A4 size mode and an MR mode via the signal line 40e in step S654.

In step S656, the controller 38 outputs a signal "1" onto the signal line 40f to set the magnification circuit 44 in an equal-size record mode.

The controller 38 checks in step S658 if a transmission mode is selected. If YES in step S658, the flow advances to step S664; otherwise, the flow advances to step S660.

In step S660, the controller 38 checks if a receive mode is selected. If YES in step S660, the flow advances to step S692; otherwise, the flow advances to step S662 to execute other processes.

In step S664, the controller 38 sets "1" in a page counter. In step S666, the controller 38 issues a start pulse onto the signal line 40c to clear the right/left edge black dot memory circuit 58 and the line counter circuit 60. In step S668, the controller 38 stores sending data in the memory circuit 62 via the control line 40d.

The controller 38 checks in step S670 if data for one page have been stored in the memory circuit. If NO in step S670, the flow returns to step S668; otherwise, the flow advances to step S672.

In step S672, the controller 38 stores the number of effective lines in the sub-scan direction of a page corresponding to the content of the page counter (more specifically, receives a signal on the signal line 60a), and the effective number of dots (more specifically, a value obtained by subtracting a left edge dot number on the signal line 58a from a right edge dot number on the signal line 58b) in the main scan direction.

In step S674, the controller 38 increments the content of the page counter by one, and checks in step S676 if the next original exists. If YES in step S676, the flow returns to step S666; otherwise, the flow advances to step S678.

The controller 38 outputs a signal of signal level "1" onto the signal line 38a to turn on CML in step S678, and executes a pre-procedure in step S680. In this procedure, when a receiver has the function of the present invention, the controller 38 informs the number of effective dots in the main scan direction, and the number of effective lines in the sub-scan direction to the receiver in correspondence with a page number using an NSS signal. When a recording paper sheet size of the receiver is smaller than a reading size (only a case wherein a B4-size original is read, and only an A4-size recording paper sheet is available), a value multiplied with 216/257 in the main scan direction, and a value multiplied with 297/364 in the sub-scan direction are informed. Depending on the encoding method and the recording paper size of the receiver, such setting is made via the signal line 40e.

In step S682, the controller 38 performs memory transmission by controlling the signal line 40d. In step S684, the controller 38 checks if transmission for one page is completed. If YES in step S684, the flow advances to step S686; otherwise, the flow returns to step S682.

The controller 38 executes a mid-procedure in step S686, and checks in step S688 if transmission for all pages is completed. If YES in step S688, the flow advances to step S690; otherwise, the flow returns to step S682. In step S690, the controller executes a post-procedure.

The controller 38 outputs a signal of signal level "1" onto the signal line 38a to turn on CML in step S692, and executes a pre-procedure in step S694. In this procedure, the controller 38 informs to the sender that the receiver has the function of the present invention. The controller 38 stores the numbers of effective dots in the main scan direction and the number of effective lines in the sub-scan direction corresponding to the page numbers received from the sender in turn. In step S696, the controller 38 sets "1" in the page counter.

In step S698, the controller 38 checks if the recording paper size is the A4 or B4 size. If it is determined that the recording size is the A4 size, the flow advances to step S700; if it is determined that the recording size is the B4 size, the flow advances to step S702. In step S700, the controller 38 lets a be a value obtained by dividing the number of effective dots in the main scan direction corresponding to the content of the page counter with 210×8. Also, the controller 38 lets b be a value obtained by dividing the number of effective lines in the sub-scan direction corresponding to the content of the page counter with 297×(3.85 for a standard mode; 7.7 for a fine mode; 15.4 for a super fine mode). Then, the controller 38 renders a greater one of a and b as c.

On the other hand, in step S702, the controller 38 lets a be a value obtained by dividing the number of effective dots in the main scan direction corresponding to the content of the page counter with 257×8. Also, the controller 38 lets b be a value obtained by dividing the number of effective lines in the sub-scan direction corresponding to the content of the page counter with 364×(3.85 for a standard mode; 7.7 for a fine mode; 15.4 for a super fine mode). Then, the controller 38 renders a greater one of a and b as c.

In step S704, the controller 38 checks if c is larger than 1/0.9, i.e., if the recording magnification is equal to or smaller than 90%. If YES in step S704, the flow advances to step S706; otherwise, the flow advances to step S710.

In step S706, the controller 38 outputs "1" onto the signal line 40f to execute equal-size recording while receiving data. In this case, an image is divisionally recorded onto a plurality of pages. In step S708, the controller 38 checks if recording for one page is completed. If NO in step S708, the flow returns to step S706; otherwise, the flow advances to step S714.

In step S710, the controller 38 calculates 1/c in units of %, and outputs it onto the signal line 40f. Then, the controller executes recording at a predetermined magnification simultaneously with reception.

In step S712, the controller 38 checks if recording for one page is completed. If NO in step S712, the flow returns to step S710; otherwise, the flow advances to step S714.

The controller 38 executes a mid-procedure in step S714, and checks in step S716 if the next page exists. If YES in step S716, the flow advances to step S720 to increment the content of the page counter by one; otherwise, the flow advances to step S718 to execute a post-procedure.

As described above, according to the fourth embodiment, especially in a simplified system wherein a receiver has no memory circuit, and can perform only real-time recording, since a sender informs an effective data area, a chance of executing equal-size recording increases, and a user can easily see recorded data.

In the fourth embodiment described above, the numbers of effective dots in the main scan direction and the numbers of effective lines in the sub-scan direction are informed in correspondence with all page numbers in the pre-procedure. Alternatively, the number of effective dots in the main scan direction and the number of effective lines in the sub-scan direction corresponding to each page number may be informed prior to transmission of the corresponding page.

The above-mentioned data of the numbers of effective dots in the main scan direction and the numbers of effective lines in the sub-scan direction corresponding to the page numbers may be transmitted in high-speed data in the case of, e.g., ECM communications.

Furthermore, in the fourth embodiment, the effective area (an area including black dots) is detected in the main scan and sub-scan directions. However, the effective area may be detected in the sub-scan direction alone.

In the fourth embodiment, a magnification is determined by comparing the effective area of received data and a recording paper sheet size. However, a recording sheet size often includes predetermined unrecordable areas. For this reason, a recording magnification may be determined based on the effective area of received data and a recordable area. For example, assume that a recording paper sheet includes 2-mm unrecordable areas at the leading and trailing ends, and 1-mm unrecordable areas at the right and left edges. In this case, the process in step S700 is executed while replacing 210 by 208 and 297 by 293 for the A4 size, or the process in step S702 is executed while replacing 257 by 255 and 364 by 360 for the B4 size.

The fifth embodiment of the present invention will be described below.

In a conventional facsimile apparatus using a fixed-size recording paper sheet, when two sheets each having data of a size about half a recording paper sheet size are received, they are respectively recorded on two fixed-size recording paper sheets, thus forming unnecessary blank portions, and causing wasteful consumption of recording paper sheets.

Thus, in the fifth embodiment, when small images are received, they are simultaneously outputted onto a single recording paper sheet to avoid wasteful consumption of recording paper sheets.

Figure 21:
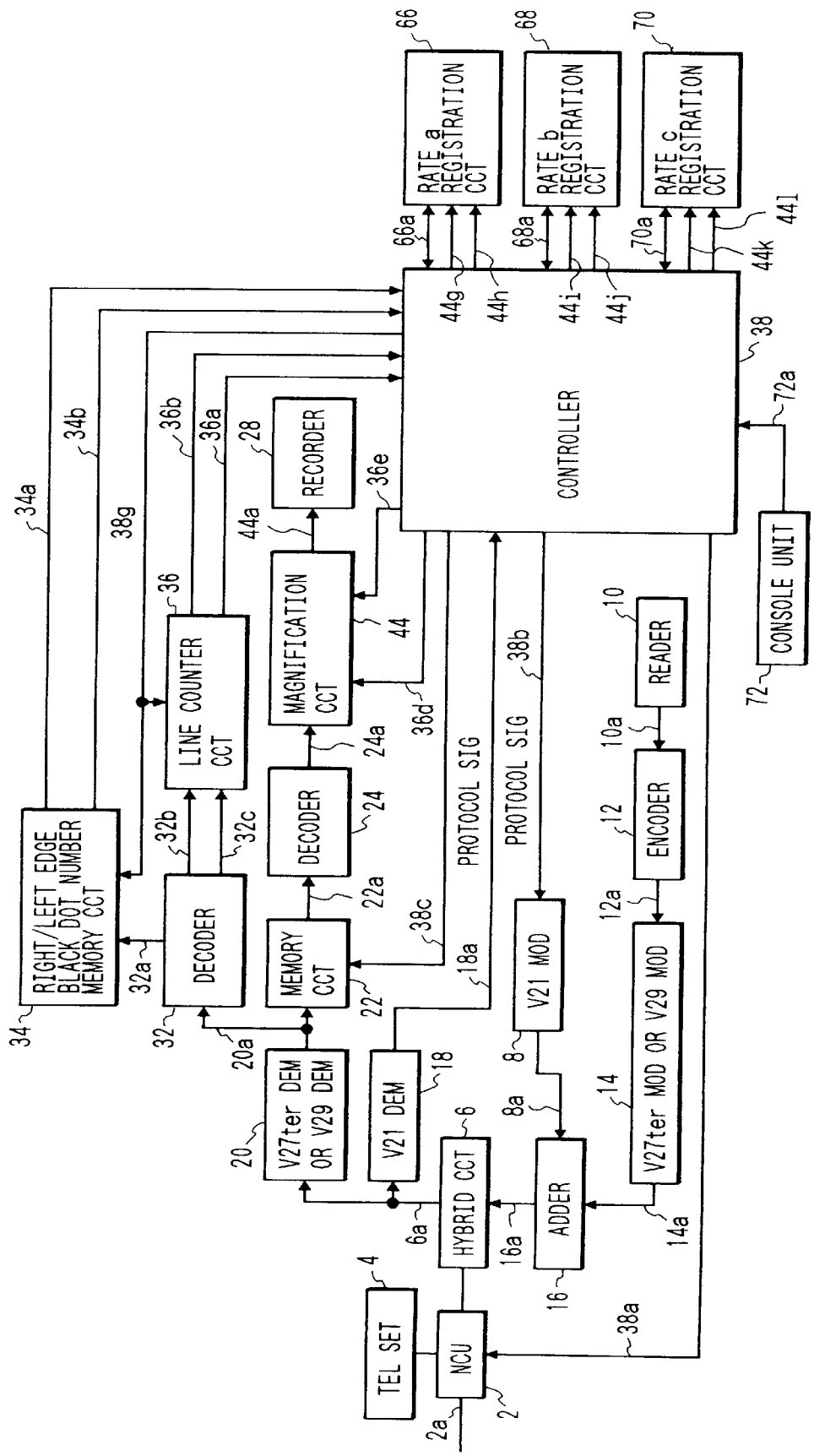
FIG. 21 is a block diagram showing an arrangement according to the fifth embodiment of the present invention.
Figure 22:
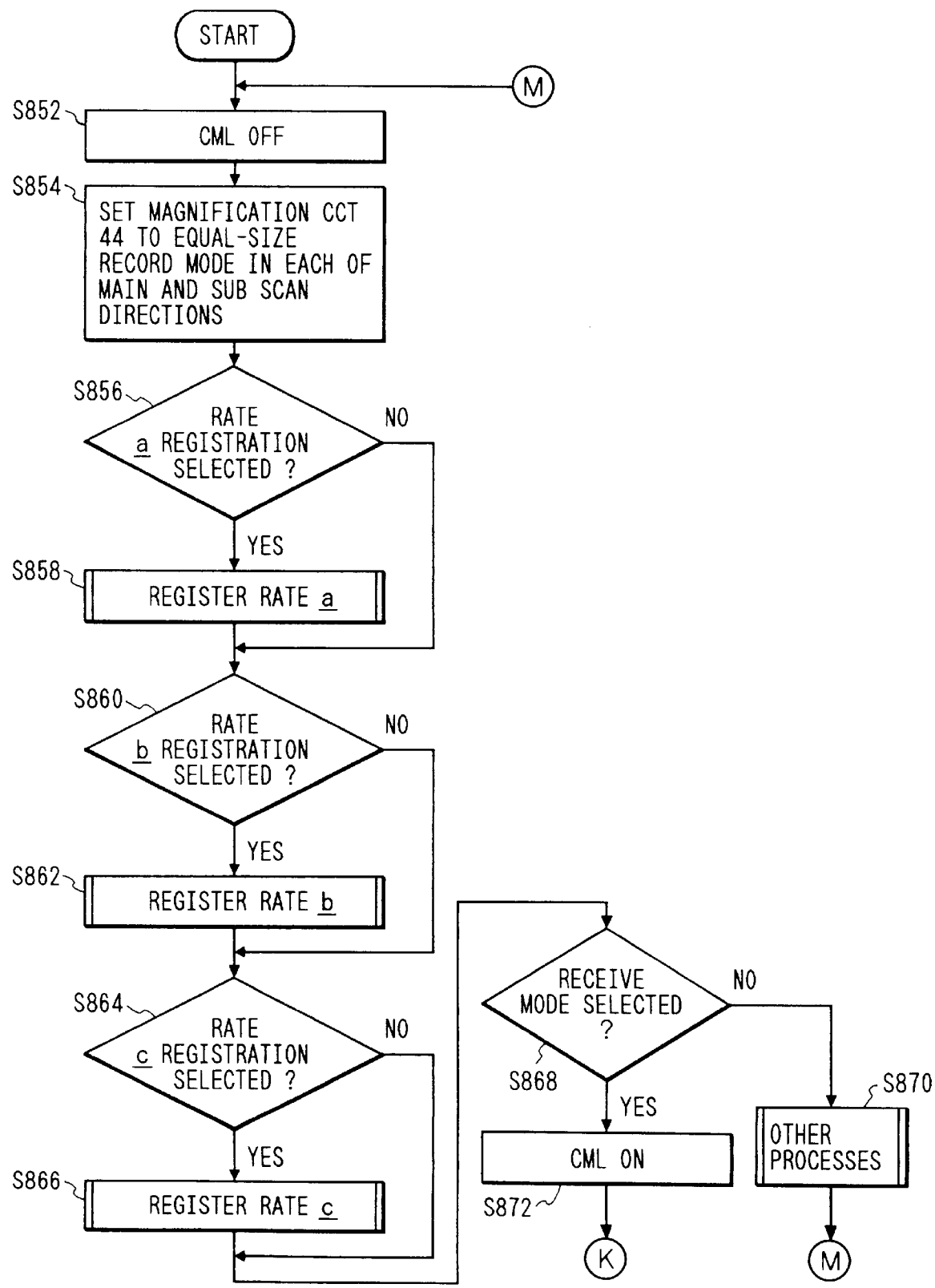
FIG. 22 is a flow chart showing an operation of the fifth embodiment.
Figure 23:
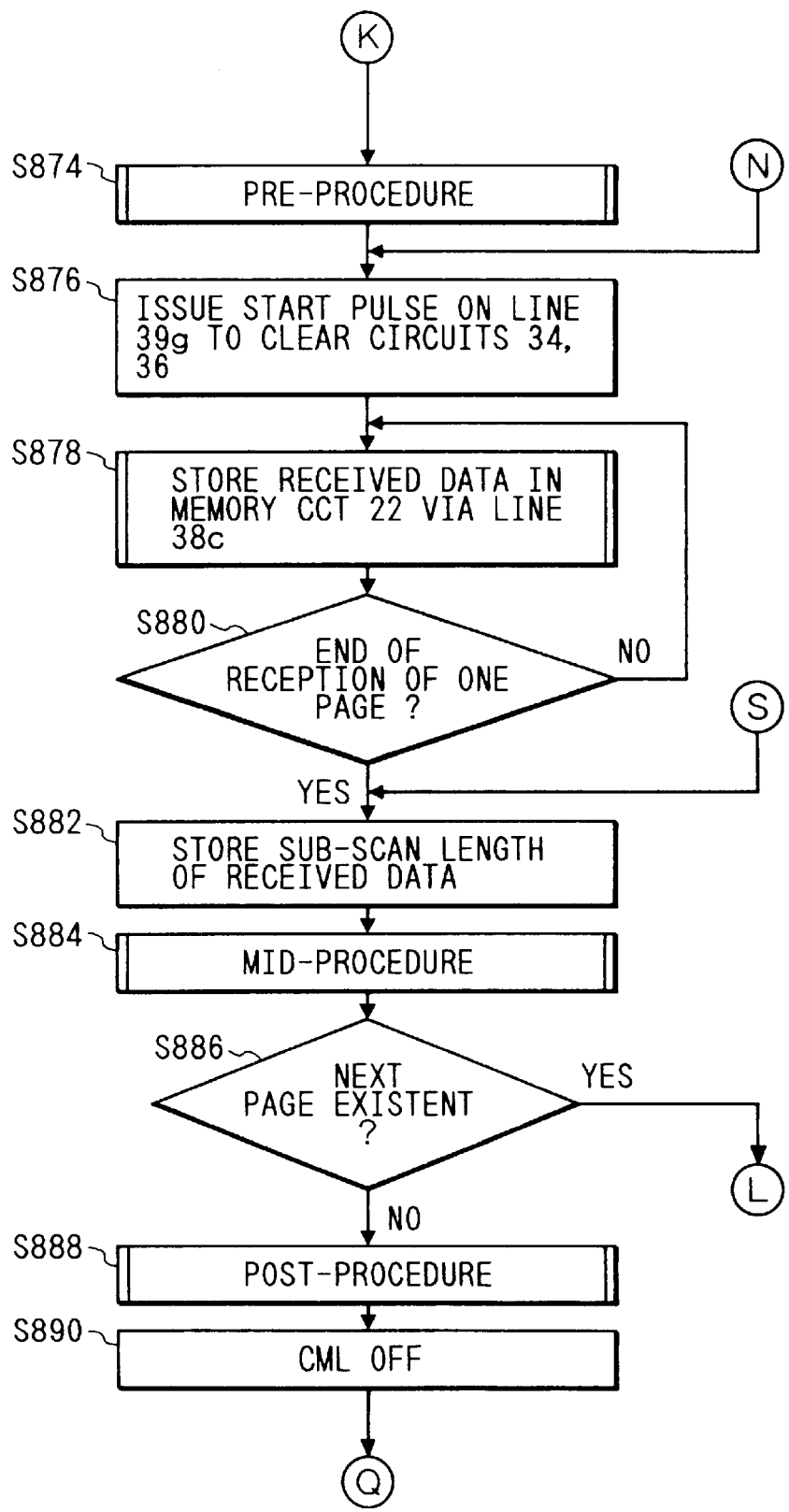
FIG. 23 is a flow chart showing an operation of the fifth embodiment.
Figure 24:
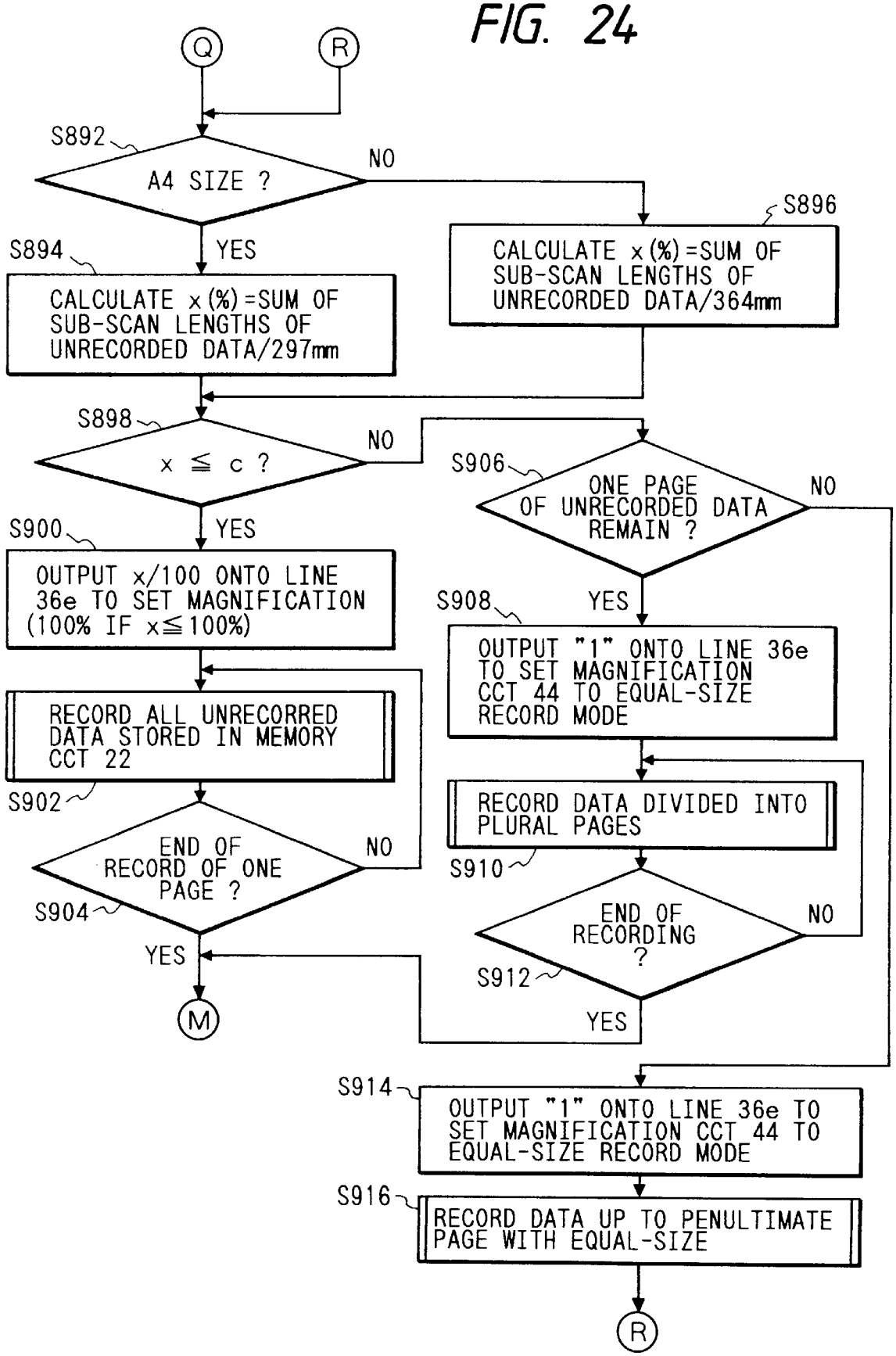
FIG. 24 is a flow chart showing an operation of the fifth embodiment.
Figure 25:
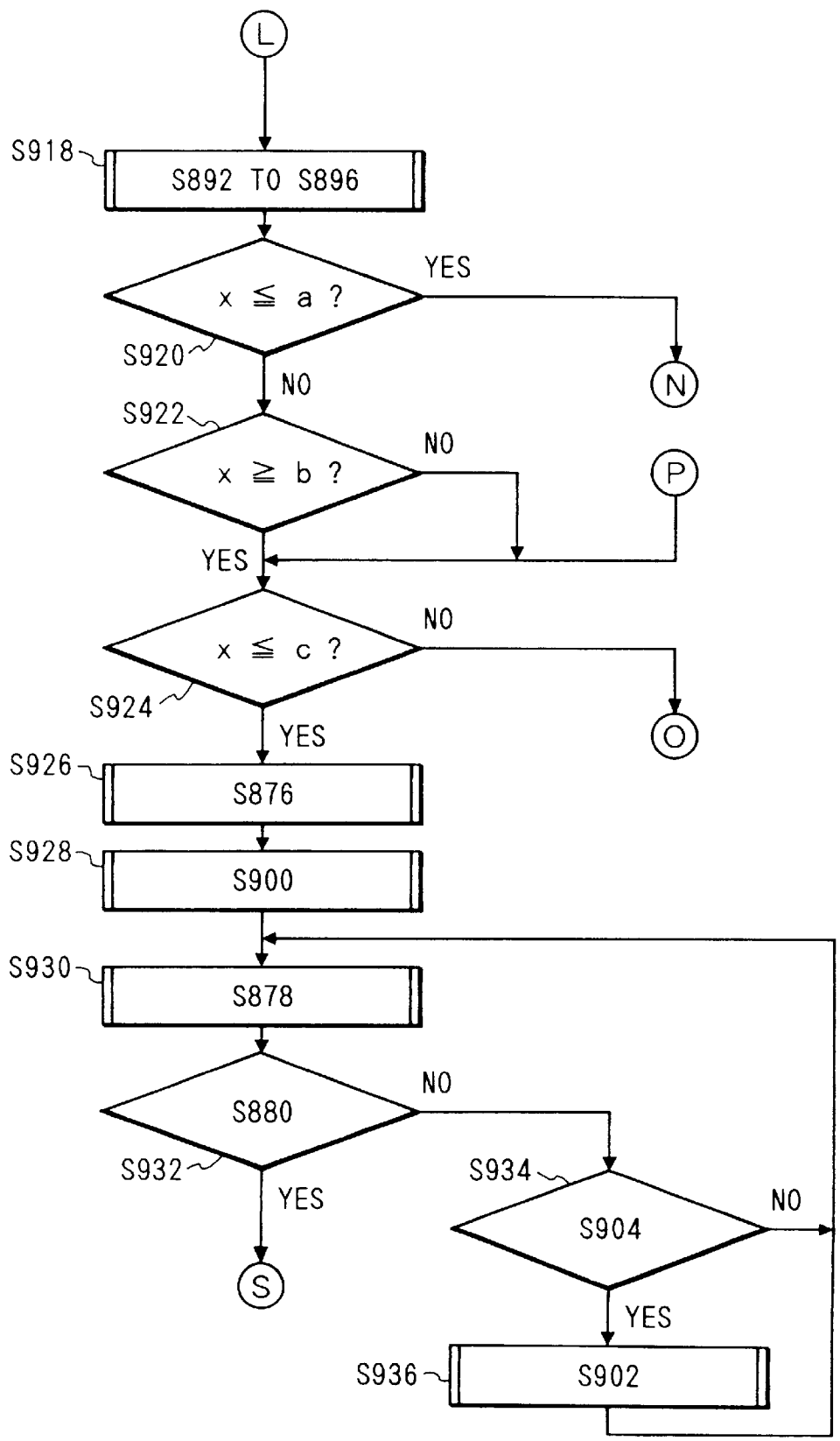
FIG. 25 is a flow chart showing an operation of the fifth embodiment.
Figure 26:
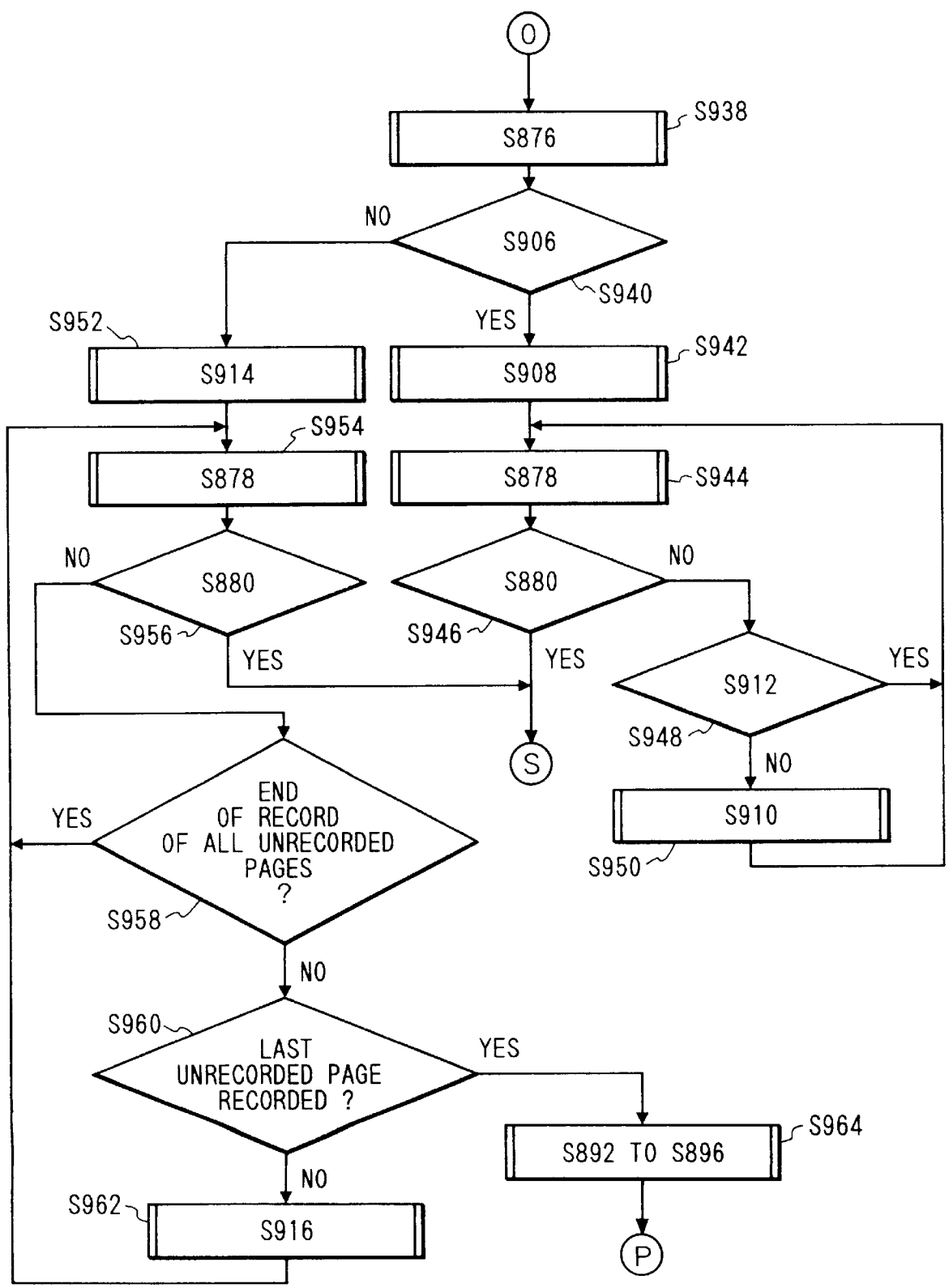
FIG. 26 is a flow chart showing an operation of the fifth embodiment.

FIG. 21 is a block diagram showing an arrangement of the fifth embodiment. Note that the same reference numerals in FIG. 21 denote the same parts in the third embodiment (FIG. 10), and a repetitive description thereof will be avoided.

A registration circuit 66 is a circuit for registering a fixed (or predetermined) rate a. When the fixed rate a is registered in the registration circuit 66, the fixed rate a is outputted onto a signal line 66a, and thereafter, a write pulse is generated onto a signal line 44g. When the predetermine rate a stored in the registration circuit 66 is read out, a read pulse is generated onto a signal line 44h. Thus, the registration circuit 66 outputs the stored fixed rate a onto the signal line 66a.

A registration circuit 68 is a circuit for registering a fixed (or predetermined) rate b. When the fixed rate b is registered in the registration circuit 68, the fixed rate b is outputted onto a signal line 68a, and thereafter, a write pulse is generated onto a signal line 44i. When the predetermine rate b stored in the registration circuit 68 is read out, a read pulse is generated onto a signal line 44j. Thus, the registration circuit 68 outputs the stored fixed rate b onto the signal line 68a.

A registration circuit 70 is a circuit for registering a fixed (or predetermined) rate c. When the fixed rate c is registered in the registration circuit 70, the fixed rate c is outputted onto a signal line 70a, and thereafter, a write pulse is generated onto a signal line 44k. When the predetermine rate c stored in the registration circuit 70 is read out, a read pulse is generated onto a signal line 44l. Thus, the registration circuit 70 outputs the stored fixed rate c onto the signal line 70a.

A console unit 72 has a ten-key unit, one-touch keys, abbreviated dial keys, a * key, a # key, registration buttons of the fixed rates a, b, and c, and the like, and when one of these keys is depressed, depression data is outputted onto a signal line 72a.

In the fifth embodiment, the controller 38 mainly executes the following control. When a reception operation is selected, the controller 38 causes the decoder 32 to decode received data while storing the received data in the memory circuit 22, and causes the counter circuit 36 to recognize the number of received lines in the sub-scan direction.

Upon completion of memory reception of one page, the controller 38 compares the sub-scan length of the currently received image with that of a recording paper sheet size. When the rate between the two lengths is equal to or smaller than the fixed rate a, the controller 38 starts memory reception of the next page, and stores the sub-scan length of the currently received page data.

Upon completion of memory reception of one page, when the rate as a result of the comparison is equal to or larger than the fixed rate b, the controller 38 starts the recording operation of the received page while executing memory reception of the next page.

In this case, when the rate is equal to or smaller than the fixed rate c, the controller 38 determines a recording magnification in the sub-scan direction (an equal-size in the main scan direction) on the basis of the sub-scan length transmitted from a sender, and the sub-scan length of a recording paper sheet; when the rate exceeds the fixed rate c, the controller 38 divisionally records the received image onto a plurality of pages with an equal-size.

When the rate is equal to or smaller than the fixed rate a upon completion of memory reception of one page, the sub-scan lengths of the previously received physical page and the currently received physical page are compared with that of a recording paper sheet size upon completion of memory reception of the next page. When the rate is still equal to or smaller than the fixed rate a, the controller 38 starts memory reception of the next page, and stores the sub-scan length of the currently received page data. Thereafter, the controller repeats the same operation as described above.

Upon completion of memory reception of the next page, when the rate becomes equal to or larger than the fixed rate b, the controller 38 starts the recording operation of the immediately preceding page and the currently received page while executing memory reception of the next page.

In this case, when the rate is equal to or larger than the fixed rate b, and is equal to or smaller than the fixed rate c, the controller determines a recording magnification in the sub-scan direction (an equal-size in the main scan direction) on the basis of the sub-scan length transmitted from a sender, and the sub-scan length of a recording paper sheet; when the rate exceeds the fixed rate c, the controller 38 divisionally records the received pages onto a plurality of physical pages of the sender.

For the last physical page of the sender, the controller determines a recording magnification in the sub-scan direction (an equal-size in the main scan direction) on the basis of the sub-scan length transmitted from a sender, and the sub-scan length of a recording paper sheet when the rate is equal to or smaller than the fixed rate c. When the rate exceeds the fixed rate c, the controller divisionally records the image of the last page onto a plurality of pages with an equal-size.

FIGS. 22 to 26 are flow charts showing an operation of this embodiment.

The controller 38 outputs a signal of signal level "0" onto the signal line 38a to turn off CML in step S852. In step S854, the controller 38 outputs signals "1" onto the signal lines 36d and 36e to set the magnification circuit 44 in an equal-size record mode in both the main scan and sub-scan directions.

In step S856, the controller 38 receives a signal on the signal line 72a to check if registration of the fixed rate a is selected from the console unit 72. If YES in step S856, the controller 38 registers the fixed rate a in step S858.

In step S860, the controller 38 receives a signal on the signal line 72a to check if registration of the fixed rate b is selected from the console unit 72. If YES in step S860, the flow advances to step S862 to register the fixed rate b.

In step S864, the controller 38 receives a signal on the signal line 72a to check if registration of the fixed rate c is selected from the console unit 72. If YES in step S864, the flow advances to step S866 to register the fixed rate c.

In step S868, the controller 38 checks if a receive mode is selected. If YES in step S868, the flow advances to step S872; otherwise, the flow advances to step S870 to execute other processes.

The controller 38 outputs a signal of signal level "1" onto the signal line 38a to turn on CML in step S872, and executes a pre-procedure in step S874.

In step S876, the controller 38 generates a start pulse onto the signal line 38g to clear the right/left edge black dot memory circuit 34 and the line counter circuit 36.

In step S878, the controller 38 stores received data in the memory circuit 22 via the control line 38c. In step S880, the controller 38 checks if reception for one page is completed. If NO in step S880, the flow returns to step S878; otherwise, the controller 38 calculates the sub-scan length of received data from the number of received lines outputted on the signal line 36b in consideration of the line density, and stores the calculated length, in step S882.

In step S884, the controller 38 executes a mid-procedure. In step S886, the controller 38 checks if the next page exists. If YES in step S886, the flow advances to step S918. However, if NO in step S886, the controller 38 executes a post-procedure in step S888, and outputs a signal of signal level "0" onto the signal line 38a to turn off CML in step S890.

In step S892, the controller 38 checks if the recording paper sheet size is the A4 or B4 size. If it is determined that the recording size is the A4 size, the flow advances to step S894; if it is determined that the recording size is the B4 size, the flow advances to step S896.

In step S894, the controller 38 divides the total of sub-scan lengths of unrecorded data (which may correspond to one page or a plurality of pages) with 297 mm (the sub-scan length of an A4-size recording paper sheet), and renders the quotient as x %.

In step S896, the controller 38 divides the total of sub-scan lengths of unrecorded data (which may correspond to one page or a plurality of pages) with 364 mm (the sub-scan length of a B4-size recording paper sheet), and renders the quotient as x %.

In step S898, the controller 38 checks if x % is equal to or smaller than c %. If YES in step S898, since a recording magnification in the sub-scan direction (an equal-size is set in the main scan direction) is determined on the basis of the sub-scan length (which may correspond to one page or a plurality of pages) transmitted from a sender, and the sub-scan length of a recording paper sheet size, and data are recorded at the determined magnification, the controller 38 outputs x/100 (when x % is equal to or smaller than 100%, it gives "100" as x) onto the signal line 36e to set a magnification in the sub-scan direction. Since an equal-size record mode is set in the main scan direction, the controller 38 keeps outputting "1" on the signal line 36d. If x % exceeds c %, the flow advances to step S906.

In step S902, the controller 38 records and outputs all unrecorded data stored in the memory circuit 22 by controlling the signal line 38c. In step S904, the controller 38 checks if recording for one page is completed. If NO in step S904, the flow returns to step S902; otherwise, the flow returns to step S852.

On the other hand, the controller 38 checks in step S906 if the number of unrecorded pages is 1. If YES in step S906, the flow advances to step S908; otherwise, the flow advances to step S914.

In step S908, the controller 38 outputs a signal "1" onto the signal line 36e to set the magnification circuit 44 in an equal-size record mode in the sub-scan direction. In step S910, the controller 38 divisionally records a single physical original page in the sender onto a plurality of pages via the signal line 38c. In step S912, the controller 38 checks if recording of all data is completed. If YES in step S912, the flow returns to S852; otherwise, the flow returns to step S910.

In step S914, the controller 38 outputs a signal "1" onto the signal line 36e to set the magnification circuit 44 in an equal-size record mode in the sub-scan direction.

Since data up to a page immediately preceding the last page in the transmission apparatus can be recorded on one page in the receiver, the controller 38 records the data up to a page immediately preceding the last page in an equal-size record mode in the sub-scan direction via the signal line 38c in step S916. Thereafter, the flow returns to step S892.

In step S918, the same control as in steps S892 to S896 is executed to calculate x % described above by dividing the sub-scan length of unrecorded data with the sub-scan length of a recording paper sheet size in accordance with the recording paper sheet size.

In step S920, the controller 38 checks if x % is equal to or smaller than the fixed rate a %. If YES in step S920, the currently received sub-scan length is stored, and memory reception of the next page is started. For this purpose, the flow returns to step S876.

If x % exceeds the fixed rate a %, the controller 38 checks if x % is equal to or smaller than the fixed rate b %. In this embodiment, even when x % is equal to or larger than fixed rate b %, or even when x % is smaller than the fixed rate b %, the flow advances to step S924.

In step S924, the controller 38 checks if x % is equal to or smaller than the fixed rate c %. If YES in step S924, the controller determines a recording magnification in the sub-scan direction (sets an equal-size record mode in the main scan direction) on the basis of the sub-scan length transmitted from the sender and the sub-scan length of a recording paper sheet size while executing memory reception of the next page. At this time, the flow advances to step S926. If x % exceeds the fixed rate c %, the controller divisionally records data onto a plurality of pages with an equal-size while executing memory reception of the next page.

In step S926, the same control as in step S876 is executed. That is, the controller generates a start pulse onto the signal line 38g to clear the right/left edge black dot memory circuit 34 and the line counter circuit 36.

In step S928, the same control as in step S900 is executed. That is, the controller outputs x/100 (when x is equal to or smaller than 100, it outputs 100) onto the signal line 36e to set a magnification in the sub-scan direction.

In step S930, the same control as in step S878 is executed. That is, the controller stores received data in the memory circuit 22 via the control line 38c.

In step S932, the same control as in step S880 is executed. If reception for one page is not completed, the flow returns to step S882; otherwise, the flow advances to step S934. In step S934, the same control as in step S904 is executed. If recording for one page is completed, the flow advances to step S930; otherwise, the flow advances to step S936.

In step S936, the same control as in step S902 is executed. That is, the controller records all unrecorded data stored in the memory circuit 22 by controlling the signal line 38c. In step S938, the same control as in step S876 is executed. That is, the controller generates a start pulse onto the signal line 38g to clear the right/left edge black dot memory circuit 34 and the line counter circuit 36.

In step S940, the same control as in step S906 is executed. If the number of unrecorded pages is 1, the flow advances to step S942; otherwise, the flow advances to step S952.

In step S942, the same control as in step S908 is executed. That is, the controller outputs a signal "1" onto the signal line 36e to set the magnification circuit 44 in an equal-size record mode in the sub-scan direction.

In step S944, the same control as in step S878 is executed. That is, the controller stores received data in the memory circuit 22 via the control line 38c. In step S946, the same control as in step S880 is executed. If reception for one page is completed, the flow returns to step S882; otherwise, the flow advances to step S948.

In step S948, the same control as in step S912 is executed. If recording for all data is completed, the flow returns to step S944; otherwise, the flow advances to step S950. In step S950, the same control as in step S910 is executed. That is, the controller divisionally records a single physical original image of the sender onto a plurality of pages via the signal line 38c.

In step S952, the same control as in step S914 is executed. That is, the controller outputs a signal "1" onto the signal line 36e to set the magnification circuit 44 in an equal-size record mode in the sub-scan direction. In step S954, the same control as in step S878 is executed, and the controller stores received data in the memory circuit 22 via the control line 38c.

In step S956, the same control as in step S880 is executed. If reception for one page is not completed, the flow advances to step S958; otherwise, the flow returns to step S882.

In step S958, the controller 38 checks if recording of all unrecorded pages is completed. If YES in step S958, the flow returns to step S954; otherwise, the flow advances to step S960.

In step S960, the controller 38 checks if the last unrecorded page is recorded. If YES in step S960, the flow advances to step S964; otherwise, the flow advances to step S962.

In step S962, the same control as in step S916 is executed. That is, the controller records pages up to a page immediately before the last page in the transmission apparatus in an equal-size record mode in the sub-scan direction via the signal line 38c.

In step S964, the same control as in steps S892 to S896 is executed. That is, the controller calculates x % by dividing the total of sub-scan lengths of unrecorded data with the sub-scan length of a recording paper sheet size in accordance with the recording paper sheet size.

As described above, according to the fifth embodiment, when images each having a size about half of the sub-scan length of a recording paper sheet size are received, a plurality of received pages can be recorded on a single recording paper sheet, thus allowing effective utilization of recording paper sheets.

In the fifth embodiment, when reduction-factor recording is performed, a recording magnification may be recorded on a recording paper sheet.

In the fifth embodiment, an image is recorded in a reduction mode only in the sub-scan direction. However, an image may be recorded in a reduction mode at the same reduction factor in both the main scan and sub-scan directions.

In the fifth embodiment, upon completion of memory reception of one page, the sub-scan length of data received so far is compared with a recording paper sheet size. When a rate obtained as a result of comparison is equal to or smaller than the fixed rate a, a recording operation is not started, and only memory reception of the next page is executed. When the rate exceeds the fixed rate a, and is equal to or smaller than the fixed rate c, a recording magnification in the sub-scan direction is determined on the basis of a sub-scan length transmitted from a sender, and the sub-scan length of the recording paper sheet size, and a recording operation is performed at the determined magnification simultaneously with memory reception of the next page. When the rate exceeds the fixed rate c, the received data are divisionally recorded onto a plurality of pages with an equal-size simultaneously with memory reception of the next page. However, in this case, when the rate exceeds the fixed rate a, and is equal to or smaller than the fixed rate b, data for one page may be recorded with an equal-size while executing memory reception. More specifically, if NO is determined in step S922, the flow can advance to step S926.

In the fifth embodiment, a recording method based on the sub-scan length of received data and the sub-scan length of a recording paper sheet size is proposed. However, a recording method may be proposed on the basis of the sub-scan length of an effective data area of sending data, and the sub-scan length of a recording paper sheet size. More specifically, in step S822, in place of storing the sub-scan length of received data, the effective data length in the sub-scan length, which length is outputted onto the signal line 36a, may be recorded, and thereafter, a recording size may be determined based on the recorded sub-scan length.

In the fifth embodiment, a recording method based on the sub-scan length of received data and the sub-scan length of a recording paper sheet size is proposed. However, a recording method may be proposed on the basis of the sub-scan length of received data, and a recordable sub-scan length. More specifically, in step S894, a recordable sub-scan length (e.g., 287 mm, i.e., 5-mm areas at the leading and trailing ends are determined as unrecordable areas) of an A4-size recording paper sheet may be used in place of 297 mm. Also, in step S896, a recordable sub-scan length (e.g., 354 mm, i.e., 5-mm areas at the leading and trailing ends are determined as unrecordable areas) of a B4-size recording paper sheet may be used in place of 364 mm.

In the fifth embodiment, an image is recorded in a reduction mode in only the sub-scan direction. However, upon execution of reduction-factor recording in the sub-scan direction, an image may be recorded at the same reduction factor in the main scan direction.

In the fifth embodiment, only the sub-scan direction is considered. However, the reduction factors may be determined in consideration of both the sub-scan and main scan directions, and recording may be performed in both the directions using a smaller one of the reduction factors.

Furthermore, when a predetermined number or more of lines including all white data appear, the following all-white line data may be deleted without being stored in a memory.

The sixth embodiment of the present invention will be described below.

When a conventional facsimile apparatus has fixed-size paper sheets, e.g., A4- and B4-size paper sheets, and receives an image of an A5- or B5-size original, it records the received image on an A4-size recording paper sheet. For this reason, a large blank portion is formed on the recording paper sheet, thus wasting the recording paper sheets.

Thus, in the sixth embodiment, when images each having a size about half of a fixed-size paper sheet are received, the images are H/V-converted, and two received images are simultaneously outputted onto a single recording paper sheet, thus saving the recording paper sheets.

Figure 27:
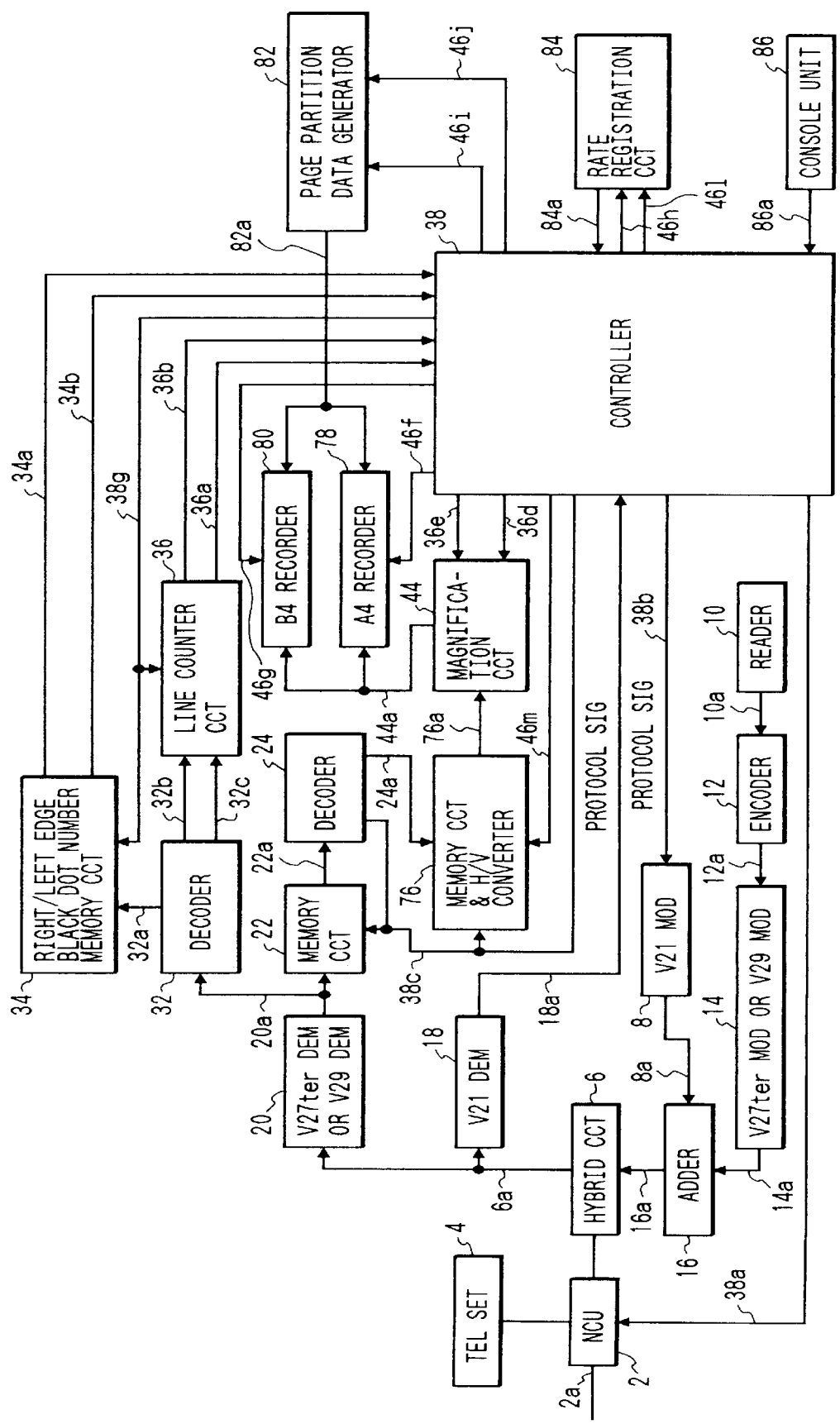
FIG. 27 is a block diagram showing an arrangement according to the sixth embodiment of the present invention.
Figure 28:
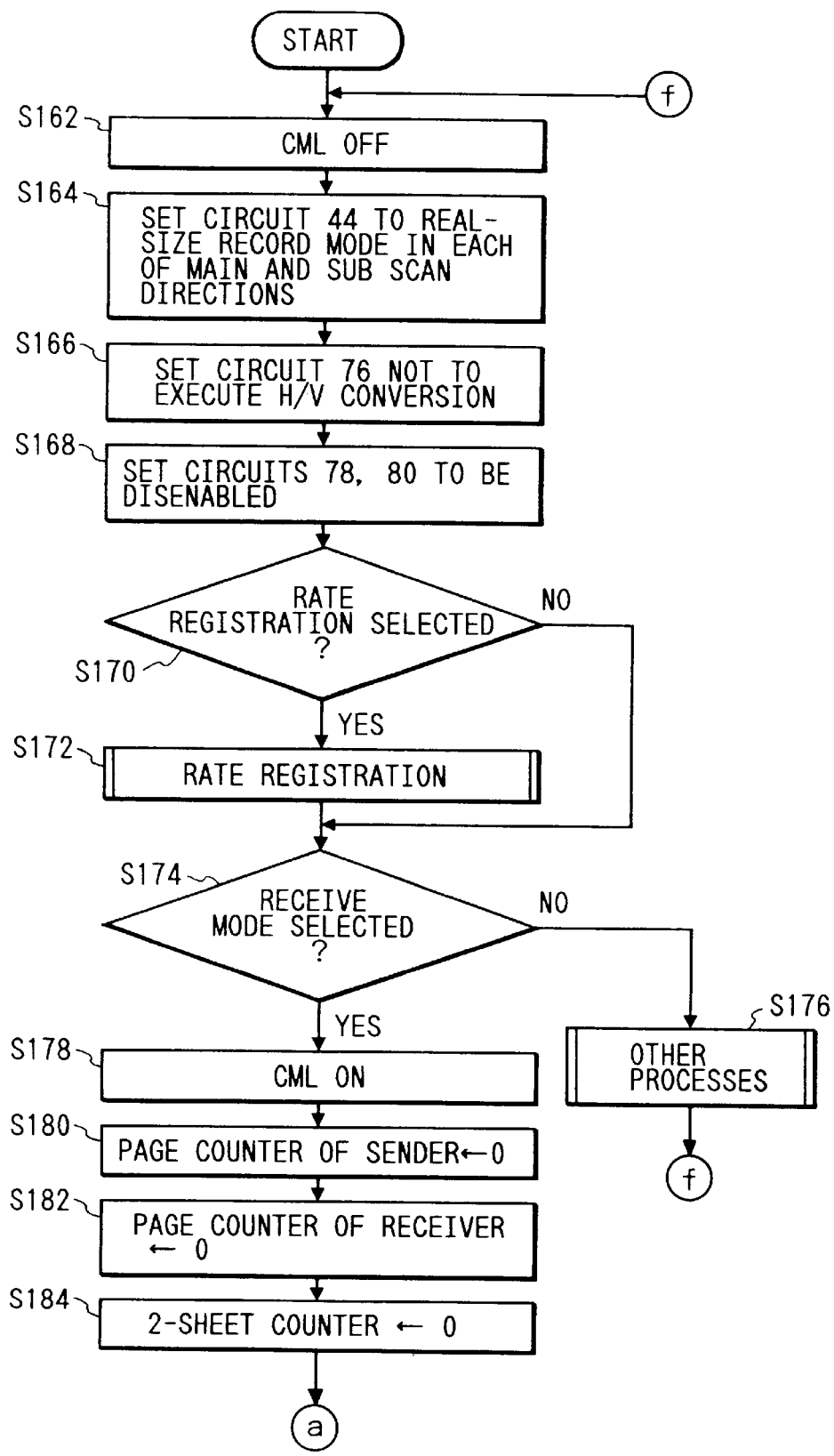
FIG. 28 is a flow chart showing an operation of the sixth embodiment.
Figure 29:
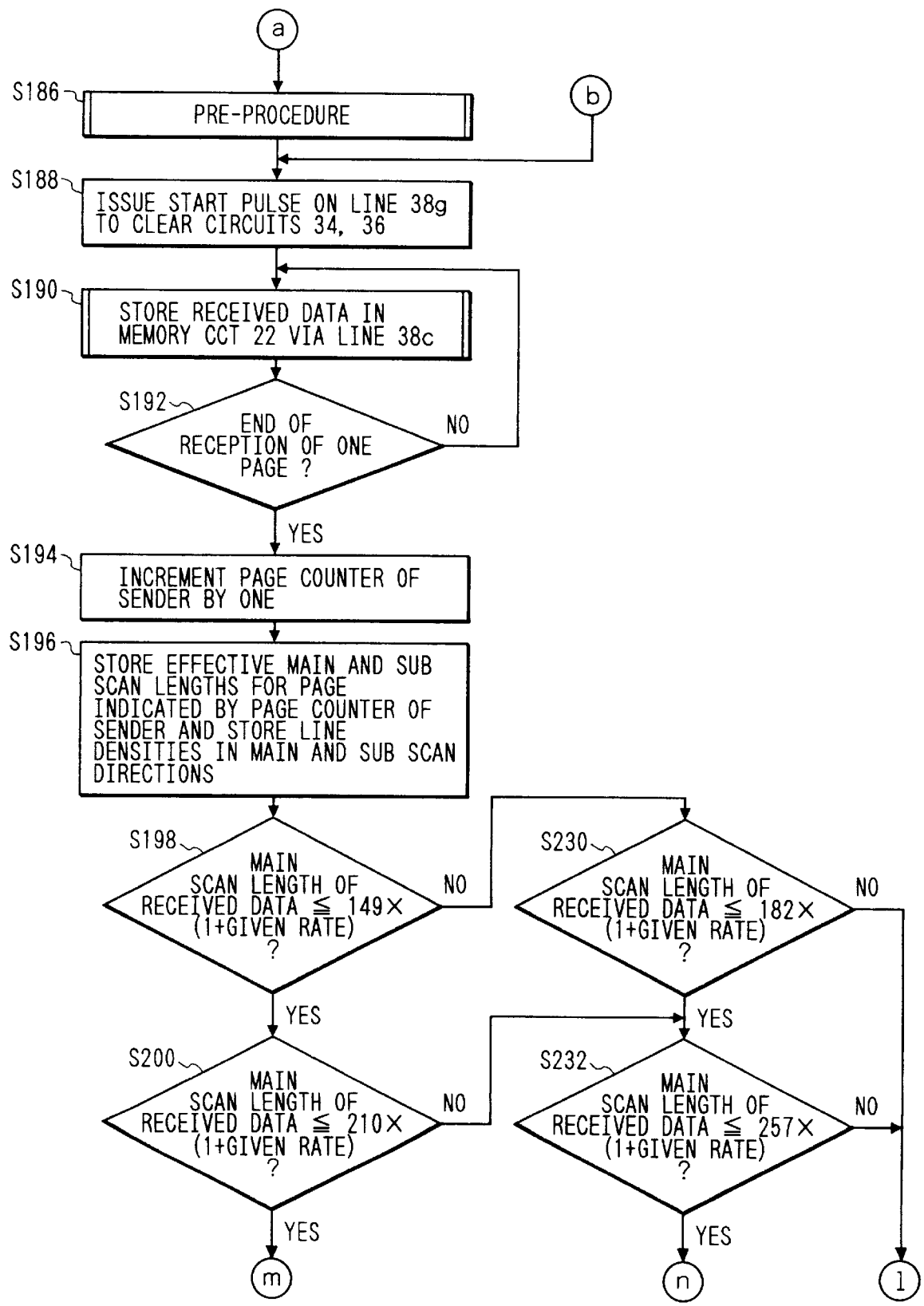
FIG. 29 is a flow chart showing an operation of the sixth embodiment.
Figure 30:
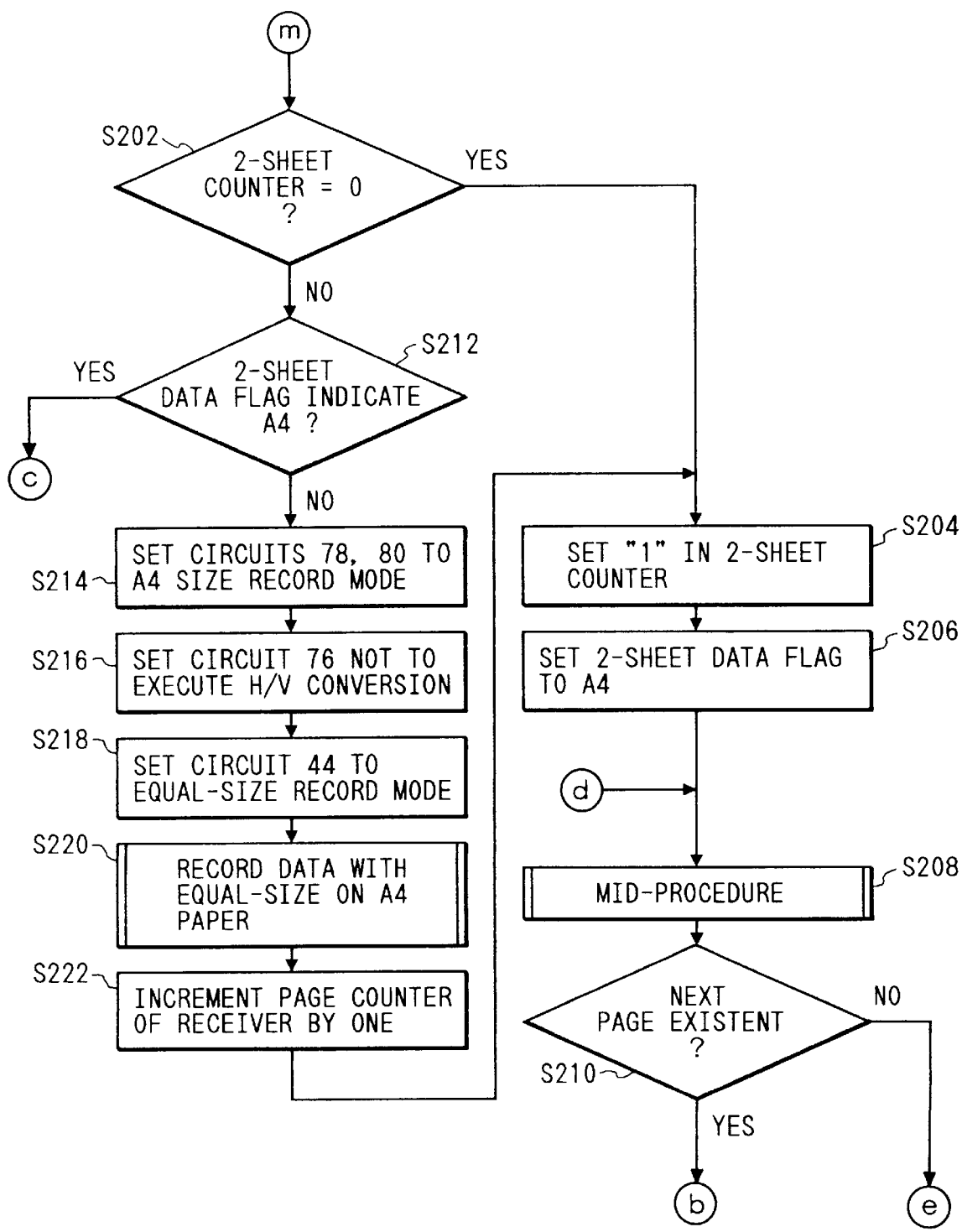
FIG. 30 is a flow chart showing an operation of the sixth embodiment.
Figure 31:
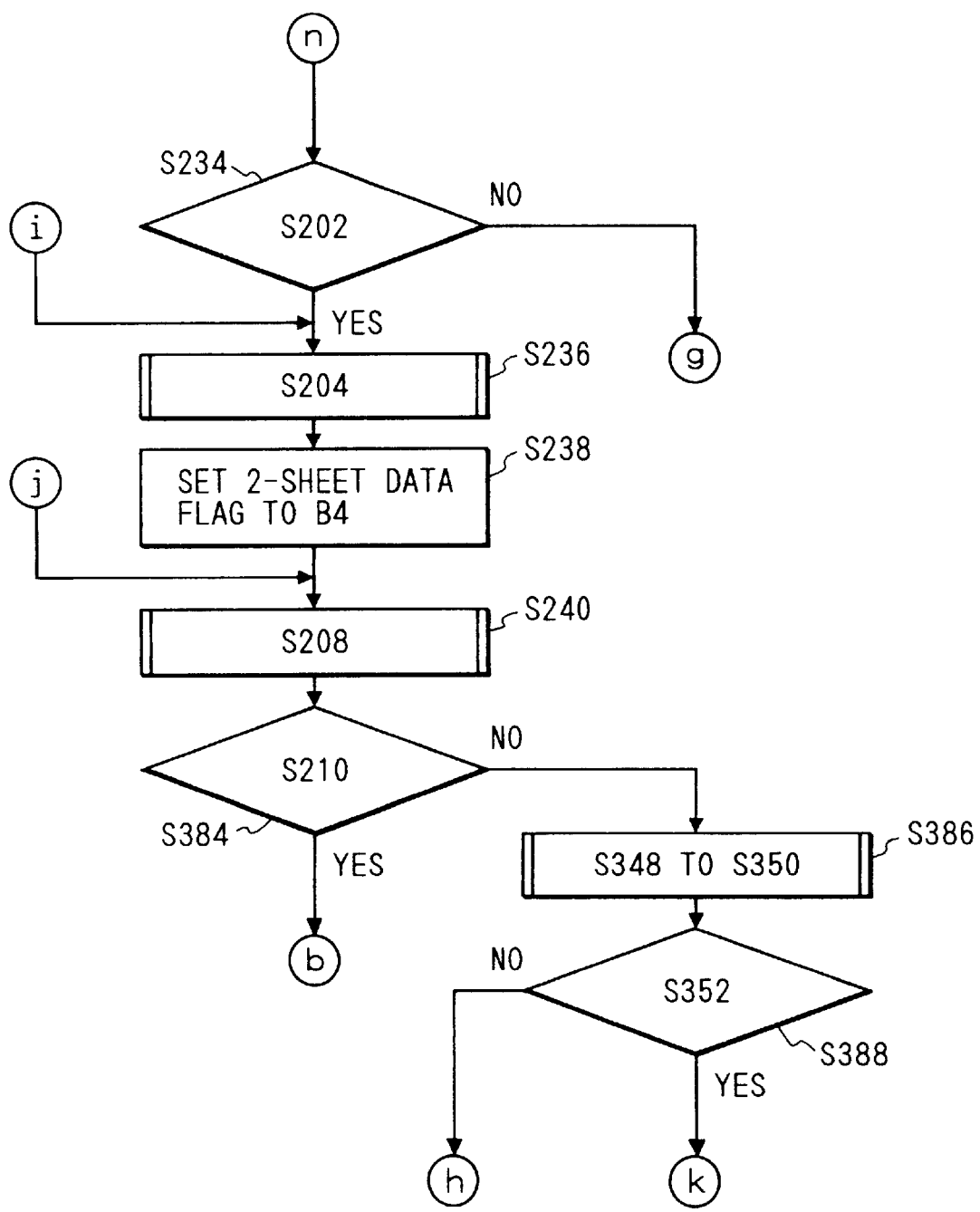
FIG. 31 is a flow chart showing an operation of the sixth embodiment.
Figure 32:
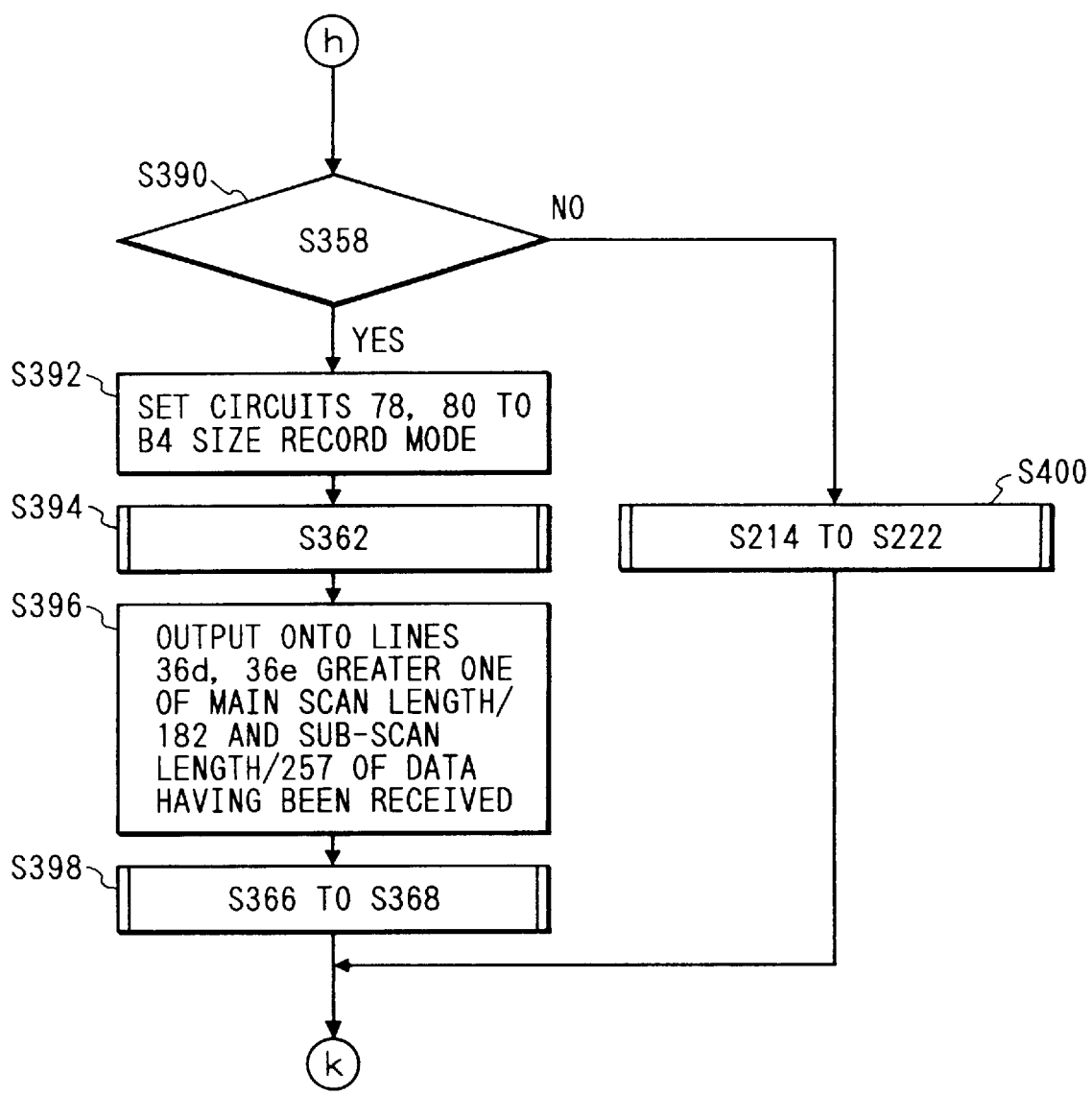
FIG. 32 is a flow chart showing an operation of the sixth embodiment.
Figure 33:
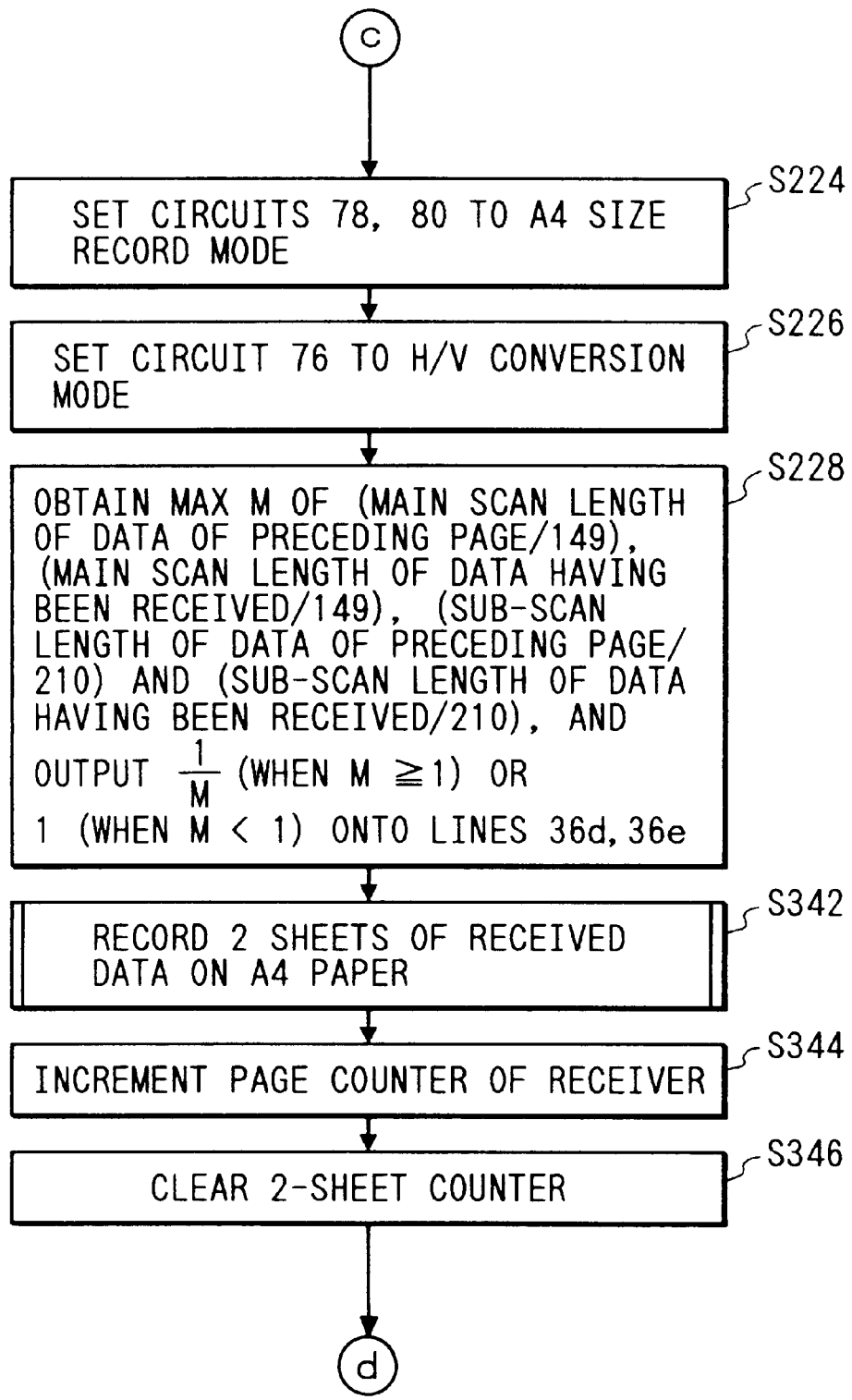
FIG. 33 is a flow chart showing an operation of the sixth embodiment.
Figure 34:
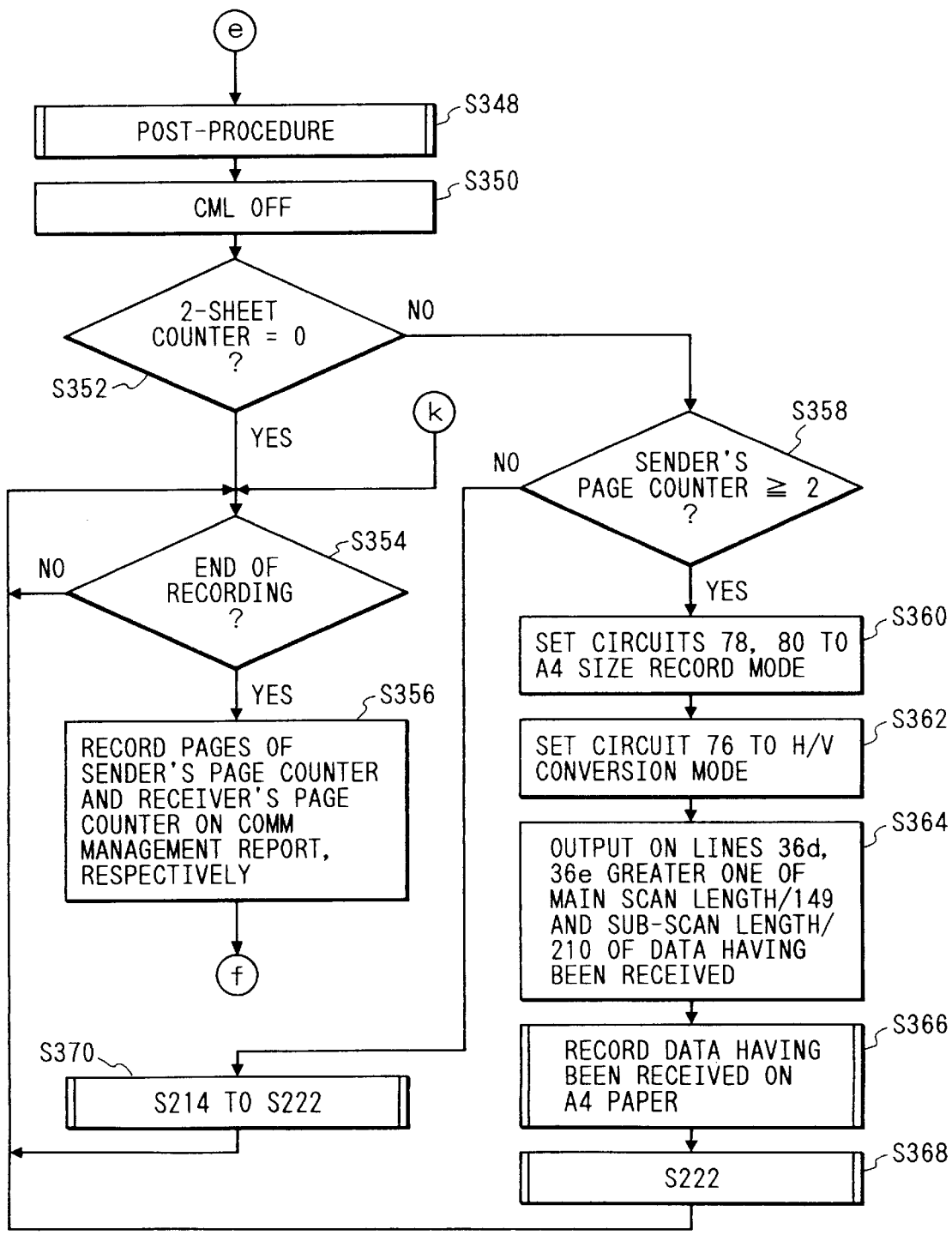
FIG. 34 is a flow chart showing an operation of the sixth embodiment.
Figure 35:
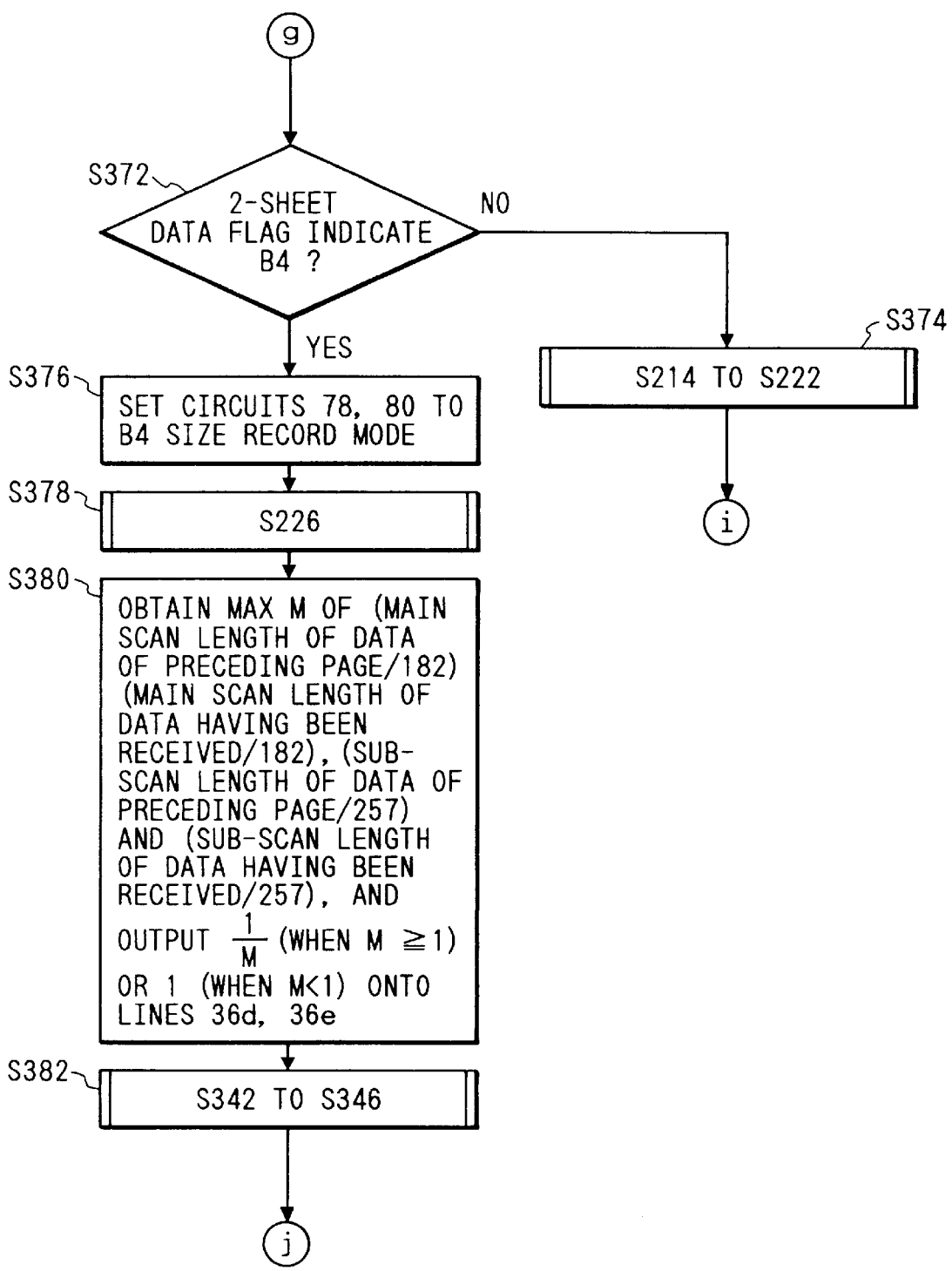
FIG. 35 is a flow chart showing an operation of the sixth embodiment.
Figure 36:
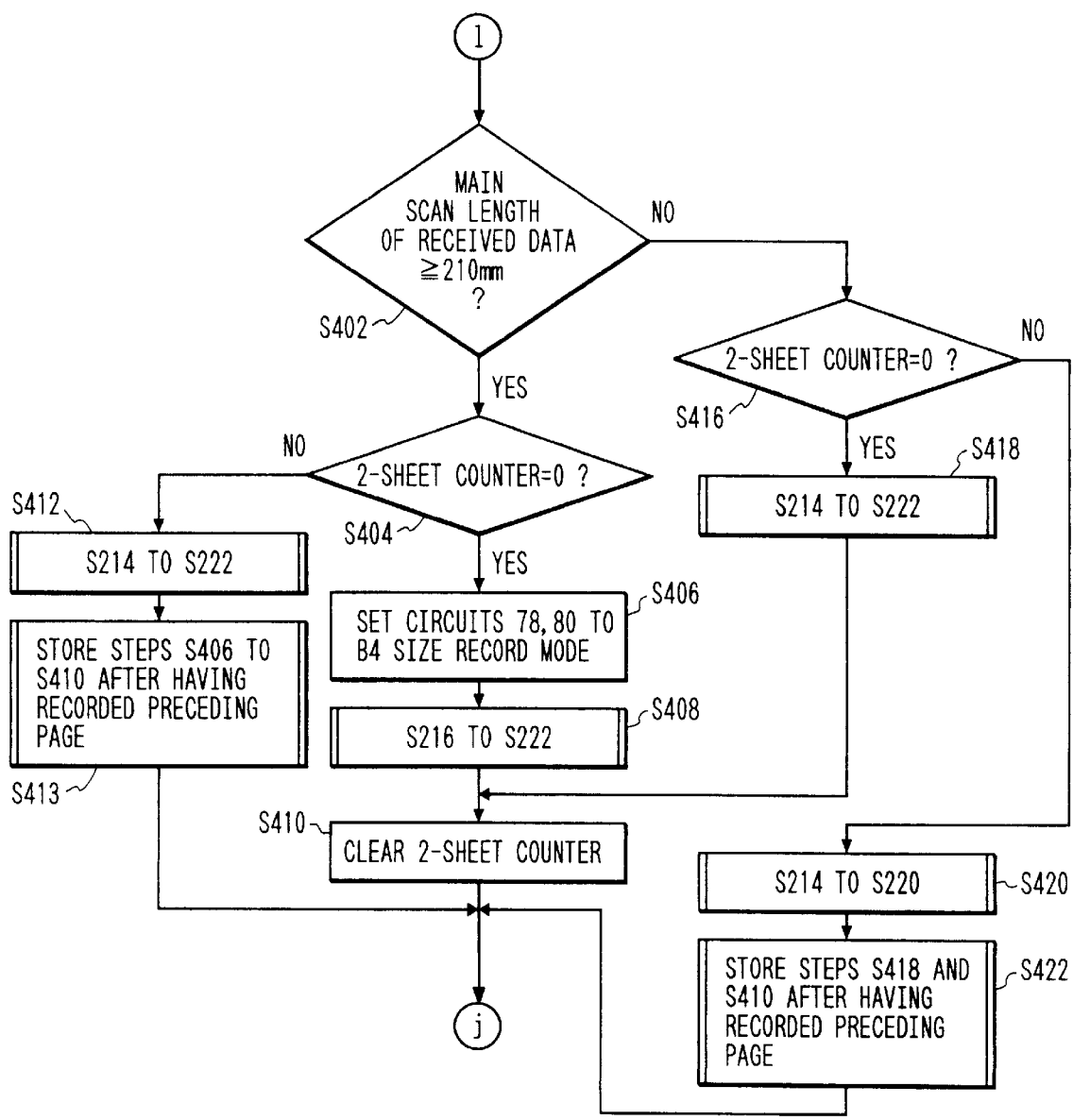
FIG. 36 is a flow chart showing an operation of the sixth embodiment.

FIG. 27 is a block diagram showing an arrangement of the sixth embodiment. Note that the same reference numerals in FIG. 27 denote the same parts as in the third embodiment, and a repetitive description thereof will be omitted.

Referring to FIG. 27, a memory circuit & H/V converter 76 is arranged between the decoder 24 and the magnification circuit 44. The memory circuit & H/V converter 76 receives data outputted onto the signal line 24a under the control of a signal on the signal line 38c. When a signal "0" is outputted onto a signal line 46m, the memory circuit & H/V converter 76 directly outputs received data onto a signal line 76a; when a signal "1" is outputted onto the signal line 46m, it H/V(horizontal-to-vertical or vertical-to-horizontal)-converts received data, and outputs the converted data onto the signal line 76a. In this H/V conversion, since the resolutions in the main scan and sub-scan directions are different from each other, resolution conversion is also executed.

An A4 recorder 78 is a circuit for receiving a signal on the signal line 44a and recording an A4-size image when a signal "1" is outputted onto a signal line 46f. A B4 recorder 80 is a circuit for receiving a signal on the signal line 44a and recording a B4-size image when a signal "1" is outputted onto a signal line 46g.

A page partition data generator 82 is a circuit for generating page partition data. When a signal "0" is generated onto a signal line 46j, and a start pulse is generated onto a signal line 46i, the generator 82 outputs A4-size page partition data onto a signal line 82a; when a signal "1" is generated onto the signal line 46j, and a start pulse is generated onto the signal line 46i, the generator 82 outputs B4-size page partition data onto the signal line 82a.

A rate registration circuit 84 is a circuit for registering an allowable value (i.e., a fixed or predetermined rate) of the size of a received original when two received data are H/V-converted, and the converted data are outputted onto a single recording paper sheet. When the fixed rate is registered, the fixed rate is outputted onto a signal line 84a, and thereafter, a write pulse is outputted onto a signal line 46h. When the registered fixed rate is read out, a read pulse is outputted onto a signal line 46l, thereby outputting the registered fixed rate onto the signal line 84a.

A console unit 86 has a ten-key unit, one-touch keys, abbreviated dial keys, a * key, a # key, a registration button of the fixed rate, and the like, and outputs depression data of these keys onto a signal line 86a.

In the sixth embodiment, the controller 38 mainly executes the following processes. When a reception operation is selected, the controller 38 causes the decoder 32 to decode received data while storing the received data in the memory circuit 22, causes the counter circuit 36 to calculate the effective data length in the sub-scan direction, and causes the memory circuit 34 to calculate the effective data length in the main scan direction. In this case, as the effective data length, an area including black data is assumed in binary recording.

When the effect data length, in the main scan direction, of received page data is about half of the sub-scan length of either of preset fixed-size recording paper sheets (e.g., A4- and B4-size recording paper sheets), and the effective data length, in the sub-scan direction, of the received page data is about half of the length, in the main scan direction, of the determined recording paper sheet size, the controller subsequently executes memory reception of the next page.

When the effective data length, in the main scan direction of the next received page data is about half of the sub-scan length of the recording paper sheet, and the effective data length, in the sub-scan direction, of the received page data is about half of the length, in the main scan direction, of the recording paper sheet size, the controller controls to H/V-convert and record the received data of the immediately preceding page, and to insert a page partition line. Subsequently, the controller controls to H/V-convert and record the received data of the next page. FIGS. 37A and 37B show an example of such a recording operation.

Referring to FIGS. 37A and 37B, when, for example, two sheets of B5-size data are sent, and A4- and B4-size cut recording paper sheets are available, the two sheets of B5-size data are recorded as one page on a B4-size recording paper sheet, allowing effective use of recording paper sheets. Although not described in detail here, it is important to independently count communication page numbers in a sender and a receiver, and to record the count results on a communication result report. When the receiver requests to re-send a certain page to the sender, it must inform the page number in the sender.

In the above description, "about half" means that two pages of received data to be recorded on one page are allowed to exceed the half size within a range of a fixed rate, a reduction factor (1 when the magnification is equal to or larger than 1) is determined based on the maximum rate in the main scan and sub-scan directions of the two pages of received data, and the two pages of received data are reduced at the same determined reduction factor, and are recorded on a single recording paper sheet.

When two pages of received data are continuously H/V-converted, and they cannot be recorded on a single recording paper sheet, they are recorded on two pages without executing H/V conversion. When a plurality of pages are sent, the physical last page is H/V-converted and recorded on a single page (in this case, the last page is preferably H/V-converted and recorded on the upper half of a recording paper sheet since it is easy to see in association with precious pages).

FIGS. 28 to 36 are flow charts showing an operation of this embodiment.

In step S162, the controller 38 outputs a signal of signal level "0" onto the signal line 38a to turn off CML. In step S164, the controller 38 outputs signals "1" onto both the signal lines 36d and 36e to set the magnification circuit 44 in an equal-size record mode in both the main scan and sub-scan directions.

In step S166, the controller 38 outputs a signal of signal level "0" onto the signal line 46m to inhibit an H/V conversion mode of received data. In step S168, the controller 38 outputs signals of signal level "0" onto the signal lines 46f and 46g to disable the recording operations of both the A4 and B4 recorders 78 and 80.

In step S170, the controller 38 receives data from the console unit 86 to check if registration of the above-mentioned fixed rate is selected. If YES in step S170, the flow advances to step S172 to register the fixed rate in the registration circuit 84.

In step S174, the controller 38 checks if a receive mode is selected. If YES in step S174, the flow advances to step S178; otherwise, the controller executes other processes (S176).

The controller 38 outputs a signal of signal level "1" onto the signal line 38a to turn on CML in step S178, sets "0" in a page counter of a sender in step S180, and sets "0" in a page counter of a receiver in step S182.

In step S184, the controller 38 clears a 2-sheet counter for H/V conversion. This counter is set with "1" when data for the first page have already stored in the memory.

The controller 38 executes a pre-procedure in step S186, a nd generates a start pulse onto the signal line 38g in step S188 to clear the memory circuit 34 for measuring the effective length in the main scan direction, and the counter circuit 36 for measuring the effective length in the sub-scan direction.

In step S190, the controller 38 stores received data in the memory circuit 22 via the control line 38c. In step S192, the controller 38 checks if reception for one page is completed. If NO in step S192, the flow returns to step S190; otherwise, the controller 38 increments the content of the page counter in the sender by one in step S194.

In step S196, the controller 38 stores the main scan length (obtained by data on the signal line 34b–data on the signal line 34a), and the sub-scan length (based on data on the signal line 36a) of the effective received data in correspondence with the content of the page counter in the sender. Also, the controller stores the line densities in the main scan and sub-scan directions at the same time since these densities are required in H/V conversion.

In step S198, the controller 38 checks if the main scan length of received data is equal to or smaller than (149 mm=the length half of the sub-scan length of an A4-size recording paper sheet)×(1+the fixed or given rate stored in the circuit 84). If YES in step S198, the flow advances to step S200; otherwise, the flow advances to step S230. In step S200, the controller 38 checks if the sub-scan length of received data is equal to or smaller than (210 mm=main scan length of an A4-size recording paper sheet)×(1+the fixed or given rate). If YES in step S200, the flow advances to step S202; otherwise, the flow advances to step S232.

If YES in both steps S198 and S200, it is determined that the effective received data roughly have an A5 size. Therefore, when two pages of such data are continuously received, these data are H/V-converted and recorded on a single A4-size cut sheet, and a page partition line is inserted between these two pages of data.

In step S202, the controller 38 checks if the content of the 2-sheet counter is 0, i.e., if received data to be H/V-converted are stored in the memory. If YES in step S202, the controller sets "1" in the 2-sheet counter (S204), and stores "A4" in a 2-sheet data flag (S206). This indicates that data to be H/V-converted and recorded on a half portion of an A4-size sheet are stored in the memory circuit 22. If NO in step S202, the flow advances to step S212.

In step S208, the controller 38 executes a mid-procedure. In step S210, the controller 38 checks if the next page exists. If YES in step S210, the flow returns to step S188; otherwise, the flow advances to step S348.

On the other hand, the controller 38 checks in step S212 if the 2-sheet data flag indicates "A4", i.e., if data stored in the memory circuit 22 are data to be H/V-converted and recorded on a half portion of an A4-size sheet. If YES in step S212, the flow advances to step S224, and the controller 38 records the two pages of received data on a single A4-size recording paper sheet (cut sheet).

If the two-sheet flag indicates "B4", the flow advances to step S214, and the data stored in the memory is recorded on an A4-size recording paper sheet with an equal-size without H/V conversion (steps S214 to S220).

In step S222, the controller 38 increments the content of the page counter in the receiver by one. In step S224, the controller 38 outputs a signal of signal level "1" onto the signal line 46f, and outputs a signal of signal level "0" onto the signal line 46g, thereby selecting recording on an A4-size recording paper sheet.

In step S226, the controller 38 outputs a signal of signal level "1" onto the signal line m to set the circuit 44 in an H/V conversion mode. In this case, since the line densities in the main scan and sub-scan directions are reversed, the circuit 44 executes resolution conversion.

In step S228, the controller 38 calculates a maximum value of (the main scan length of received data of the immediately preceding page/149 mm=half of the sub-scan length of an A4 recording paper sheet size), (the main scan length of currently received data/149 mm=half of the sub-scan length of the A4 recording paper sheet size), (the sub-scan length of received data of the immediately preceding page/210 mm=the main scan length of the A4 recording paper sheet size), and (the sub-scan length of currently received data/210 mm=the main scan length of the A4 recording paper sheet size). When the maximum value is equal to or larger than 1, the controller 38 outputs a reciprocal number of the maximum value onto the signal lines 36d and 36e; when the maximum value is smaller than 1, it outputs "1" onto the signal lines 36d and 36e, thereby setting a magnification. In this case, the two pages of received data to be recorded on a single recording paper sheet are recorded at the same magnification in both the main scan and sub-scan directions.

In step S230, the controller 38 checks if the main scan length of received data is equal to or smaller than (182 mm=half of the sub-scan length of a B4 recording paper sheet)×(1+the fixed or given rate). If YES in step S230, the flow advances to step S232; otherwise, the flow advances to step S402. In step S402, the data is recorded with an equal-size without H/V conversion.

In step S232, the controller 38 checks if the sub-scan length of received data is equal to or smaller than (257 mm=the main scan length of a B4-size recording paper sheet)×(1+the fixed or given rate). If YES in step S230, it is determined that the effective received data have the B5 size. Therefore, when two pages of such data are continuously received, these data are H/V-converted and recorded on a B4-size cut sheet, and a page partition line is inserted between the two pages. However, if NO in step S230, the flow advances to step S402.

In step S234, the same control as in step S202 is executed. If the content of the 2-sheet counter is "0", the flow advances to step S236; otherwise, the flow advances to step S372.

In step S236, the same control as in step S204 is executed to set "1" in the 2-sheet counter, and in step S238, the controller sets "B4" in the 2-sheet data flag so as to represent that data to be H/V-converted and recorded on a half portion of a B4-size sheet are stored in the memory circuit 22. In step S240, the controller executes the mid-procedure as in step S208.

In step S342, the controller 38 triggers to record received data of the immediately preceding page, the page partition line, and currently received data via the control line 38c. The recording operation is independently performed while executing the subsequent processes. Thereafter, the controller 38 increments the content of the page counter in the receiver by one in step S344, and clears the content of the 2-sheet counter in step S346.

The controller 38 executes a post-procedure in step S348, and outputs a signal of signal level "0" onto the signal line 38a to turn off CML in step S350.

In step S352, the controller 38 checks if the 2-sheet counter is "0", i.e., if no unrecorded data are stored in the memory. If YES in step S352, the flow advances to step S354, and the controller waits for the end of recording of currently recorded data. Thereafter, the flow advances to step S356. However, if NO in step S352, the flow advances to step S358.

Since one communication is completed, the controller 38 records the content of the page counter in the sender as the number of received pages, and the content of the page counter in the receiver as the number of recorded pages on a communication result report and a communication management report together with a communication number, a communication date/time, a telephone number of a partner station, an abbreviated name of the partner station, a communication time, and the like, in step S356.

In step S358, the controller 38 checks if the content of the page counter in the sender is equal to or larger than 2. If YES in step S358, the flow advances to step S360 to perform recording after H/V conversion. However, if NO in step S358, the flow advances to step S370 to record data with an equal-size on an A4-size recording paper sheet without H/V conversion, and to increment the content of the page counter in the receiver by one.

In step S360, the controller 38 outputs a signal of signal level "1" onto the signal line 46f, and outputs a signal of signal level "0" onto the signal line 46g to enable the A4 recorder 78. In step S362, the controller 38 outputs a signal of signal level "1" onto the signal line 46m to set the magnification circuit 44 in the H/V conversion mode. In this case, since the line densities in the main scan and sub-scan directions are reversed, the magnification circuit 44 executes resolution conversion.

In step S364, the controller 38 outputs, onto the signal lines 36d and 36e, a larger one of (the main scan length of currently received data/149 mm=half of the sub-scan length of an A4 recording paper sheet size), and (the sub-scan length of the currently received data/210 mm=the main scan length of an A4 recording paper sheet size), thereby setting a magnification. In this case, the same magnification is set in both the main scan and sub-scan directions.

In step S366, the controller 38 triggers to record the currently received data. The recording operation is independently performed while executing the subsequent processes. In step S368, the same control as in step S222 is executed to increment the content of the page counter in the receiver by one.

In step S372, the controller 38 checks if the 2-sheet data flag indicates "B4", i.e., if data stored in the memory circuit 22 are data to be H/V-converted and recorded on a half portion of a B4-size sheet, if the 2-sheet flag indicates "B4", the flow advances to step S376; if the flag indicates "A4", the flow advances to step S374, and the dat a stored in the memory are recorded on an A4-size recording paper sheet with an equal-size without H/V conversion. The content of the page counter in the receiver is then incremented by one.

In step S376, the controller 38 outputs a signal of signal level "1" onto the signal line 46f, and outputs a signal of signal level "1" onto the signal line 46g, thereby selecting recording onto a B4-size recording paper sheet.

In step S378, the same control as in step S226 is executed to set the magnification circuit 44 in the H/V conversion mode. Since the line densities in the main scan and sub-scan directions are reversed, the magnification circuit 44 executes resolution conversion.

In step S380, the controller 38 calculates a maximum value of (the main scan length of received data of the immediately preceding page/182 mm=half of the sub-scan length of a B4 recording paper sheet size), (the main scan length of currently received data/182 mm=half of the sub-scan length of the B4 recording paper sheet size), (the sub-scan length of received data of the immediately preceding page/257 mm=the main scan length of the B4 recording paper sheet size), and (the sub-scan length of currently received data/257 mm=the main scan length of the B4 recording paper sheet size). When the maximum value is equal to or larger than 1, the controller 38 outputs a reciprocal number of the maximum value onto the signal lines 36d and 36e; when the maximum value is smaller than 1, it outputs "1" onto the signal lines 36d and 36e, thereby setting a magnification. In this case, the two pages of received data to be recorded on a single recording paper sheet are recorded at the same magnification in both the main scan and sub-scan directions.

In step S382, the same control as in steps S342 to S346 is executed to record the two pages H/V-converted received data while recording a page partition line at the center of a B4-size recording paper sheet. The controller 38 increments the content of the page counter in the receiver by one, and sets "0" in the 2-sheet counter.

In step S384, the same control as in step S210 is executed. If the next page exists, the flow returns to step S188; if the next page does not exist, the same control as in steps S348 to S350 is executed in step S386 to execute the post-procedure and to turn off CML.

In step S388, the same control as in step S352 is executed. If the content of the 2-sheet counter is "0", the flow returns to step S354; otherwise, the flow advances to step S390.

In step S390, the same control as in step S358 is executed. If the content of the page counter in the sender is equal to or larger than 2, the flow advances to step S392; otherwise, the flow advances to step S400.

In step S392, the controller 38 outputs a signal of signal level "0" onto the signal line 46f, and outputs a signal of signal level "1" onto the signal line 46g to enable the B4 recorder 80.

In step S394, as in step S362, the controller 38 outputs a signal of signal level "1" onto the signal line m to set the magnification circuit 44 in the H/V conversion mode. In this case, since the line densities in the main scan and sub-scan directions are reversed, the magnification circuit 44 executes resolution conversion.

Furthermore, in step S396, the controller 38 outputs, onto the signal lines 36d and 36e, a larger one of (the main scan length of currently received data/182 mm=half of the sub-scan length of a B4 recording paper sheet size), and (the sub-scan length of the currently received data/257 mm=the main scan length of the B4 recording paper sheet size), thereby setting a magnification. In this case, the same magnification is set in both the main scan and sub-scan directions.

In step S398, the same operations as in steps S366 to S368 are executed to instruct to start recording of received data, and to increment the content of the page counter in the receiver by one.

In step S400, the same control as in step S214 to S222 is executed to record data with an equal-size on an A4-size recording paper sheet without H/V conversion, and to increment the content of the page counter in the receiver by one.

In step S402, the controller 38 checks if the main scan length of received data is equal to or larger than 217 mm. If YES in step S402, the flow advances to step S404 to record data with an equal-size on a B4-size recording paper sheet without H/V conversion; otherwise, the flow advances to step S416 to record data with an equal-size on an A4-size recording paper sheet without H/V conversion.

In step S404, the controller 38 checks if the content of the 2-sheet counter is "0", i.e., if the memory circuit 22 stores no received data of the immediately preceding page. If YES in step S404, the flow advances to step S406; otherwise, the flow advances to step S412.

In step S406, the controller 38 outputs a signal of signal level "0" onto the signal line 46f, and outputs a signal of signal level "1" onto the signal line 46g to instruct the recorder 80 to perform B4-size recording.

In step S408, the same control as in steps S216 to S222 is executed to record data with an equal-size on a B4-size recording paper sheet without H/V conversion, and to increment the content of the page counter in the receiver by one. In step S410, the content of the 2-sheet counter is cleared.

In step S412, the same control as in steps S214 to S220 is executed to record data of the immediately preceding page with an equal-size on an A4-size recording paper sheet without H/V conversion. In step S414, it is stored that data are recorded with an equal-size on a B4-size recording paper sheet without H/V conversion after the end of the recording operation of the immediately preceding page.

In step S416, the controller 38 checks if the content of the 2-sheet counter is "0", i.e., if the memory circuit 22 stores no received data of the immediately preceding page. If YES In step S416, the flow advances to step S418; otherwise, the flow advances to step S420.

In step S418, the same control as in steps S214 to S222 is executed to record data with an equal-size on an A4-size recording paper sheet without H/V conversion, and to increment the content of the page counter in the receiver by one.

In step S420, the same control as in steps S214 to S220 is executed to record data of the immediately preceding page with an equal-size on an A4-size recording paper sheet without H/V conversion. In step S422, it is stored that data are recorded with an equal-size on an A4-size recording paper sheet without H/V conversion after the end of the recording operation of the immediately preceding page.

In this manner, when a facsimile apparatus has fixed-size sheets of A4 and B4 sizes, and receives images of A5-size originals, the received images are H/V-converted, and two converted images of the received original images are recorded on an A4-size recording paper sheet. On the other hand, when this apparatus receives images of B5-size originals, the received images are H/V-converted, and two converted images of the received original images are recorded on a B4-size recording paper sheet. Thus, recording paper sheets can be effectively utilized.

In the sixth embodiment described above, even when the recording magnification is equal to or larger than 1, equal-size recording is performed. However, in this case, enlargement recording may be performed.

In the sixth embodiment, when two pages of received data are H/V-converted and recorded on a single cut sheet, they are recorded at the same reduction factor in both the main scan and sub-scan directions. However, the two pages of received data to be recorded on a single page may be independently processed, and may be respectively allowed to exceed the half size within a range of a fixed rate, so that the reduction factor of each half page portion may be determined based on a larger one of the factors in the main scan and sub-scan directions. More specifically, in steps S228 and S380, the magnifications of the immediately preceding page and the currently received page may be respectively determined, and these pages may be recorded at the determined magnifications.

Furthermore, as a modification of the above-mentioned process, the magnifications in both the main scan and sub-scan directions in each of the former and latter half pages may be independently determined, so that each half page is recorded to fill the allowable area.

When all data are received in the memory, and include at least one page which cannot have a size smaller than half of a fixed recording paper sheet after H/V conversion, all the pages may be recorded with an equal-size without H/V conversion to coordinate all the pages.

In the above description, the control has been made by calculating an effective reception size. However, a received image size may be used in place of the effective reception size.

The seventh embodiment of the present invention will be described below.

In the sixth embodiment, a received image having a size about half of a recording paper sheet size is H/V-converted, so that received data for two pages are recorded on a single recording paper sheet. In the seventh embodiment, the same processes as in the sixth embodiment are executed in a sender to transmit two pages of read data as one page of sending data, thereby obtaining an effect of reducing communication cost in addition to the effect of the sixth embodiment.

Figure 38:
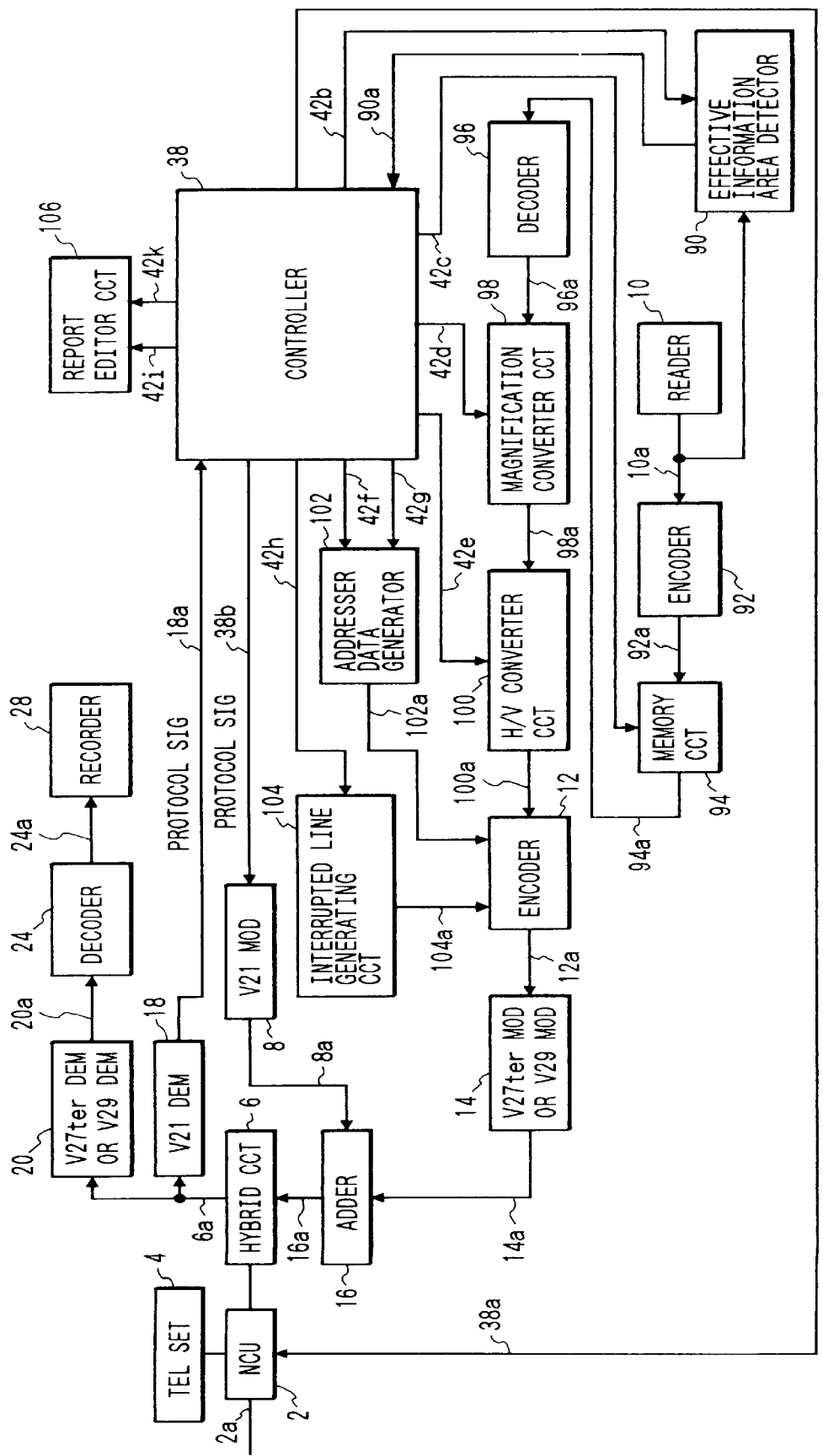
FIG. 38 is a block diagram showing an arrangement according to the seventh embodiment of the present invention.
Figure 39:
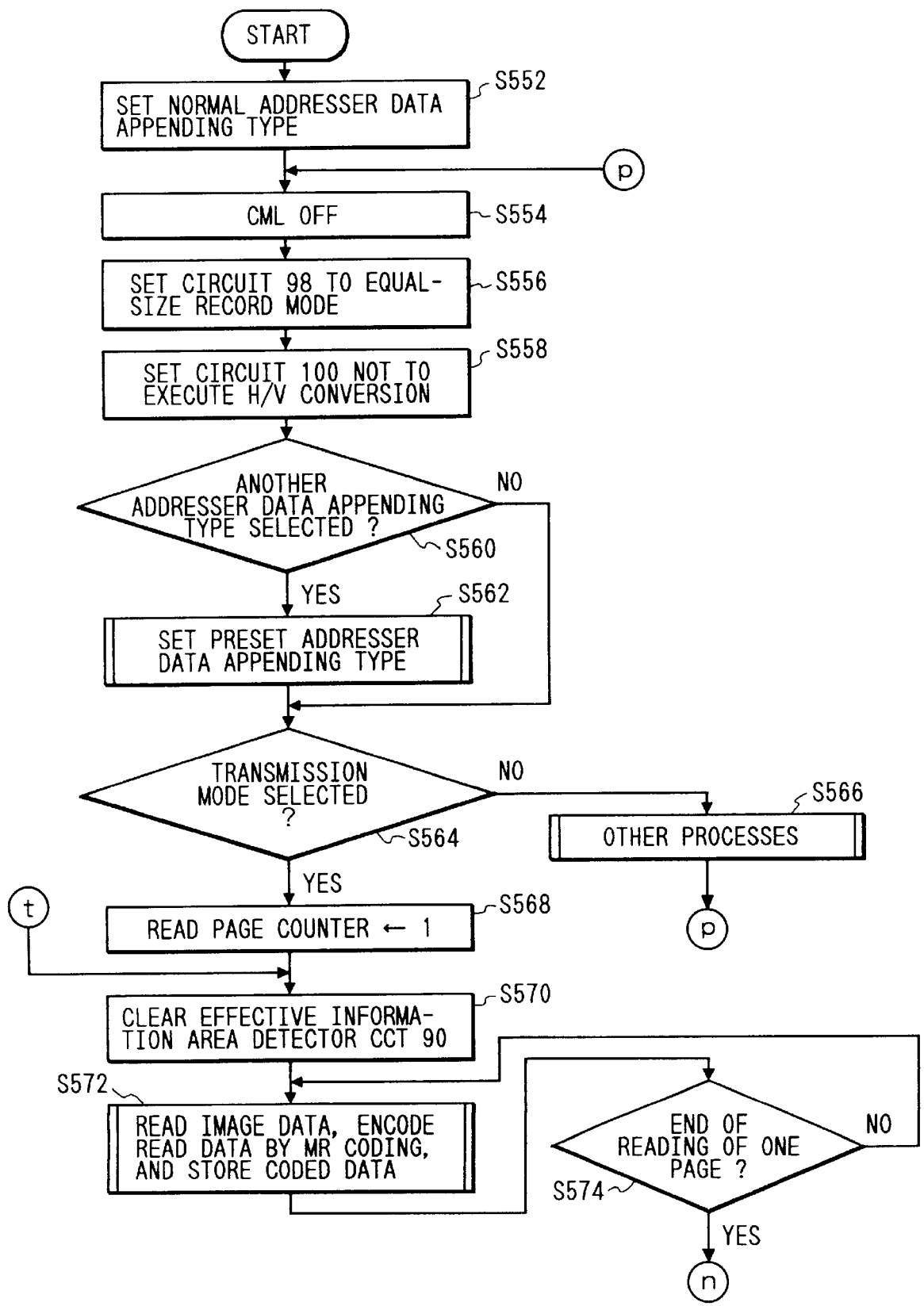
FIG. 39 is a flow chart showing an operation of the seventh embodiment.
Figure 40:
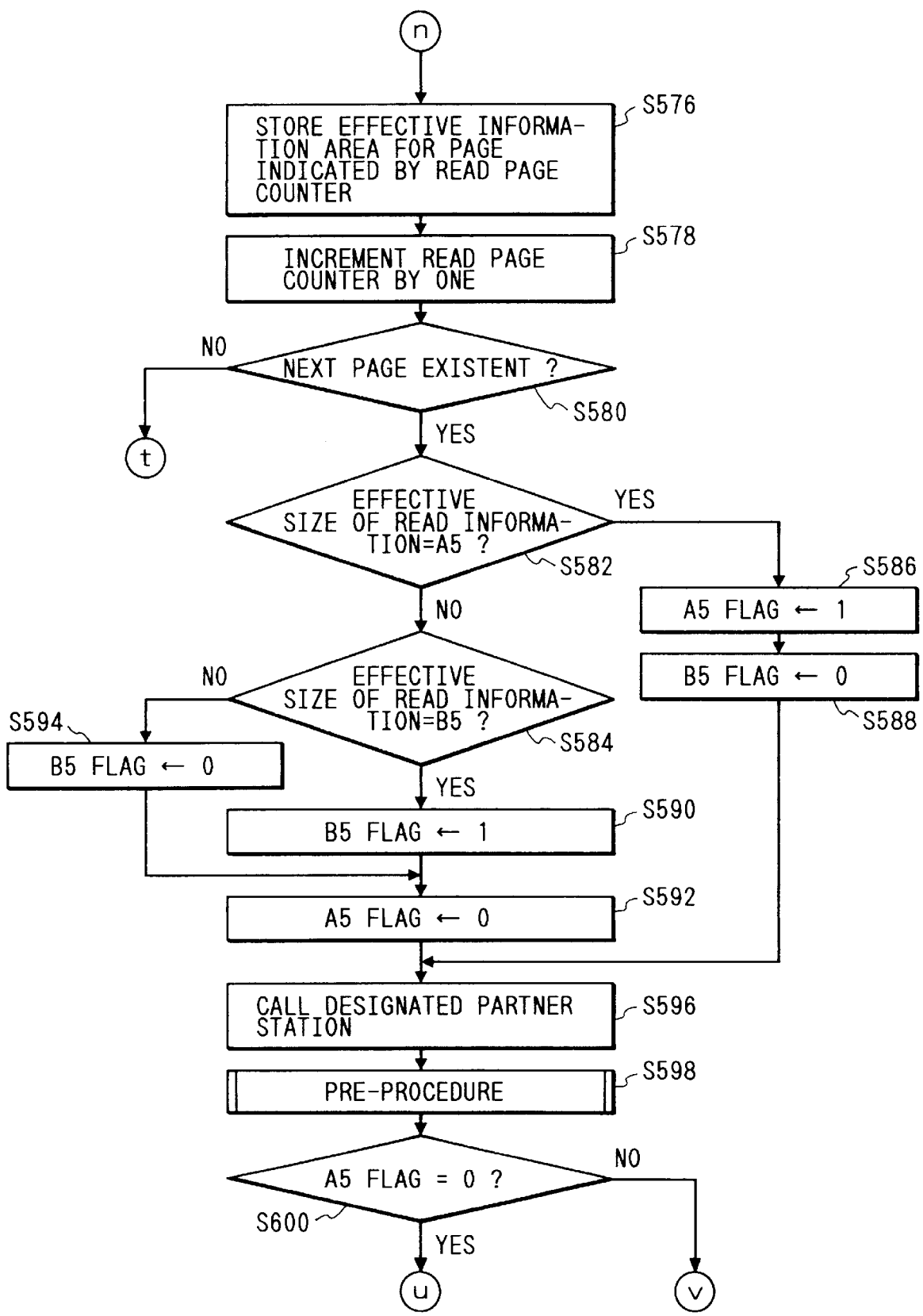
FIG. 40 is a flow chart showing an operation of the seventh embodiment.
Figure 41:
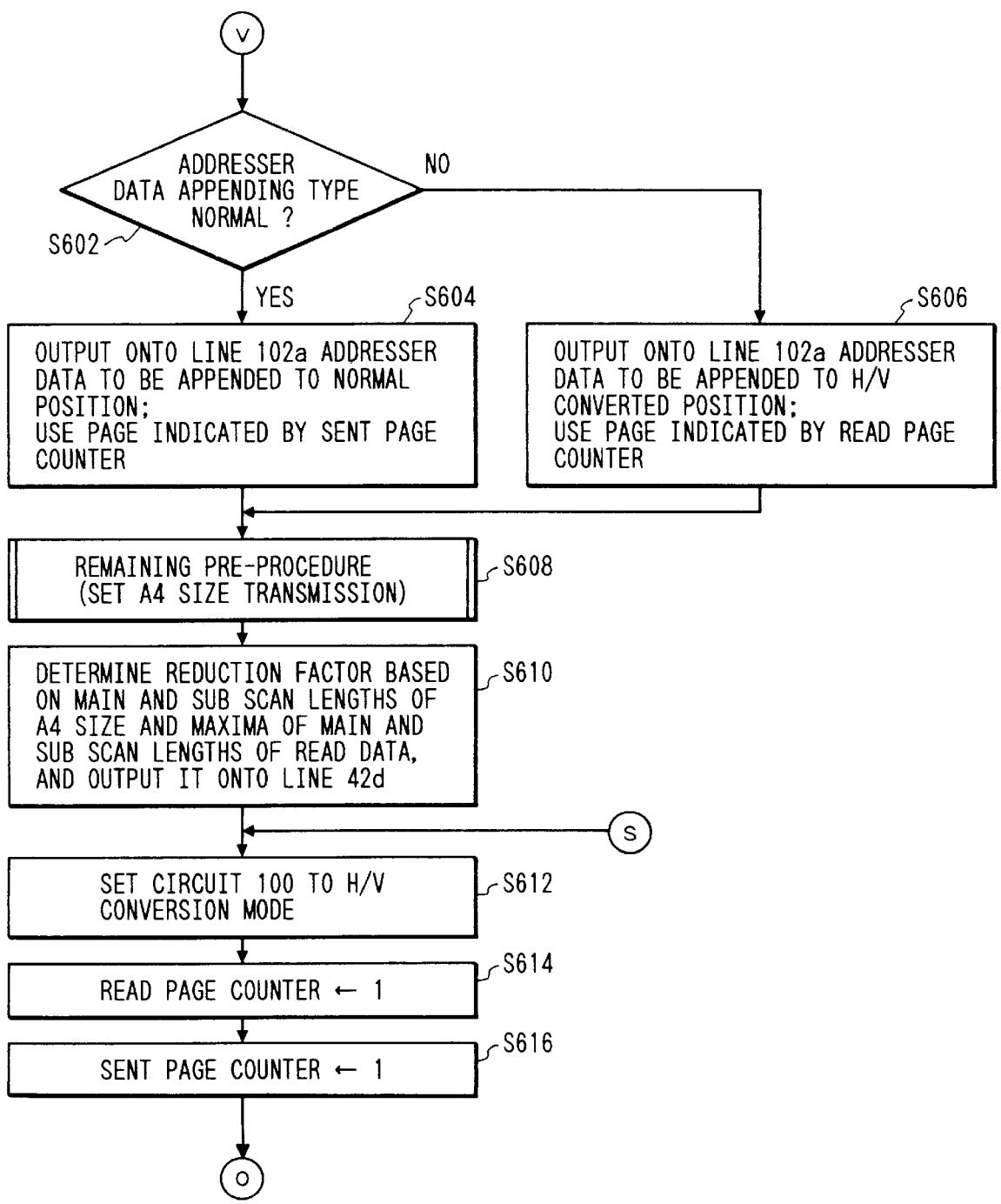
FIG. 41 is a flow chart showing an operation of the seventh embodiment.
Figure 42:
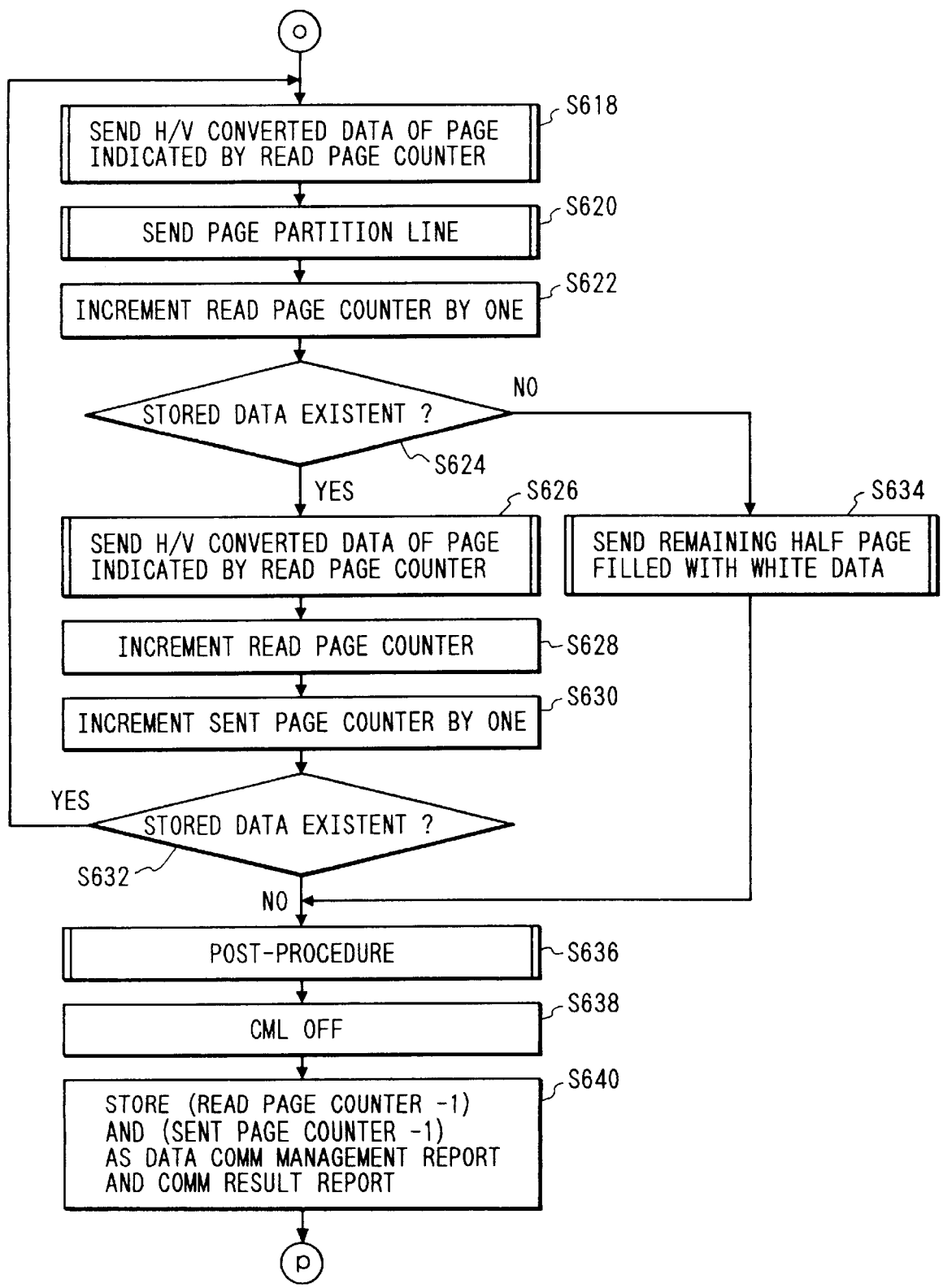
FIG. 42 is a flow chart showing an operation of the seventh embodiment.
Figure 43:
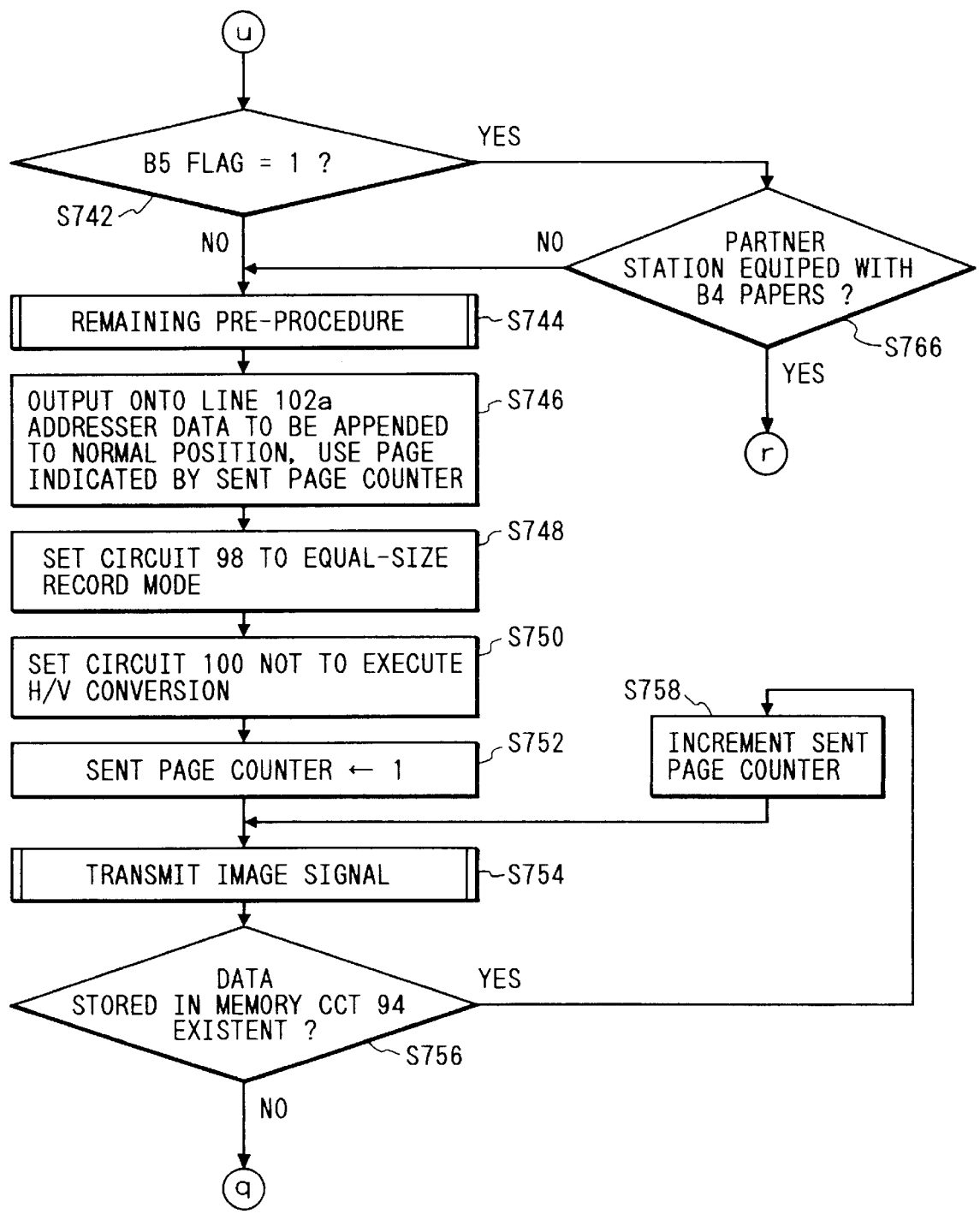
FIG. 43 is a flow chart showing an operation of the seventh embodiment.

FIG. 38 is a block diagram showing an arrangement of the seventh embodiment. Note that the same reference numerals in FIG. 38 denote the same parts as in the first embodiment (FIG. 1), and a repetitive description thereof will be omitted.

Referring to FIG. 38, an effective data area detector 90 receives read data outputted onto the signal line 10*a* to detect an area including a black dot after a clear pulse is generated onto the signal line 42*b*. The detector 90 detects the dot number of the leftmost black dot, the dot number of the rightmost black dot, the line number of the uppermost black dot, and the line number of the lowermost black dot, and outputs the detection signals onto a signal line 90*a*.

An encoder 92 encodes read data received from the signal line 10*a* to MR codes with k=8, and outputs encoded data onto a signal line 92*a*. A memory circuit 94 stores MR-encoded data received from the signal line 92*a* under the control of a signal on a signal line 42*c*, and outputs the stored data onto a signal line 94*a*.

A decoder 96 receives and decodes a signal (MR-encoded data with k=8) outputted onto the signal line 94*a*, and outputs the decoded data onto a signal line 96*a*. A magnification converter circuit 98 reduces data from the decoder 96 in both the main scan and sub-scan directions on the basis of magnification data outputted onto the signal line 42*d*, and outputs the reduced data onto a signal line 98*a*. An H/V converter circuit 100 allows data from the magnification converter circuit 98 to pass therethrough when a signal on a signal line 42*e* is at level "0". The circuit 100 H/V-converts data from the magnification converter circuit 98 when a signal on the signal line 42*e* is at level "1". The circuit 100 outputs the converted data onto a signal line 100*a*.

The encoder 12 receives and adds signals on the signal line 100*a* and signal lines 102*a* and 104*a*, encodes sum data (by MH or MR encoding), and outputs encoded data onto the signal line 12*a*.

Figure 45B:
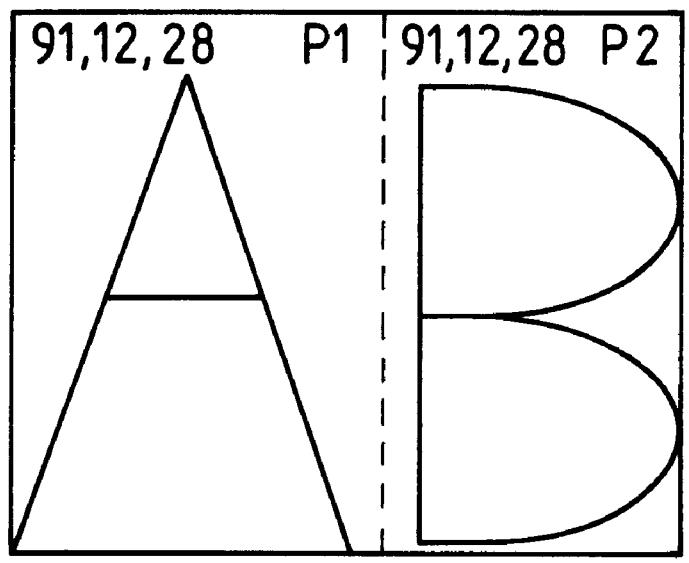
FIGS. 45A and 45B are views for explaining an image output example according to the seventh embodiment.
Figure 45A:
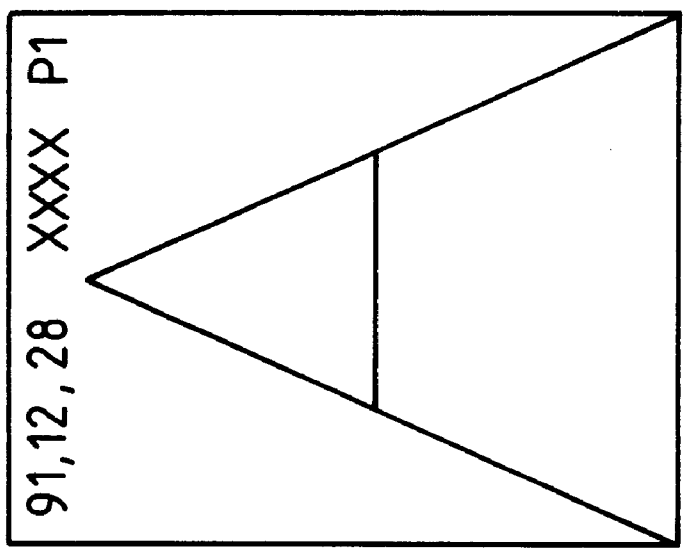

An addresser data generator 102 generates addresser data, and outputs it onto the signal line 102*a*. An addresser data appending type includes a type for appending addresser data on an original when a signal of signal level "0" is outputted onto a signal line 42*f* (FIG. 45A; in this case, the number of sending pages is used as a page counter), and a type of appending H/V-converted addresser data when a signal of signal level "1" is outputted onto the signal line 42*f* (FIG. 45B; in this case, the number of read pages is used as a page counter).

An interrupted line generating circuit 104 outputs interrupted (or dotted) line data onto the signal line 104*a* when an interrupted line data generation pulse representing a partition of read data is generated onto a signal line 42*h*.

A report editor circuit 106 receives data of a communication management report or a communication result report outputted on a signal line 42*j*, and edits these reports, when a communication management or result report output pulse is generated on a signal line 42*k*.

In the seventh embodiment, the controller 38 mainly executes the following processes. When a transmission operation is selected, the controller 38 stores sending data in the memory circuit 94, and receives data on the signal line 90a in correspondence with the page number of read data, thereby recognizing an effective data area. In this case, the controller recognizes the effective data areas of all page data.

Upon completion of the storage operation in the memory circuit 94, the controller 38 controls to generate a call to a designated partner station. If the recording paper sheet size of the partner station is about twice as large as the effective data size of all read data (e.g., when the recording paper sheet size of the partner station is A4 and the read size is A5, or when the recording paper sheet size of the partner station is B4 and the read size is B5), the controller 38 H/V-converts two pages of read data, adds interrupted line data to the center of sending data as a page partition line of the read data, and sends these data.

When the number of pages is an odd number, the controller 38 sends the last page after H/V conversion together with the page partition line of read data. In this case, the lower half portion of the last page is sent as all-white data. Note that the above-mentioned processes are executed when the effective size of read data is about ½ of the recording paper sheet size. In this case, the effective data lengths, in the main scan and sub-scan directions, of all read data are obtained, the maximum value of these lengths is allowed to be larger than a fixed value within a range of 10% of the fixed value, and the read data are reduced at the same magnification in both the main scan and sub-scan directions on the basis of the maximum value. When all the effective data areas are smaller than the fixed value, read data are recorded in an equal-size record mode. When the effective data area of read data is larger than the fixed value beyond the range of 10% of the fixed value, all data are sent without H/V conversion.

In the above-mentioned transmission process, the number of pages of read data, and the number of pages of sending data can be counted. These numbers of pages are recorded on a communication management report or a communication result report.

The addresser data appending type can be selected from a type of appending addresser data at a normal position (addresser data includes data of the number of pages of sending data) or a type of appending addresser data at an H/V-converted position (addresser data includes data of the number of pages of read data).

FIGS. 39 to 44 are flow charts showing an operation of this embodiment.

In step S552, the controller 38 outputs a signal of signal level "0" onto the signal line 42f to set that addresser data is outputted at a normal position. In step S554, the controller 38 outputs a signal of signal level "0" onto the signal line 38a to turn off CML.

In step S556, the controller 38 outputs a signal "1" onto the signal line 42d to set the magnification converter circuit 98 in an equal-size record mode. In step S558, the controller 38 outputs a signal of signal level "0" onto the signal line 42e to disable H/V conversion of the H/V converter circuit 100.

In step S560, the controller 38 checks if another addresser data appending type is selected. If YES in step S560, the controller 38 sets that addresser data is appended at a designated position in step S562. More specifically, the controller 38 sets the selected addresser data appending type on the signal line 42f.

In step S564, the controller 38 checks if a transmission mode is selected. If YES in step S564, the flow advances to step S568; otherwise, the controller executes other processes in step S566.

In steps S568 to S580, the controller 38 stores read data in the memory circuit 94. More specifically, the controller 38 sets "1" in a read page counter as a counter for counting the number of read pages in step S568, and generates a clear pulse onto the signal line 42b to clear the effective data area detector 90 in step S570.

In step S572, the controller 38 encodes read data by MR encoding with k=8 via the reader 10 and the encoder 92 by controlling the signal line 42c, and stores encoded data in the memory circuit 94.

In step S574, the controller 38 checks if data for one page have been read. If YES in step S574, the flow advances to step S576; otherwise, the flow returns to step S572.

In step S576, the controller 38 receives the effective data area outputted on the signal line 90a, and stores it in correspondence with the content of the read page counter.

In step S578, the controller 38 increments the content of the read page counter by one. The controller 38 checks in step S580 if the next page exists. If YES in step S580, the flow returns to step S570; otherwise, the flow advances to step S582.

In step S582, the controller 38 checks if the effective size of all read data is the A5 size. More specifically, the controller checks if the main scan length of all read data falls within a range of 148 mm×1.1, and the sub-scan length falls within a range of 210 mm×1.1. If YES in step S582, the controller 38 sets "1" in an A5 flag (S586), and sets "0" in a B5 flag (S588); otherwise, the flow advances to step S584.

In step S584, the controller 38 checks if the effective size of all read data is the B5 size. More specifically, the controller checks if the main scan length of all read data falls within a range of 182 mm×1.1, and the sub-scan length falls within a range of 256 mm×1.1. If YES in step S584, the controller 38 sets "1" in the B5 flag (S590), and sets "0" in the A5 flag (S592); otherwise, the controller sets "0" in the B5 flag (S594), and sets "0" in the A5 flag (S592).

The controller 38 controls to call a designated partner station in step S596, and executes a pre-procedure in step S598.

In step S600, the controller 38 checks if the A5 flag is "1", i.e., if the effective size of all read data is A5. If YES in step S600, the flow advances to step S602; otherwise, the flow advances to step S742.

In step S602, the controller 38 checks if the type for appending addresser data at a normal position is selected. If YES in step S602, the flow advances to step S604, and the controller 38 outputs a signal of signal level "0" onto the signal line 42f to output addresser data onto the signal line 102a. In this case, data of a sent page counter is used as a page counter.

However, if NO in step S602, the flow advances to step S606. In step S606, the controller 38 outputs a signal of signal level "1" onto the signal line 42f to output addresser data at an H/V-converted position, and also generates an addresser data output pulse onto the signal line 42g to output addresser data onto the signal line 102a. In this case, data of the read page counter is used as a page counter.

In step S608, the controller 38 executes the remaining pre-procedure. In this case, the controller sets to transmit an A4-size original. In step S610, the controller 38 compares the maximum value of the main scan lengths of read data with 148 mm, and compares the maximum value of the sub-scan lengths of read data with 210 mm so as to determine a reduction factor for reducing all read data in both the main scan and sub-scan directions at a smaller one of the main scan and sub-scan reduction factors. The controller outputs the determined reduction factor onto the signal line 42d.

In step S612, the controller 38 outputs a signal of signal level "1" onto the signal line 42e to H/V convert a signal on the signal line 98a, and outputs the converted data onto the signal line 100a.

In step S614, the controller 38 sets "1" in the counter for counting the number of read pages, i.e., the read page counter. In step S616, the controller 38 sets "1" in the counter for counting the number of sent pages, i.e., the sent page counter.

In step S618, the controller 38 H/V-converts the page number data of the read page counter, executes encoding corresponding to the partner station, and sends data for one read page. In step S620, the controller 38 generates a pulse onto the signal line 42h to send interrupted line data representing a page partition.

In step S622, the controller 38 increments the content of the read page counter. In step S624, the controller 38 checks if data are stored in the memory. If YES in step S624, the flow advances to step S626; otherwise, the flow advances to step S634 to send the remaining half page filled with white data.

In step S626, the controller 38 H/V-converts the page number data of the read page counter, executes encoding corresponding to the partner station, and sends data for one read page. The controller 38 increments the content of the read page counter by one in step S628, and increments the content of the sent page counter by one in step S630.

In step S632, the controller 38 checks if data are stored in the memory. If YES in step S632, the flow returns to step S618; otherwise, the flow advances to step S636.

In step S636, the controller 38 executes a post-procedure. In step S638, the controller 38 outputs a signal of signal level "0" onto the signal line 38a to turn off CML.

In step S640, the controller 38 stores values obtained by subtracting 1 from the contents of the read and sent page counters as communication management data and communication result data.

In step S742, the controller 38 checks if the B5 flag is "1", i.e., if the effective size of all read data is B5. If YES in step S742, the flow advances to step S766; otherwise, the flow advances to step S744.

In step S744, the controller 38 executes the remaining pre-procedure. In step S746, the controller 38 outputs a signal of signal level "0" onto the signal line 42f to set that addresser data is outputted at a normal position. Also, the controller 38 generates an addresser data output pulse onto the signal line 42g to output addresser data onto the signal line 102a.

In step S748, the controller 38 outputs a signal "1" onto the signal line 42d, and the magnification converter circuit 98 outputs a signal on the signal line 96a onto the signal line 98a with an equal-size.

In step S750, the controller 38 outputs a signal "0" onto the signal line 42e to directly output a signal on the signal line 98a onto the signal line 100a without H/V conversion. In step S752, the controller 38 sets "1" in the sent page counter as the counter for counting the number of sent pages.

In step S754, the controller 38 transmits an image signal. In step S756, the controller 38 checks if data are stored in the memory circuit 94. If YES in step S756, the flow advances to step S758 to increment the content of the sent page counter by one.

The controller 38 executes the post-procedure in step S760, and outputs a signal of signal level "0" onto the signal line 38a to turn off CML in step S762.

In step S764, the controller 38 stores the content of the sent page counter as communication management data and communication result data.

In step S766, the controller 38 checks if the partner receiver has B4-size recording paper sheets. If YES in step S766, the flow advances to step S768; otherwise, the flow returns to step S744.

In step S768, the controller 38 checks if the appending type for appending addresser data at a normal position is selected. If YES in step S768, the flow advances to step S770. In step S770, the controller 38 outputs a signal of signal level "0" onto the signal line 42f to set that addresser data is outputted at a normal position, and generates an addresser data output pulse onto the signal line 42g to output addresser data onto the signal line 102a. In this case, the data of the sent page counter is used as a page counter.

However, if NO in step S768, the flow advances to step S772. In step S772, the controller 38 outputs a signal of signal level "1" onto the signal line 42f to set that addresser data is outputted at an H/V-converted position, and generates an addresser data output pulse onto the signal line 42g to output addresser data onto the signal line 102a. In this case, the data of the read page counter is used as a page counter.

In step S774, the controller 38 executes the remaining pre-procedure. In this case, the controller 38 sets to transmit a B4-size original. In step S776, the controller 38 compares the maximum value of the main scan lengths of read data with 182 mm, and compares the maximum value of the sub-scan lengths of read data with 256 mm so as to determine a reduction factor for reducing all read data in both the main scan and sub-scan directions at a smaller one of the main scan and sub-scan reduction factors. The controller outputs the determined reduction factor onto the signal line 42d.

As described above, according to the seventh embodiment, when a receiver has fixed-size recording paper sheets of, e.g., A4 and B4 sizes, if a sender transmits images of A5-size originals, two pages of A5-size images can be sent as a single A4-size image. On the other hand, when the sender transmits images of B5-size original, two pages of B5-size images can be sent as a single B4-size image. Therefore, the transmission time and the recording paper sheets can be saved.

In the seventh embodiment, the reduction factor of all read data is determined on the basis of the maximum value of the main scan and sub-scan lengths of all the read data. However, the reduction factor may be determined from two pages of read data to be sent as one page of sending data.

In the seventh embodiment, for example, two pages of A5-size data are H/V-converted, and are sent as one page of A4-size data. In this case, when A5-size data are set at an original set position to be rotated through 90°, two pages of these original data can be sent as one page of sending data without H/V conversion. In this case, interrupted line data is sent at a partition position between two pages of read data. Of course, the same applies to transmission of B5-size data.

In the seventh embodiment, memory transmission to one address is performed. However, this embodiment can be applied to multi-address transmission to a plurality of addresses. When an output mode of a communication management report or a communication result report is selected, if two pages of read data are sent as one page of sending data, both the number of sent pages and the number of read pages may be recorded.

As described above, according to the present invention, when received data is outputted onto a fixed-size recording paper sheet, since necessity of reduction and a reduction factor are determined on the basis of the effective data area of received data, a chance of recording data with an equal-size increases, and recorded data which is easy to see for a user can be provided. Since an actually recordable area is compared with an effective reception area, omission of the effective data area can be prevented.

According to the present invention, since a reduction factor is determined based on the maximum number of lines in received images in one communication, all images in one communication can be recorded at the same reduction factor in principle, and recorded data which is easy to see for a user can be provided.

According to the present invention, reduction/enlargement recording is performed on the basis of the effective data area of received data. For this reason, when the effective data area of received data is large, a chance of executing equal-size recording increases as compared to a conventional apparatus. When the effective data area of received data is small, the received data are recorded in an enlarged scale. Therefore, recorded images which are easy to see for a user can be provided.

According to the present invention, a sender informs the effective data area, and a receiver determines a reduction factor based on the effective data area. For this reason, especially in a simplified system wherein a receiver has no memory circuit, and can perform only real-time recording, a chance of executing equal-size recording increases, and received images which are easy to see for a user can be provided.

According to the present invention, when short data are received, a plurality of pages of the short data can be received on a single recording paper sheet, thus allowing effective utilization of recording paper sheets.

According to the present invention, when data having a size about half of the sub-scan length of a recording paper sheet size are sent, the data are H/V-converted in a receiver or sender, so that two pages of sending data can be outputted onto a single recording paper sheet, thus allowing effective utilization of recording paper sheets.

What is claimed is:

1. A communication apparatus for recording an image on a fixed-size recording paper sheet, comprising:
   memory means for storing a received image having some black pixels;
   effective data area recognition means for obtaining an effective data area of the received image, wherein said effective data area recognition means detects positions of black pixels of the received image and recognizes the effective data area based on the detected positions;
   magnification factor determination means for determining a magnification factor of the received image by comparing the effective data area and a recording paper sheet size;
   setting means for setting a set magnification factor;
   comparing means for comparing the determined magnification factor with the set magnification factor; and
   recording means for variably magnifying the received image at the determined magnification factor and recording the variably magnified image on the fixed-size recording paper sheet when the determined magnification factor is not less than the set magnification factor, and for dividing the received image into divided images and recording the divided images on a plurality of fixed-size recording paper sheets when the determined magnification factor is less than the set magnification factor.

2. An apparatus according to claim 1, further comprising:
   recordable area recognition means for obtaining a recordable area of the recording paper sheet, wherein the determined magnification factor is determined by comparing the effective data area and the recordable area.

3. An apparatus according to claim 1 or 2, wherein said magnification factor determination means determines magnification factors in main scan and sub-scan directions to be equal to each other.

4. A communication apparatus according to claim 1, wherein when the determined magnification factor in the sub-scan direction is not less than the set magnification factor, said recording means records the received data to fill the fixed-size recording paper sheet in both a main scan direction and a sub-scan direction.

5. An apparatus according to claim 4, wherein said magnification factor determination means independently determines magnification factors in the sub-scan and main scan directions upon recording of the received data.

6. An apparatus according to claim 4, wherein when a plurality of received data are recorded on one page, said recording means records the received data at the same magnification factor in both the sub-scan and main scan directions.

7. An apparatus according to claim 4, wherein when one page of received data is divisionally recorded on a plurality of recording sheets, said recording means records the data with an equal-size in the sub-scan direction.

8. A communication apparatus according to claim 1, wherein said communication apparatus is a facsimile apparatus.

9. A communication apparatus for recording an image on a fixed-size recording paper sheet, comprising:
   memory means for storing a plurality of pages of received data;
   count means for counting a number of lines of each page of the received data, and storing the count values;
   reduction means for reducing an image at a determinable reduction factor;
   magnification determination means connected to said count means for determining the determinable reduction factor from a maximum number of lines of the different counted numbers of lines of the pages received in one communication after an end of the one communication; and
   recording means for recording all the pages of received data, the pages being reduced by said reduction means at the reduction factor determined by said magnification determination means.

10. An apparatus according to claim 9, wherein when the reduction factor is not more than a predetermined value, said recording means divisionally records each page of received data onto a plurality of pages with an equal size.

11. An apparatus according to claim 9, further comprising:
    appending means for appending the reduction factor at least at a predetermined position of a first page.

12. A communication apparatus according to claim 9, wherein said communication apparatus is a facsimile apparatus.

13. A communication system including a sender apparatus for sending data to a partner receiver apparatus, comprising:
    in the sender apparatus, effective data area recognition means for obtaining an effective data area in one physical page of data including some black pixels to be sent, wherein said effective data area recognition means detects positions of black pixels of the data and recognizes the effective data area based on the detected positions;

means for sending the data to the receiver apparatus; and informing means for informing the effective data area to the receiver apparatus; and in the receiver apparatus, memory means for storing the received data;

magnification factor determination means for determining a magnification factor of the received data by comparing the effective data area and a recording paper sheet size;

setting means for setting a set magnification factor;

comparing means for comparing the determined magnification factor with the set magnification factor; and recording means for variably magnifying the received data at the determined magnification factor and recording the variably magnified data on the fixed-size recording paper sheet when the determined magnification factor is not less than the set magnification factor, and for dividing the received data into divided images and recording the divided images on a plurality of fixed-size recording paper sheets when the determined magnification factor is less than the set magnification factor.

14. A system according to claim 13, wherein said receiver apparatus sets magnification factors in main scan and sub-scan directions to be equal to each other.

15. A system according to claim 13, wherein said receiver apparatus determines the magnification factor on the basis of the effective data area informed from said sender apparatus, and a recordable area smaller than a recording paper sheet size used in said receiver apparatus.

16. A system according to claim 13, wherein said system is a facsimile system.

17. A communication apparatus for recording an image on a fixed-size recording paper sheet, comprising:

memory means for storing received data;

effective data area recognition means for obtaining an effective data area of the received data;

conversion means for converting the received data to corresponding converted data rotated by 90°;

partition data appending means for appending data representing a page partition; and control means for, when an effective data length, in a main scan direction, of the received data is not more than a predetermined length larger than half a length, in a sub-scan direction, of a recording paper sheet size, and an effective data length, in the sub-scan direction, of the received data is not more than another predetermined length larger than a length, in the main scan direction, of the recording paper sheet size, controlling to convert the received data to converted data and to record the converted data on a half area of the recording paper sheet, controlling to append data representing the page partition, and thereafter, controlling to convert received data of the next page to converted data and to record the converted data on the remaining half area of the recording paper sheet.

18. An apparatus according to claim 17, wherein when each received page has a size larger than half a size of a recording paper sheet to be used within a range of a predetermined extra rate of the half size, said control means determines a reduction factor on the basis of one having a larger extra rate of sizes, in the main scan and sub-scan directions, of the received data, and controls to perform a recording operation at the determined reduction factor.

19. An apparatus according to claim 17, wherein when each received page has a size larger than half a size of a recording paper sheet to be used within a range of a predetermined extra rate of the half size, said control means controls to record two pages of received data on a single recording paper sheet at a reduction factor, which is determined on the basis of a maximum value of sizes, in the main scan and sub-scan directions of each page of received data.

20. An apparatus according to any one of claims 17 to 19, wherein when continuous pages of received data are converted to converted data, and the converted data do not fall within one page of a recording paper sheet, said control means controls to record all pages without conversion.

21. A communication apparatus according to claim 17, wherein said communication apparatus is a facsimile apparatus.

22. A communication apparatus comprising:

effective data area recognition means for obtaining an effective data area of one page of read data;

memory means for storing the read data in a memory;

conversion means for converting read data to corresponding converted data rotated by 90°;

partition data appending means for appending data representing a page partition;

transmission means for transmitting the read data as sending data; and control means for when a length, in a sub-scan direction, of the effective data area of the read data is equal to a length, in a main scan direction, of a recording paper sheet informed from a receiver, controlling to convert and encode the read data, to append the data representing the page partition to the encoded data, and to transmit two pages of read data as one page of sending data.

23. An apparatus according to claim 22, wherein when the length, in the sub-scan direction, of the effective data area of the sending data is not more than a predetermined length larger than the length, in the main scan direction, of the recording paper sheet, and a length, in the main scan direction, of the effective data area of the sending data is not more than another predetermined length longer than half a length, in the sub-scan direction, of the recording paper sheet size, said control means controls to convert two pages of read data, to append page partition data between the two pages, and to transmit the two pages of read data as one page of data.

24. An apparatus according to claim 23, wherein said control means allows main scan and sub-scan lengths of the read data to exceed the recording paper sheet size by a predetermined extra rate, and when two pages of read data are transmitted as one page of sending data, said control means controls to reduce the two pages of read data at a reduction factor determined with reference to a larger one of the main scan and sub-scan lengths of the two pages of read data, and to transmit the two pages of read data as one page of sending data.

25. An apparatus according to claim 23, wherein said control means allows main scan and sub-scan lengths of the read data to exceed the recording paper sheet size by a predetermined extra rate, and controls to reduce all read data at a reduction factor with reference to a maximum value of the main scan and sub-scan lengths of all the read data, and to transmit two pages of read data as one page of sending data.

26. An apparatus according to any one claims 22 to 25, wherein when said control means controls to convert the read data and to transmit two pages of read data as one page of sending data, said control means counts the number of pages of read data and the number of pages for sending data using separate counters.

27. An apparatus according to claim 22, further comprising:
means for appending addresser data including the number of pages of sending data at a normal position;
means for appending addresser data including the number of pages of read data in converted read data at a converted position; and
means for selecting one of the two types of addresser data.

28. A communication apparatus according to claim 22, wherein said communication apparatus is a facsimile apparatus.

29. A communication apparatus for recording an image on a recording paper sheet having a fixed size, comprising:
memory means for storing units of received image data;
recognition means for recognizing a size of each unit of received image data;
recording means for recording image data on a recording paper sheet;
conversion/reducing means for converting and reducing each unit of received image data to a corresponding unit of converted image data reduced in size and rotated by 90°; and
control means for discriminating whether or not the size of each unit of received image data recognized by said recognition means is shorter than a predetermined length that is longer than a length of one side of the recording paper sheet, and for, if the size is shorter, determining recording of a plurality of units of received image data on one recording paper sheet, causing said conversion/reducing means to convert and reduce a unit of received image data whose size is longer than the length of the one side in accordance with the determination, and causing said recording means to record a plurality of the units of converted and reduced image data on one recording paper sheet in accordance with the determination.

30. An apparatus according to claim 29, wherein each unit of received data corresponds to a page, and said control means causes said recording means to record two units of converted and reduced image data on the one recording paper sheet.

31. A communication apparatus according to claim 29, wherein said communication apparatus is a facsimile apparatus.

32. An apparatus according to claim 29, wherein said reducing means determines a reduction factor in accordance with the recognized size of the received image data, and reduces the units of the received image data on the basis of the determined reduction factor.

33. A communication apparatus comprising:
input means for inputting image data divided into pages;
recognition means for recognizing a size of each page of the input data;
conversion means for converting each page of the input data to a corresponding page of converted data rotated by 90°;
transmission means for transmitting data in units of transmission pages having a set size; and
control means for discriminating whether or not the size of each page of inputted image data recognized by said recognition means is shorter than a predetermined length that is longer than a length of one side of the recording paper sheet, and for, if the size is shorter, determining transmission of a plurality of pages of inputted image data as one transmission page, and causing said transmission means to transmit a plurality of the pages of converted image data as one transmission page in accordance with the determination.

34. A communication apparatus according to claim 33, wherein said control means controls said transmission means to transmit two pages of converted data as one transmission page.

35. A communication apparatus according to claim 34, wherein said input means includes reading means for reading images.

36. A communication apparatus according to claim 33, wherein said communication apparatus is a facsimile apparatus.

37. A method of operating a communication apparatus for recording an image on a recording paper sheet having a fixed size, comprising the steps of:
storing units of received image data;
recognizing a size of each unit of received image data;
converting/reducing each unit of received image data to a corresponding unit of converted image data reduced in size and rotated by 90°;
discriminating whether or not the size of each unit of received image data recognized in said recognizing step is shorter than a predetermined length that is longer than a length of one side of the recording paper sheet; and
if the size is shorter, determining recording of a plurality of units of received image data on one recording paper sheet, causing said converting/reducing step to convert and reduce a unit of received image data whose size is longer than the length of the one side in accordance with the determination, and recording a plurality of the units of converted and reduced image data on one recording paper sheet in accordance with the determination.

38. A method according to claim 37, wherein each unit of received data corresponds to a page, and said recording step records two units of converted and reduced image data on the one recording paper sheet.

39. A communication method according to claim 37, wherein the communication apparatus is a facsimile apparatus.

40. A method according to claim 37, wherein said reducing step includes determining a reduction factor in accordance with the recognized size of the received image data, and reducing the units of the received image data on the basis of the determined reduction factor.

41. A method of operating a communication apparatus comprising:
inputting image data divided into pages;
recognizing a size of each page of the input data;
converting each page of the input data to a corresponding page of converted data rotated by 90°;
transmitting data in units of transmission pages having a set size;
discriminating whether or not the size of each page of inputted image data recognized in said recognizing step is shorter than a predetermined length that is longer than a length of one side of the recording paper sheet; and if the size is shorter, determining transmission of a plurality of pages of inputted image data as one transmission page, and causing said transmitting step to transmit a plurality of the pages of converted image data as one transmission page in accordance with the determination.

42. A method according to claim 41, wherein said control step controls said transmission step to transmit two pages of converted data as one transmission page of data.

43. A method according to claim 41, wherein said input step includes reading images.

44. A communication method according to claim 41, wherein the communication apparatus is a facsimile apparatus.

45. A method of operating a communication apparatus for recording an image on a fixed-size recording paper sheet, comprising the steps of:

storing a received image having some black pixels;

obtaining an effective data area of the received image, wherein said obtaining step detects positions of black pixels of the received image and recognizes the effective data area based on the detected positions;

determining a magnification factor of the received image by comparing the effective data area and a recording paper sheet size;

setting a set magnification factor;

comparing the determined magnification factor with the set magnification factor; and recording the received image by variably magnifying the received image at the determined magnification factor and recording the variably magnified image on the fixed-size recording paper sheet when the determined magnification factor is not less than the set magnification factor, and dividing the received image into divided images and recording the divided images on a plurality of fixed-size recording paper sheets when the determined magnification factor is less than the set magnification factor.

46. A method according to claim 45, wherein the communication apparatus is a facsimile apparatus.

47. A method according to claim 45, further comprising the step of obtaining a recordable area of the recording paper sheet, wherein the determined magnification factor is determined by comparing the effective data area and the recordable area.

48. An apparatus according to claim 45 or 46, wherein said magnification factor determination step determines magnification factors in main scan and sub-scan directions to be equal to each other.

49. A method according to claim 45, wherein when the determined magnification factor in the sub-scan direction is not less than the set magnification factor, said recording step records the received data to fill the fixed-size recording paper sheet in both a main scan direction and a sub-scan direction.

50. A method according to claim 49, wherein said magnification factor determination step independently determines magnification factors in the sub-scan and main scan directions upon recording of the received data.

51. A method according to claim 49, wherein when a plurality of received data are recorded on one page, said recording step records the received data at the same magnification factor in both the sub-scan and main scan directions.

52. A method according to claim 49, wherein when one page of received data is divisionally recorded on a plurality of recording sheets, said recording step records the data with an equal-size in the sub-scan direction.

53. A method of operating a communication apparatus for recording an image on a fixed-size recording paper sheet, comprising the steps of:

storing a plurality of pages of received data;

counting a number of lines of each page of the received data, and storing the count values;

reducing an image at a determinable reduction factor;

determining the determinable reduction factor from a maximum number of lines of the different counted numbers of lines of the pages received in one communication after an end of the one communication; and recording all the pages of received data, the pages being reduced by said reduction step at the reduction factor determined by said magnification determination step.

54. A method according to claim 53, wherein when the reduction factor is not more than a predetermined value, said recording step divisionally records each page of received data onto a plurality of pages with an equal size.

55. A method according to claim 53, further comprising the step of appending the reduction factor at least at a predetermined position of a first page.

56. A method of operating a communication system including a sender apparatus for sending data to a partner receiver apparatus, comprising:

in the sender apparatus, the steps of:

obtaining an effective data area in one physical page of data including some black pixels to be sent, wherein said effective data area recognition step detects positions of black pixels of the data and recognizes the effective data area based on the detected positions;

sending the data to the receiver apparatus; and informing the effective data area to the receiver apparatus; and in the receiver apparatus, the steps of:

storing the received data;

determining a magnification factor of the received data by comparing the effective data area and a recording paper sheet size;

setting a set magnification factor;

comparing the determined magnification factor with the set magnification factor; and recording the received data by variably magnifying the received data at the determined magnification factor and recording the variably magnified data on the fixed-size recording paper sheet when the determined magnification factor is not less than the set magnification factor, and dividing the received data into divided images and recording the divided images on a plurality of fixed-size recording paper sheets when the determined magnification factor is less than the set magnification factor.

57. A method according to claim 56, wherein the system is a facsimile system.

58. A method according to claim 56, wherein the receiver apparatus determines magnification factors in main scan and sub-scan directions to be equal to each other.

59. A method according to claim 56, wherein the receiver apparatus determines the magnification factor on the basis of the effective data area informed from the sender apparatus, and a recordable area smaller than a recording paper sheet size used in the receiver apparatus.

60. A method of operating a communication apparatus for recording an image on a fixed-size recording paper sheet, comprising the steps of:

storing received data;

obtaining an effective data area of the received data;

converting the received data to corresponding converted data rotated by 90°;

appending data representing a page partition; and when an effective data length, in a main scan direction, of the received data is not more than a predetermined length larger than half a length, in a sub-scan direction, of a recording paper sheet size, and an effective data length, in the sub-scan direction, of the received data is not more than another predetermined length larger than a length, in the main scan direction, of the recording paper sheet size, controlling to convert the received data to converted data and to record the converted data on a half area of the recording paper sheet, controlling to append data representing the page partition, and thereafter, controlling to convert received data of the next page to converted data and to record the converted data on the remaining half area of the recording paper sheet.

61. A method according to claim 53 or 60, wherein the communication apparatus is a facsimile apparatus.

62. A method according to claim 60, wherein when each received page has a size larger than half a size of a recording paper sheet to be used within a range of a predetermined extra rate of the half size, said control step determines a reduction factor on the basis of one having a larger extra rate of sizes, in the main scan and sub-scan directions, of the received data, and controls to perform a recording operation at the determined reduction factor.

63. A method according to claim 60, wherein when each received page has a size larger than half a size of a recording paper sheet to be used within a range of a predetermined extra rate of the half size, said control step controls to record two pages of received data on a single recording paper sheet at a reduction factor, which is determined on the basis of a maximum value of sizes, in the main scan and sub-scan directions of each page of received data.

64. A method according to claim 60, wherein when continuous pages of received data are converted to converted data, and the converted data do not fall within one page of a recording paper sheet, said control step controls to record all pages without conversion.

65. A method of controlling a communication apparatus comprising the steps of:

obtaining an effective data area of one page of read data;

storing the read data in a memory;

converting read data to corresponding converted data rotated by 90°;

appending data representing a page partition;

transmitting the read data as sending data; and when a length, in a sub-scan direction, of the effective data area of the read data is equal to a length, in a main scan direction, of a recording paper sheet informed from a receiver, controlling to convert and encode the read data, to append the data representing the page partition to the encoded data, and to transmit two pages of read data as one page of sending data.

66. A method according to claim 65, wherein the communication apparatus is a facsimile apparatus.

67. A method according to claim 65, wherein when the length, in the sub-scan direction, of the effective data area of the sending data is not more than a predetermined length larger than the length, in the main scan direction of the recording paper sheet, and a length, in the main scan direction, of the effective data area of the sending data is not more than another predetermined length longer than half a length, in the sub-scan direction, of the recording paper sheet size, said control step controls to convert two pages of read data, to append page partition data between the two pages, and to transmit the two pages of read data as one page of data.

68. A method according to claim 67, wherein said control step allows main scan and sub-scan lengths of the read data to exceed the recording paper sheet size by a predetermined extra rate, and when two pages of read data are transmitted as one page of sending data, said control step controls to reduce the two pages of read data at a reduction factor determined with reference to a larger one of the main scan and sub-scan lengths of the two pages of read data, and to transmit the two pages of read data as one page of sending data.

69. A method according to claim 67, wherein said control step allows main scan and sub-scan lengths of the read data to exceed the recording paper sheet size by a predetermined extra rate, and controls to reduce all read data at a reduction factor with reference to a maximum value of the main scan and sub-scan lengths of all the read data, and to transmit two pages of read data as one page of sending data.

70. A method according to any one of claims 65 to 69, wherein when said control step controls to convert the read data and to transmit two pages of read data as one page of sending data, said control step counts the number of pages of read data and the number of pages for sending data using separate counters.

71. A method according to claim 65, further comprising:

appending addresser data including the number of pages of sending data at a normal position;

appending addresser data including the number of pages of read data in converted read data at a converted position; and selecting one of the two types of addresser data.

72. A communication apparatus for recording an image on a recording paper sheet having a fixed size, comprising:

memory means for storing units of received image data;

recognition means for recognizing a size of each unit of received image data;

recording means for recording image data on a recording paper sheet;

conversion/reducing means for converting and reducing each unit of received image data in accordance with the recognized size of received image data; and control means for discriminating whether or not the size of each unit of received image data recognized by said recognition means is shorter than a predetermined length that is longer than a length of one side of the recording paper sheet, and for, if the size is shorter, determining recording of a plurality of units of received image data on one recording paper sheet, causing said conversion/reducing means to convert and reduce a unit of received image data whose size is longer than the length of the one side in accordance with the determination, and causing said recording means to record a plurality of the units of converted and reduced image data on one recording paper sheet in accordance with the determination.

73. An apparatus according to claim 72, wherein each unit of received image data corresponds to a page, and said control means causes said recording means to record two units of the reduced image data on the one recording paper sheet.

74. An apparatus according to claim 72, wherein said reducing means determines a reduction factor in accordance with the recognized size of the received image data, and reduces the units of the received image data on the basis of the determined reduction factor.

75. An apparatus according to claim 72, wherein said communication apparatus in a facsimile apparatus.

76. A method of operating a communication apparatus for recording an image on a recording paper sheet having a fixed size, comprising:
storing units of received image data;
recognizing a size of each unit of received image data;
converting and reducing each unit of received image data in accordance with the recognized size of received image data;
discriminating whether or not the size of each unit of received image data recognized in said recognizing step is shorter than a predetermined length that is longer than a length of one side of the recording paper sheet; and
if the size is shorter, determining recording of a plurality of units of received image data on one recording paper sheet, causing said converting/reducing step to convert and reduce a unit of received image data whose size is longer than the length of the one side in accordance with the determination, and recording a plurality of the units of converted and reduced image data on one recording paper sheet in accordance with the determination.

77. A method according to claim 76, wherein each unit of the received image data corresponds to a page, and said recording step includes recording two units of the reduced image data on the one recording paper sheet.

78. A method according to claim 76, wherein said reducing step includes determining a reduction factor in accordance with the recognized size of the received image data, and reducing the units of the received image data on the basis of the determined reduction factor.

79. A method according to claim 76, wherein the communication apparatus in a facsimile apparatus.

80. A communication apparatus for recording an image on a recording paper sheet having a fixed size, comprising:
memory means for storing units of received image data;
recognition means for recognizing a size of each unit of received image data;
recording means for recording image data on a recording paper sheet; and
control means for discriminating whether or not the size of each unit of received image data recognized by said recognition means is shorter than a predetermined length that is longer than a length of one side of the recording paper sheet, and for, if the size is shorter, determining recording of a plurality of units of received image data on one recording paper sheet, and causing said recording means to record a plurality of the units of image data on one recording paper sheet in accordance with the determination.

81. An apparatus according to claim 80, wherein each unit of received image data corresponds to a page, and said control means causes said recording means to record two units of the image data on the one recording paper sheet.

82. A communication apparatus according to claim 80, wherein said communication apparatus is a facsimile apparatus.

83. A method of operating a communication apparatus for recording an image on a recording paper sheet having a fixed size, comprising the steps of:
storing units of received image data;
recognizing a size of each unit of received image data;
discriminating whether or not the size of each unit of received image data recognized in said recognizing step is shorter than a predetermined length that is longer than a length of one side of the recording paper sheet; and
if the size is shorter, determining recording of a plurality of units of received image data on one recording paper sheet, and recording a plurality of the units of image data on one recording paper sheet in accordance with the determination.

84. A method according to claim 83, wherein each unit of received image data corresponds to a page, and said recording step records two units of the image data on the one recording paper sheet.

85. A method according to claim 83, wherein the communication apparatus is a facsimile apparatus.

86. A communication apparatus comprising:
input means for inputting image data divided into pages;
recognition means for recognizing a size of each page of the input data;
transmission means for transmitting data in units of transmission pages having a set size; and
control means for discriminating whether or not the size of each page of inputted image data recognized by said recognition means is shorter than a predetermined length that is longer than a length of one side of the recording paper sheet, and for, if the size is shorter, determining transmission of a plurality of pages of inputted image data as one transmission page, and causing said transmission means to transmit a plurality of the pages of input image data as one transmission page in accordance with the determination.

87. A communication apparatus according to claim 86, wherein said control means controls said transmission means to transmit two pages of input data as one transmission page.

88. A communication apparatus according to claim 86, wherein said input means includes reading means for reading images.

89. A communication apparatus according to claim 86, wherein said communication apparatus is a facsimile apparatus.

90. A method of operating a communication apparatus comprising the steps of:
inputting image data divided into pages;
recognizing a size of each page of the input data;
transmitting data in units of transmission pages having a set size;
discriminating whether or not the size of each page of inputted image data recognized in said recognizing step is shorter than a predetermined length that is longer than a length of one side of the recording paper sheet; and
if the size is shorter, determining transmission of a plurality of pages of inputted image data as one transmission page, and causing said transmitting step to transmit a plurality of the pages of input image data as one transmission page in accordance with the determination.

91. A method according to claim 90, wherein said transmitting step transmits two pages of input data as one transmission page.

92. A method according to claim 90, wherein said input step includes a reading step of reading images.

93. A method according to claim 90, wherein the communication apparatus is a facsimile apparatus.

94. A communication apparatus for recording an image on a recording paper sheet having a fixed size, comprising:

memory means for storing received image data;

recognition means for recognizing a size of received image data;

recording means for recording image data on a recording paper sheet; and control means for discriminating whether or not the size of received image data recognized by said recognition means is equal to or shorter than a size that is longer by a predetermined degree than a size of the recording paper sheet, and for, if the recognized size is equal or shorter, determining recording of a plurality of pages of received image data on one recording paper sheet, and causing said recording means to record a plurality of the pages of image data on one recording paper sheet in accordance with the determination.

95. An apparatus according to claim 94, wherein said control means causes said recording means to record two pages of the image data on one recording paper sheet.

96. A communication apparatus according to claim 94, wherein said communication apparatus is a facsimile apparatus.

97. A method of operating a communication apparatus for recording an image on a recording paper sheet having a fixed size, comprising the steps of:

storing received image data;

recognizing a size of received image data;

discriminating whether or not the size of received image data recognized in said recognizing step is equal to or shorter than a size that is longer by a predetermined degree than a size of the recording paper sheet; and if the recognized size is equal or shorter, determining recording of a plurality of pages of received image data on one recording paper sheet, and recording a plurality of the pages of image data on one recording paper sheet in accordance with the determination.

98. A method according to claim 97, wherein said recording step records two pages of the image data on one recording paper sheet.

99. A method according to claim 97, wherein the communication apparatus is a facsimile apparatus.

100. A communication apparatus comprising:

input means for inputting image data divided into pages;

recognition means for recognizing a size of the input data;

transmission means for transmitting data in units of transmission pages having a set size; and control means for discriminating whether or not the size of inputted image data recognized by said recognition means is equal to or shorter than a predetermined length that is longer by a predetermined degree than a size of the recording paper sheet, and for, if the recognized size is equal or shorter, determining transmission of a plurality of pages of inputted image data as one transmission page, and causing said transmission means to transmit a plurality of the pages of input image data as one transmission page in accordance with the determination.

101. A communication apparatus according to claim 100, wherein said control means controls said transmission means to transmit two pages of input data as one transmission page.

102. A communication apparatus according to claim 100, wherein said input means includes reading means for reading images.

103. A communication apparatus according to claim 100, wherein said communication apparatus is a facsimile apparatus.

104. A method of operating a communication apparatus, comprising the steps of:

inputting image data divided into pages;

recognizing a size of the input data;

transmitting data in units of transmission pages having a set size;

discriminating whether or not the size of inputted image data recognized in said recognizing step is equal to or shorter than a predetermined length that is longer by a predetermined degree than a size of the recording paper sheet; and if the recognized size is equal or shorter, determining transmission of a plurality of pages of inputted image data as one transmission page, and causing said transmitting step to transmit a plurality of the pages of input image data as one transmission page in accordance with the determination.

105. A method according to claim 104, wherein said transmitting step transmits two pages of input data as one transmission page.

106. A method according to claim 104, wherein said input step includes a reading step of reading images.

107. A method according to claim 104, wherein the communication apparatus is a facsimile apparatus.

* * * * *

UNITED STATES PATENT AND TRADEMARK OFFICE
CERTIFICATE OF CORRECTION

PATENT NO.  :  5,930,005

DATED       :  July 27, 1999

INVENTOR(S) :  TAKEHIRO YOSHIDA

It is certified that error appears in the above-identified patent and that said Letters Patent is hereby corrected as shown below:

On the Title Page:
[56] REFERENCES CITED

Foreign Patent Documents
    "4127901 5/1992 Germany" should read
        --4127907 5/1992 Germany--.

COLUMN 2

Line 46, "th" should read --the--.

COLUMN 7

Line 28, "silo." should read --S110.--.

COLUMN 12

Line 30, "linein step" should read --lines 36d--.

COLUMN 19

Line 9, "predetermine" should read --predetermined--.
    Line 18, "predetermine" should read --predetermined--.
    Line 26, "predetermine" should read --predetermined--.

UNITED STATES PATENT AND TRADEMARK OFFICE
CERTIFICATE OF CORRECTION

PATENT NO. : 5,930,005
DATED : July 27, 1999
INVENTOR(S) : TAKEHIRO YOSHIDA

It is certified that error appears in the above-identified patent and that said Letters Patent is hereby corrected as shown below:

COLUMN 26

Line 52, "a nd" should read --and--.

COLUMN 29

Line 33, "dat a" should read --data--.

COLUMN 31

Line 9, "In" should read --in--.

Signed and Sealed this

Third Day of April, 2001

Attest:

NICHOLAS P. GODICI

*Attesting Officer*    Acting Director of the United States Patent and Trademark Office